United States Patent
Kuo et al.

(10) Patent No.: US 12,466,784 B2
(45) Date of Patent: Nov. 11, 2025

(54) ANALOGS OF PTEROSTILBENE AMINO ACID BEARING CARBONATES FOR TREATING A NON-ALCOHOLIC FATTY LIVER DISEASE AND NONALCOHOLIC STEATOHEPATITIS

(71) Applicant: APICAL MOLECULAR BIOTECH CO., LTD., Taoyuan (TW)

(72) Inventors: Tai-Huang Kuo, Tainan (TW); Po-Chuen Shieh, Kaohsiung (TW); Ming-Long Cheng, Taoyuan (TW); Chih-Wei Fu, Hsinchu (TW)

(73) Assignee: APICAL MOLECULAR BIOTECH CO., LTD., Taoyuan (TW)

( * ) Notice: Subject to any disclaimer, the term of this patent is extended or adjusted under 35 U.S.C. 154(b) by 414 days.

(21) Appl. No.: 18/009,793

(22) PCT Filed: Jun. 8, 2021

(86) PCT No.: PCT/CN2021/098765
§ 371 (c)(1),
(2) Date: Dec. 12, 2022

(87) PCT Pub. No.: WO2021/249364
PCT Pub. Date: Dec. 16, 2021

(65) Prior Publication Data
US 2023/0234912 A1    Jul. 27, 2023

Related U.S. Application Data

(60) Provisional application No. 63/038,142, filed on Jun. 12, 2020.

(51) Int. Cl.
*C07C 229/10* (2006.01)
*C07C 229/26* (2006.01)
*C07C 237/20* (2006.01)
*C07C 271/06* (2006.01)
*C07C 323/60* (2006.01)

(52) U.S. Cl.
CPC .......... *C07C 229/10* (2013.01); *C07C 229/26* (2013.01); *C07C 237/20* (2013.01); *C07C 271/06* (2013.01); *C07C 323/60* (2013.01)

(58) Field of Classification Search
CPC ... C07C 229/10; C07C 229/26; C07C 237/20; C07C 271/06; C07C 323/60
See application file for complete search history.

(56) References Cited

FOREIGN PATENT DOCUMENTS

| CN | 105829346 A | 8/2016 |
|---|---|---|
| WO | WO03024943 A2 | 3/2003 |
| WO | WO2007074171 A1 | 7/2007 |
| WO | WO2011031934 A1 | 3/2011 |
| WO | WO2017012568 A1 * | 1/2017 |

(Continued)

OTHER PUBLICATIONS

Chinese International Search Report cited in corresponding International Appln. PCT/CN2021/098765 dated Sep. 29, 2021.

*Primary Examiner* — Brandon J Fetterolf
(74) *Attorney, Agent, or Firm* — BACON&THOMAS,PLLC

(57) ABSTRACT

A series of novel analogs of water soluble pterostilbene amino acid bearing carbonates were synthesized, which show activities in treating a non-alcoholic fatty liver disease and a nonalcoholic steatohepatitis (NASH).

16 Claims, 2 Drawing Sheets

Sham group (Non-MCD)   Control

Compound 5c 75 mg/kg   Compound 5c 100 mg/kg   Compound 5c 150 mg/kg

(56) References Cited

FOREIGN PATENT DOCUMENTS

| WO | WO2017090007 A1 | 6/2017 |
| WO | WO2018081513 A1 | 5/2018 |
| WO | WO202081654 A1 | 4/2020 |

\* cited by examiner

ANALOGS OF PTEROSTILBENE AMINO ACID BEARING CARBONATES FOR TREATING A NON-ALCOHOLIC FATTY LIVER DISEASE AND NONALCOHOLIC STEATOHEPATITIS

FIELD OF THE INVENTION

The present invention is related to novel analogs of pterostilbene amino acid bearing carbonates for treating a non-alcoholic fatty liver disease (NAFLD) and nonalcoholic steatohepatitis (NASH).

BACKGROUND OF THE INVENTION

Non-alcoholic fatty liver disease (NAFLD) consists of a series of histological changes that are initiated with simple fatty infiltration of the liver, also known as a non-alcoholic fatty liver disease (1). Nonalcoholic steatohepatitis (NASH) is the severe malignant form of NAFLD. It can progress to fibrosis cirrhosis, liver failure and hepatocellular cancer (HCC) and can rapidly turn into major cancer for end-stage liver disease or liver transplantation C (2, 3). NAFLD is the most prevalent chronic liver disease and one-fourth of the adult population worldwide suffers from NAFLD (4).

According to current estimates, the prevalence of the adult population diagnosed with NASH will reach 18 million in Japan, England, France, Germany, Italy, and Spain combined by 2027. Lifestyle interventions, such as dietary caloric restriction and exercise, are the current basic therapeutic treatments for NASH, but they can be hard to improve and maintain, not to mention that they do not meet the urgent need for medication (2).

Although there are some clinical trials on NASH-drug candidates under development (5-7), for the moment, there are no drugs approved by the US FDA to treat NASH. Among the agents in clinical trials, Obeticholic acid (Ocaliva), known primarily as a biliary cholangitis drug) is currently the only phase III clinical trial drug candidate that has achieved positive results in inhibiting NASH efficacy, and subsequently an application has been filed for the US NDA (New Drug Application) (8, 9). All in all, the development of NASH/NAFLD treatment or preventive drugs that are novel, safe, and effective is an immediate priority.

Pterostilbene (trans-3,5-dimethoxy-4-hydroxystilbene) is a naturally occurring phytochemicals compound mainly found in blueberries, grapes and the wood of various trees (10-12). Pterostilbene is known to have a variety of advantages in the prevention and treatment of some diseases including cancer, dyslipidemia, diabetes, and cognitive function degeneration (10, 11, 13).

Recently, pterostilbene has been reported to reduce liver steatosis and modify the hepatic fatty acid profile in obese rats (14, 15). The results of using pterostilbene in both animal and human experiments have shown low toxicity and high safety (16). Therefore, it is highly possible that pterostilbene can be developed into a clinical drug for the treatment of NAFLD/NASH. However, pterostilbene has poor water solubility, 0.011 mg/mL, (www.vcclab.org) which is not conducive to its clinical research. Some pharmaceutical chemists have derived it into water soluble phosphate derivatives (17). Generally, phenolic phosphate has poor stability, so it is rarely made into an oral dosage form. So far, there is no literature on the oral in vivo efficacy of pterostilbene phosphate. Only iv animal study has been reported (18). Later, Chava satyanarayana et. al made pterostilbene phosphate and sitagliptin (an orally-active dipeptidyl peptidase-4, (DPP-IV) enzyme inhibitor) into a pharmaceutical composition comprising a therapeutically effective amount of a sitagliptin pterostilbene phosphate in crystalline form (or amorphosphous form) (Chava satyanarayana et. al. Patent Number: WO2014147641). This compound is based on Sitagliptin. The patent, related to sitagliption pterostilbene phosphate salt, contains the process for the preparation and the same pharmaceutical composition, without any in vivo efficacy results.

Azzolini M et. al synthesized a series of water-soluble derivatives of pterostilbene amino acid carbamates (19), tested their pharmacokinetic and distribution profiles, and found an increase in absorption and reduction in metabolism, but did not further test its in vivo efficacy. The possible reason is that carbamate ester linkage decomposes too slowly in the body to convert carbamate derivatives into biologically active metabolites (e.g. irinotecan). In addition, Gonzalez-Alfonso J L et al. synthesized a series of novel eight-arm-polyethylene glycol pterostilbene derivative, which have good water solubility, but only performed an IV method for testing their anti-tumor activity (20). Kuo et. al synthesized a series of stilbenoids as inhibitors for squamous carcinoma and hepatoma (Kuo Sheng-Chu et al. U.S. Pat. No. 9,266,813 B2.2016). Among the synthesized stilbenoids, some of water soluble pterostilbenoids are unstable, and some of the stable pterostilbenoids are poor water solubility. Recently, Jose'L et al. Synthesized pterostilbene α-glucoside by enzymes. Its water solubility increased, but there was no report on its in vivo efficacy (20).

SUMMARY OF THE INVENTION

An objective of the present invention is to provide a series of new compounds having the following formula:

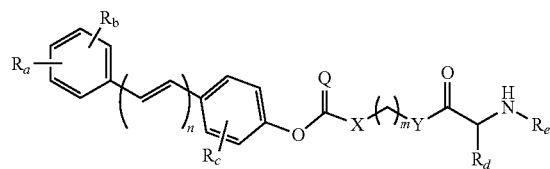

wherein n is 1 to 3;
m is 2 to 6;
Q, X and Y independently are O, S, or NH;
Ra, Rb, and Re independently are H, halogen, C1-C6 linear alkyl, C1-C6 linear alkoxy, C3-C6 branched alkyl, C3-C6 branched alkoxy or C1-C6 fluoroalkoxy;

Rd and Re independently are H, halogen, C1-C6 linear alkyl, C1-C6 linear alkoxy, C3-C6 branched alkyl, C3-C6 branched alkoxy or C1-C6 fluoroalkoxy, or Rd and Re are linked to form a ring structure, so that

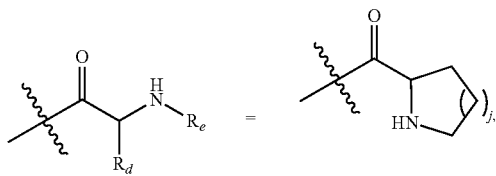

wherein j is 1 to 3; or a pharmaceutically acceptable salt thereof.

Another objective of the present invention is to provide a novel use of the compound of the present invention or a pharmaceutically acceptable salt thereof in the fabrication of a medicament for treating a non-alcoholic fatty liver disease and nonalcoholic steatohepatitis in a patient.

Still another objection of the present invention is to provide a pharmaceutical composition for treating a non-alcoholic fatty liver disease or nonalcoholic steatohepatitis in a subject comprising a therapeutically effective amount for said treatment of the compound of the present invention or a pharmaceutically acceptable salt thereof.

The present invention further provides a method for treating a non-alcoholic fatty liver disease or nonalcoholic steatohepatitis comprising administering to a subject suffering a non-alcoholic fatty liver disease or nonalcoholic steatohepatitis in need of said treatment an effective amount of the compound of the present invention or a pharmaceutically acceptable salt thereof.

The present invention also provides an intermediate compound useful in synthesis of the compound of the present invention or a pharmaceutically acceptable salt thereof, which has the following formula:

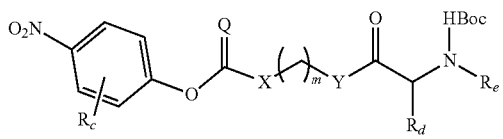

wherein m, Re, Rd, and Re are defined as above, and Boc is a building block functional group, provided that Rd is not hydrogen. Preferable embodiments of the present invention include (but not limited) the features recited in the accompanied claims at the end of the specification.

DETAILED DESCRIPTION OF THE INVENTION

Figure 1:
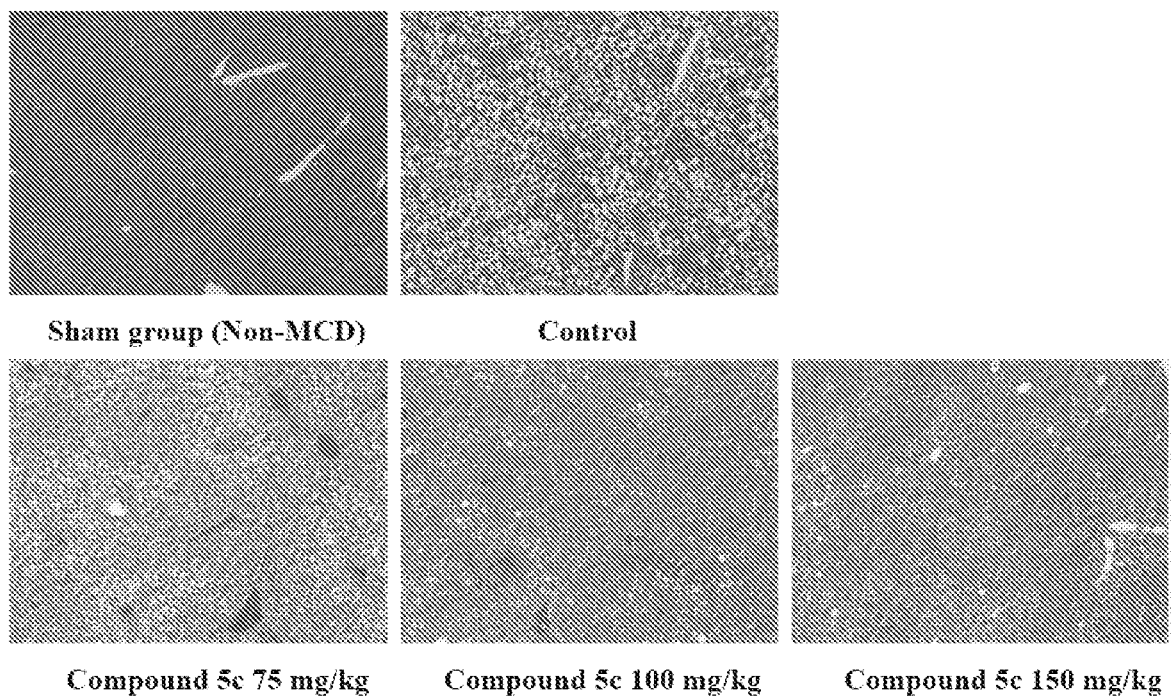
FIG. 1 are photographs (magnification: 200×) showing liver samples of mice in five groups: Sham group (Non-MCD diet); MCD diet group; MCD diet+75 mg/kg compound 5c of the present invention; MCD diet+100 mg/kg compound 5c; and MCD diet+150 mg/kg compound 5c, wherein the liver samples were photographed using a phase-contrast microscope by hematoxylin-eosin (H&E) stain.

A series of novel analogs of water soluble pterostilbene amino acid bearing carbonates were synthesized according to preferred embodiments of the present invention, which show activities in treating a non-alcoholic fatty liver disease and a nonalcoholic steatohepatitis (NASH).

EXAMPLES

1. Chemical Synthesis 1-1. Material and Instruments

Starting materials, reagents and solvents were purchased from commercial suppliers (Sigma-Aldrich, Acros, TCI, Alfa, Combi-Blocks, Matrix and Fischer) and were used as received without further purification. $^1H$ and $^{13}C$-NMR spectra were obtained on Varian AS500 500 NMR-spectrometer or Agilent Technologies VnmrJ 500 NMR-spectrometer in the indicated solvents. Chemical shifts are expressed in ppm (δ units) relative to TMS signal as internal standard. Flash column chromatography was performed on column packed with Merck silica gel 60 (0.063-0.200 μm). Purification of the compounds or final compounds were performed with reverse phase high-performance liquid chromatography (RP-HPLC) with UV detection at 220 or 254 nm (Jasco UV-975 detector) using an Inertsil ODS-3 C18 (5 μm, 30 mm×250 mm) column. The mobile phase was constituted of $H_2O$ and $CH_3CN$ (eluent A, 70% ACN or 80% ACN, isocratic, 42 mL/min flow rate; eluent B, gradient, detail description in the experiment). Mass spectra with electronic impact (MS) were recorded from API 3200 LC/MS/MS. Solvents were reagent grade and, when necessary, they were purified and dried by standard methods. Concentration of the reaction solutions involved the use of rotary evaporator at reduced pressure.

1-2. Synthesis of Target Compounds 5a-10

1-2-1. Synthesis of Compounds 5a-5s

Target compounds 5a-5s were synthesized according to Scheme 1. Various amino acids (1a-1s) were reacted with ethanolamine in the presence of 1-Ethyl-3-(3-dimethylaminopropyl)carbodiimide (EDCI), diisopropylethylamine (DIPEA) and N,N-dimethylaminopyridine (DMAP) in $CH_2Cl_2$ or 1-[Bis(dimethylamino)methylene]-1H-1,2,3-triazolo[4,5-b]pyridinium 3-oxide hexafluorophosphate (HATU) and DIPEA to give the corresponding hydroxyl amide derivatives (compounds 2a-2s). Reactions of 2a-2s with p-nitrophenyl chloroformate yielded the corresponding p-nitrophenyl carbonates (3a-3s) which without further purification were reacted with pterostilbene to give the corresponding 4a-4s. Subsequent deprotection of compounds 4a-4s with 4 M HCl in 1,4-dioxane or trifluoroacetic acid (TFA) and triisopropylsilane (TIPS) in $CH_2Cl_2$ to afford the target compounds 5a-5s.

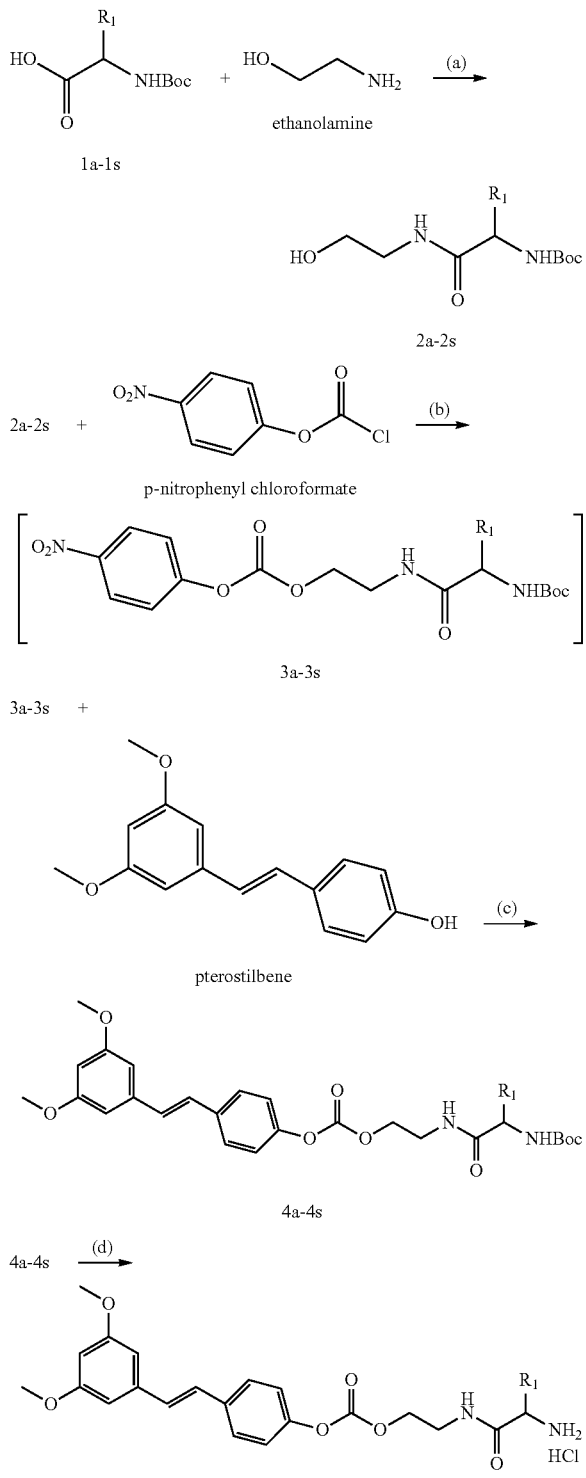
Scheme 1: Synthesis of compounds 5a-5s
|  | R1 | | R2 |
|---|---|---|---|
| 1a~4a | H | 5a | H |
| 1b~4b | CH$_3$ | 5b | CH$_3$ |

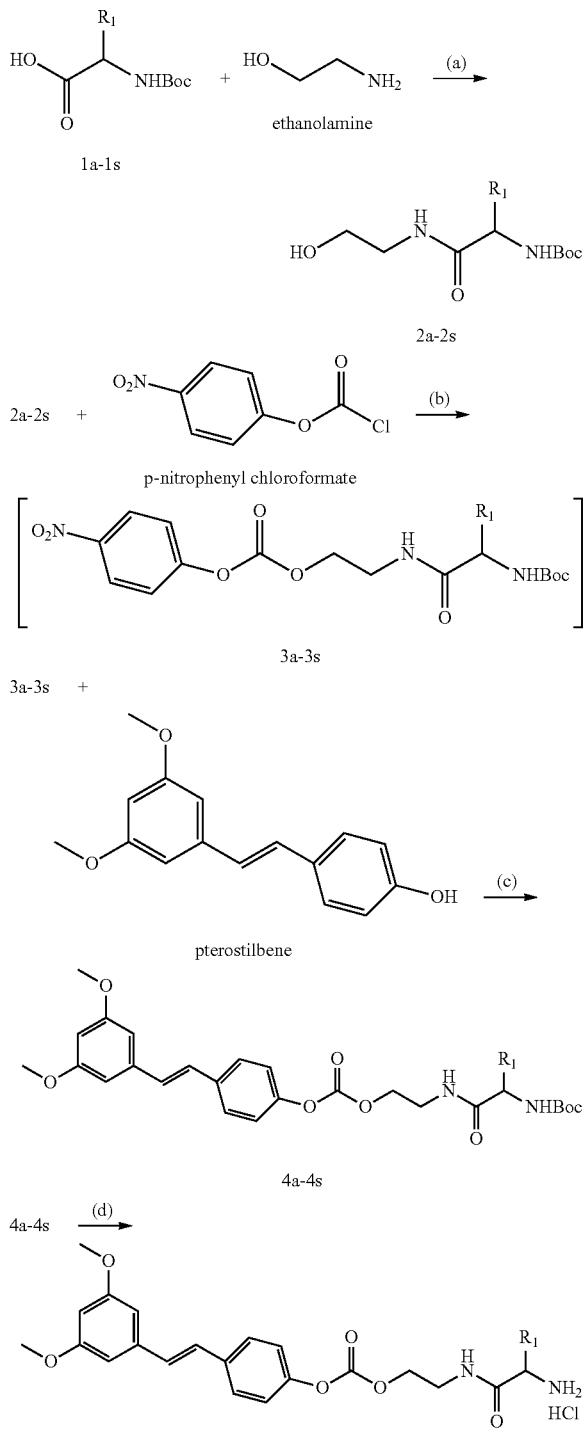

-continued
Scheme 1: Synthesis of compounds 5a-5s
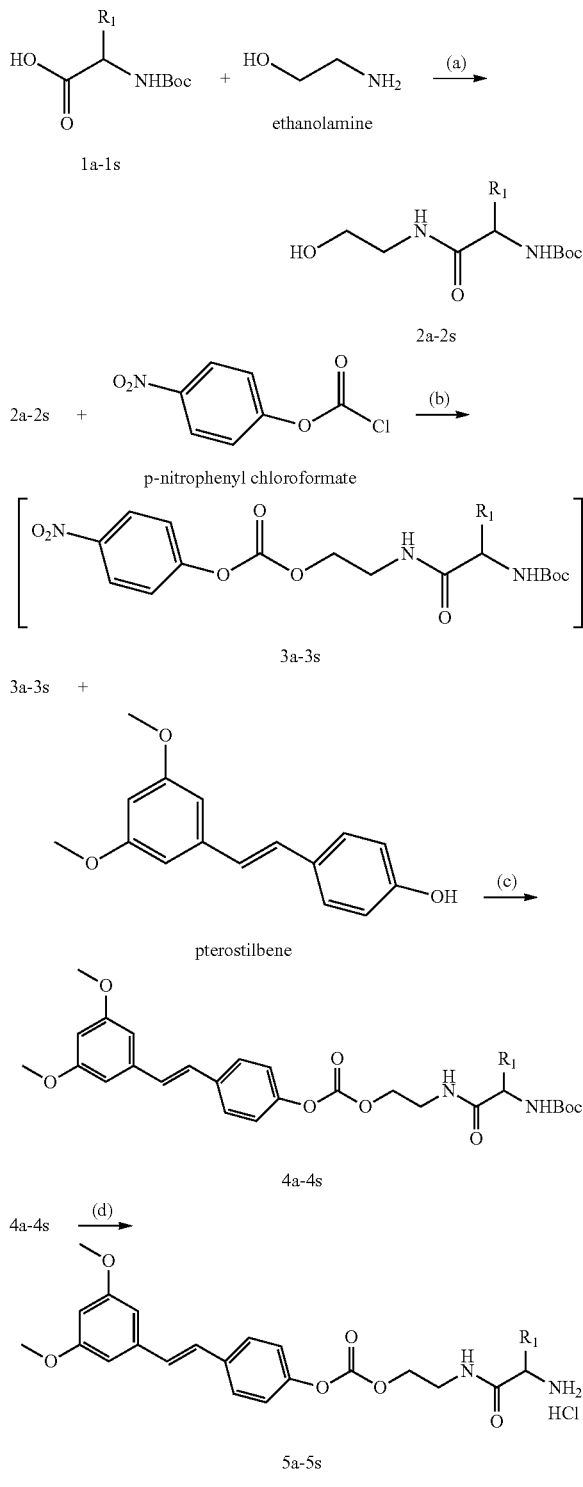
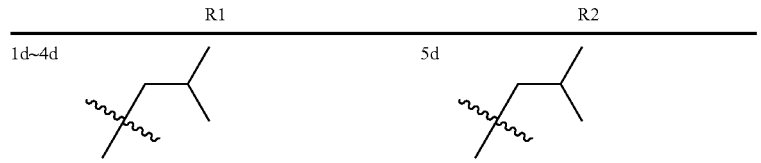

Scheme 1: Synthesis of compounds 5a-5s
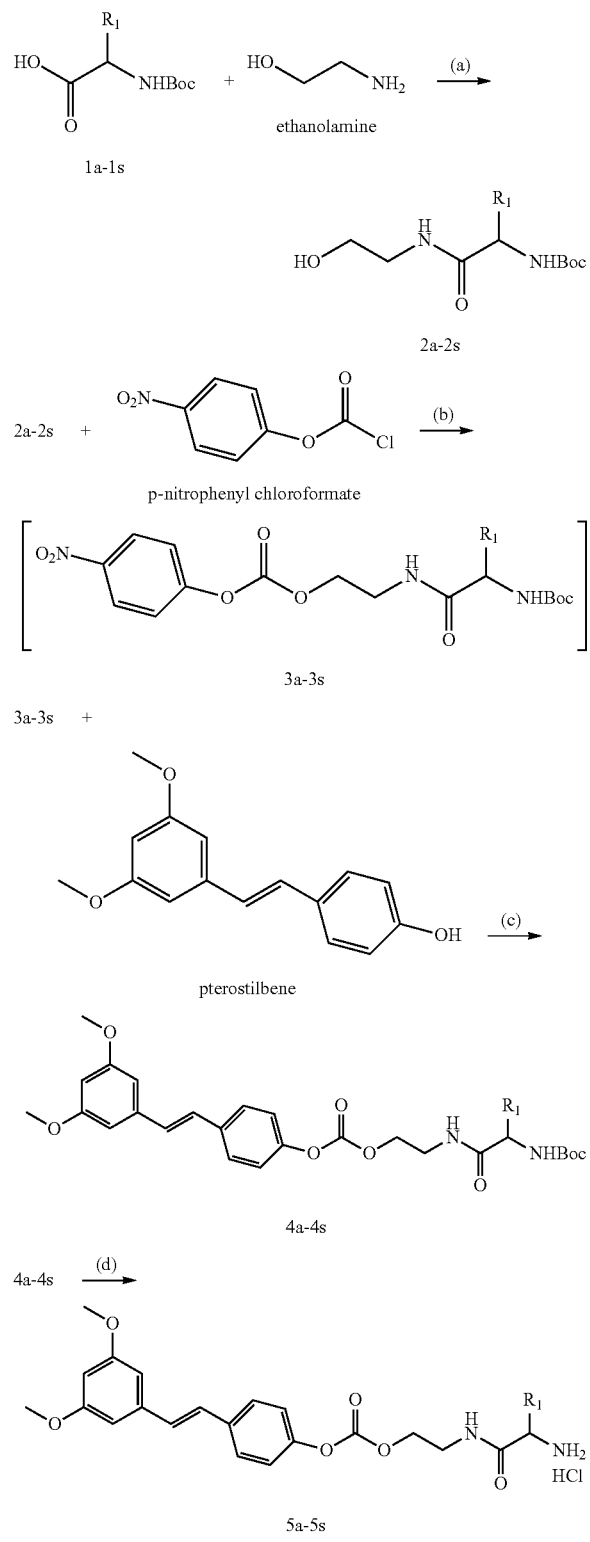
| R1 | R2 |
|---|---|

-continued
Scheme 1: Synthesis of compounds 5a-5s
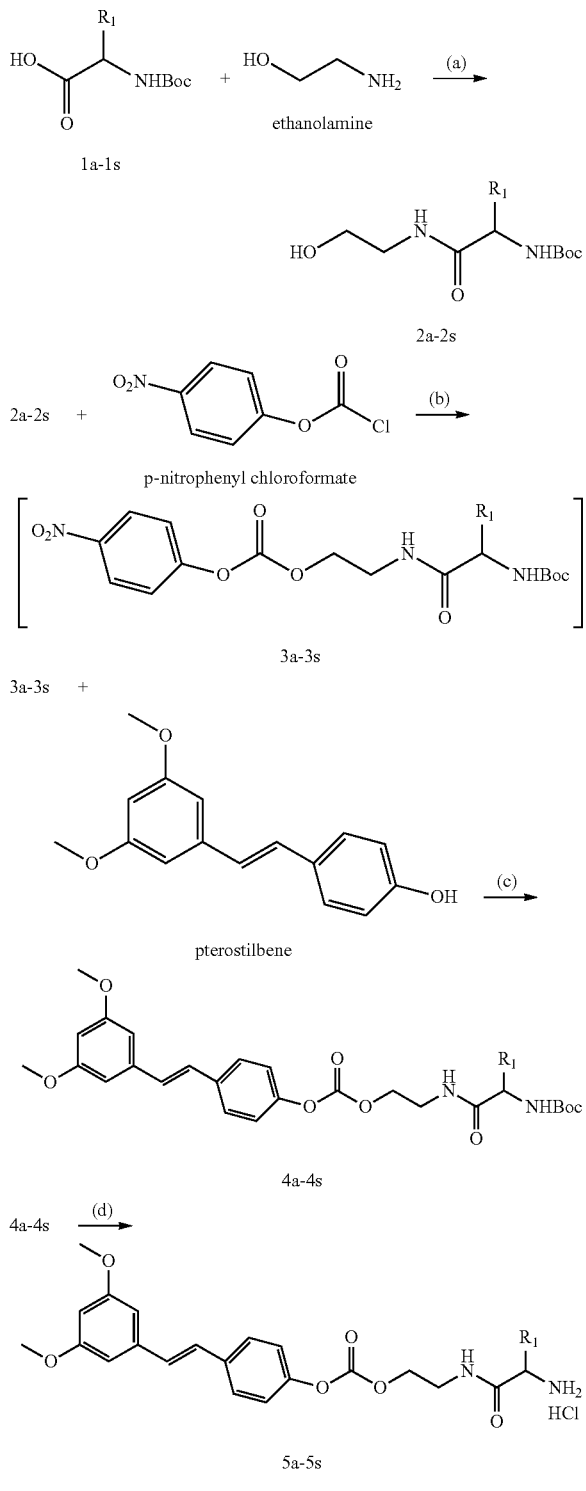
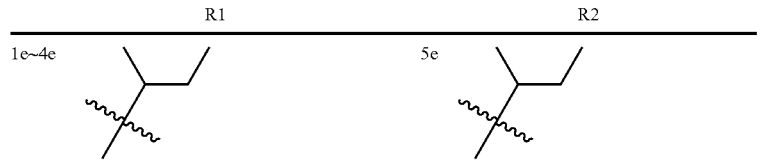

Scheme 1: Synthesis of compounds 5a-5s
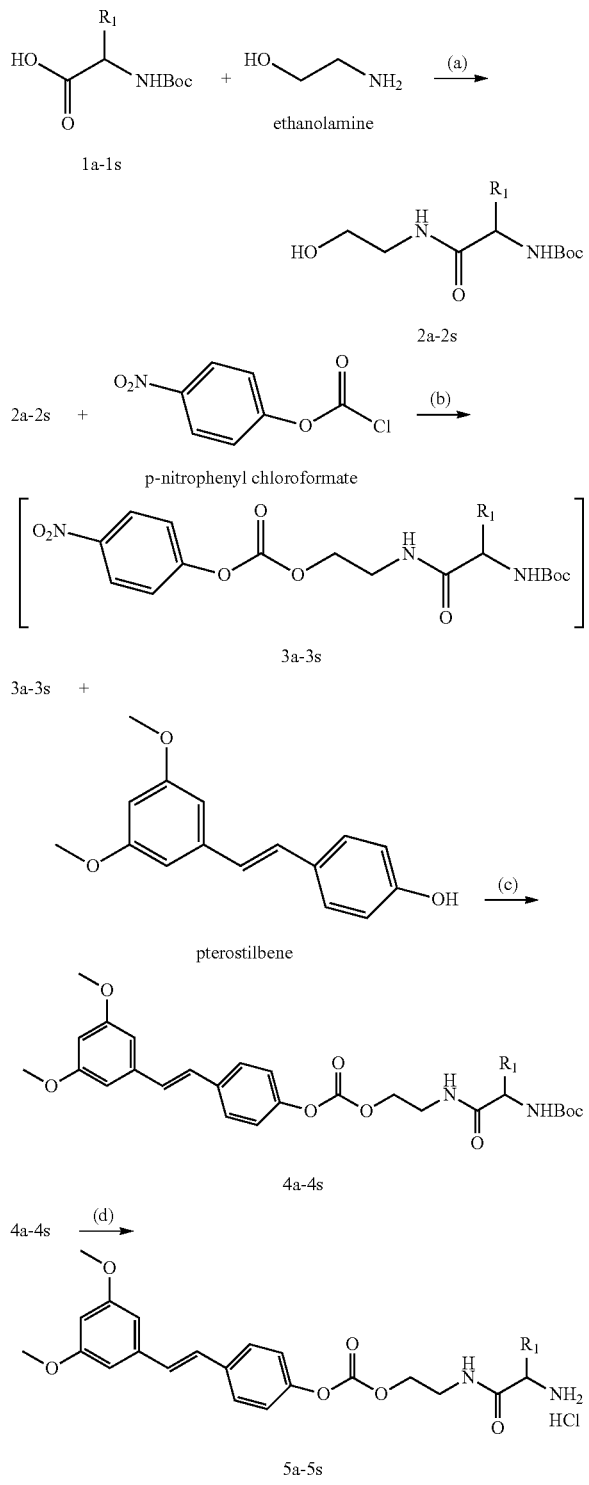

-continued
Scheme 1: Synthesis of compounds 5a-5s
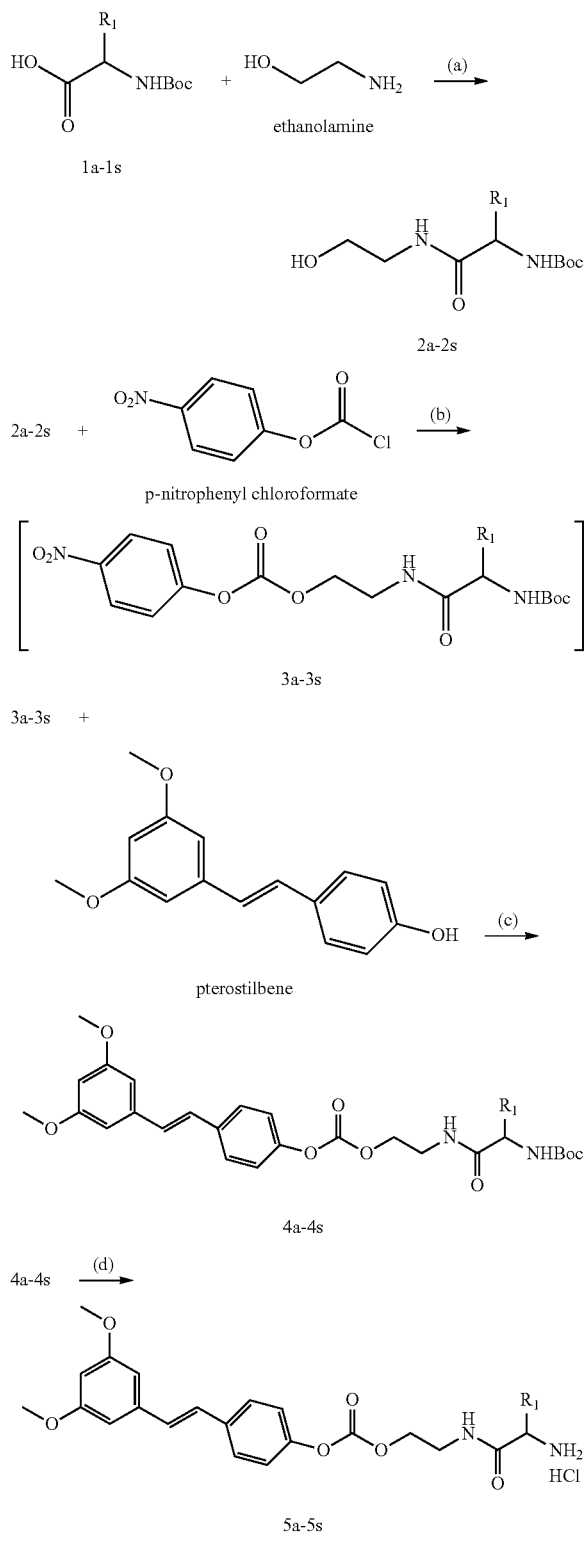

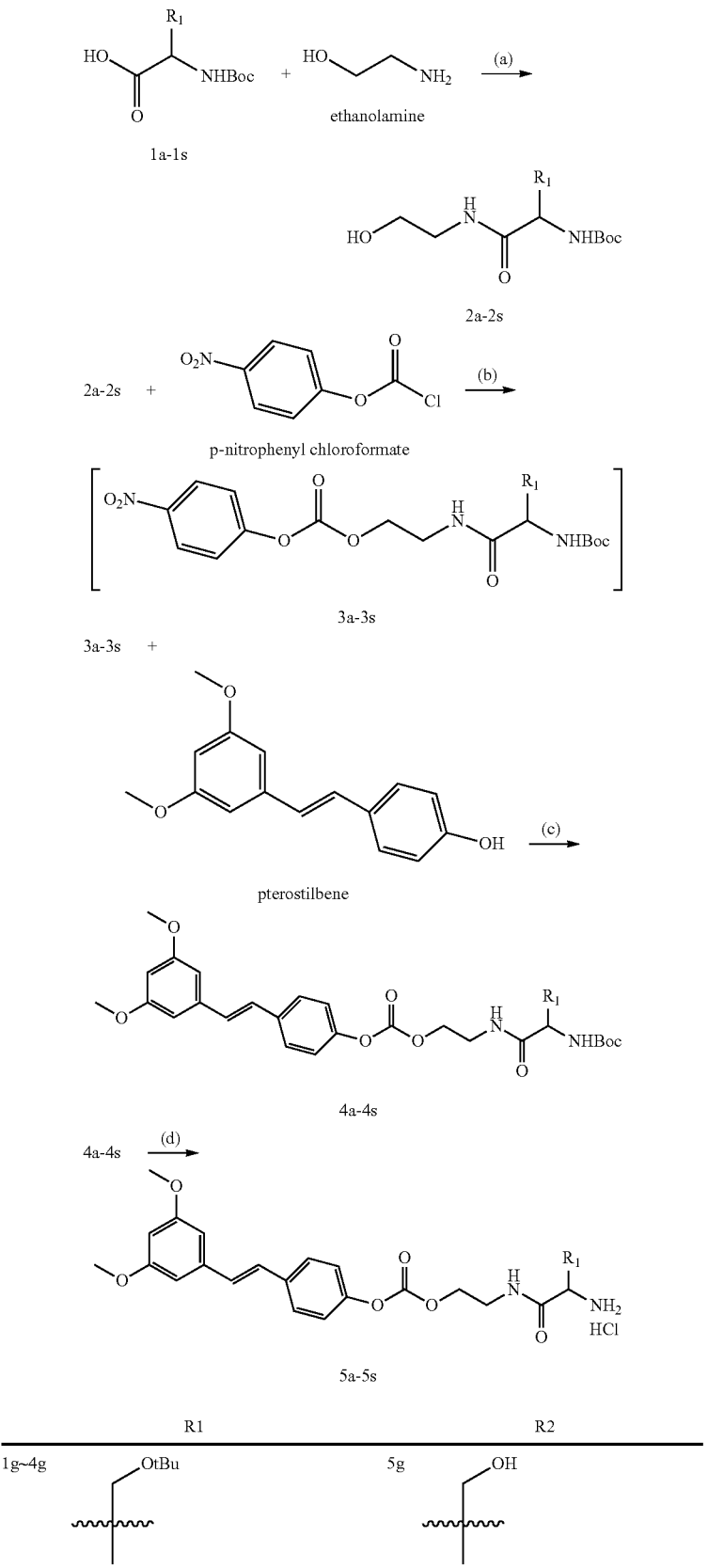

-continued
Scheme 1: Synthesis of compounds 5a-5s
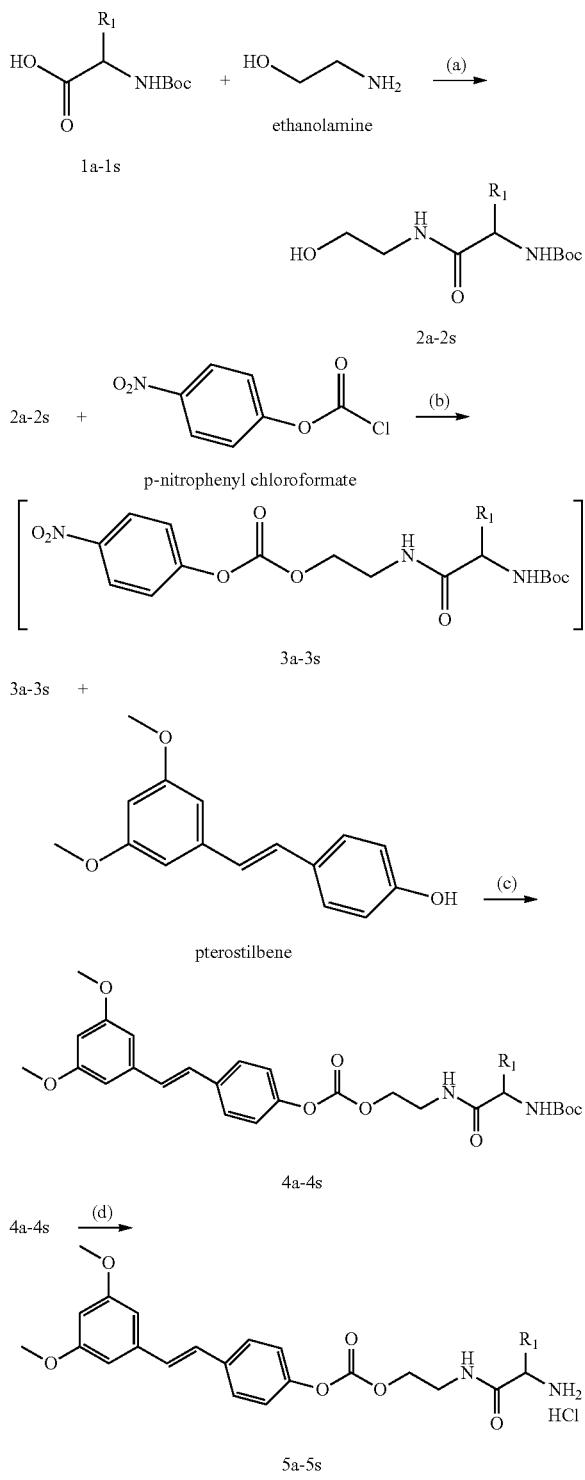
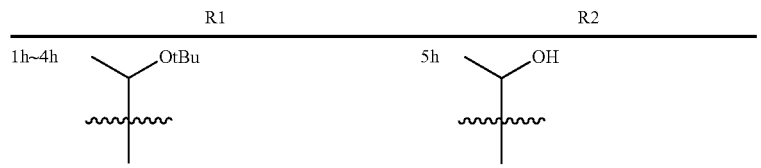

-continued
Scheme 1: Synthesis of compounds 5a-5s
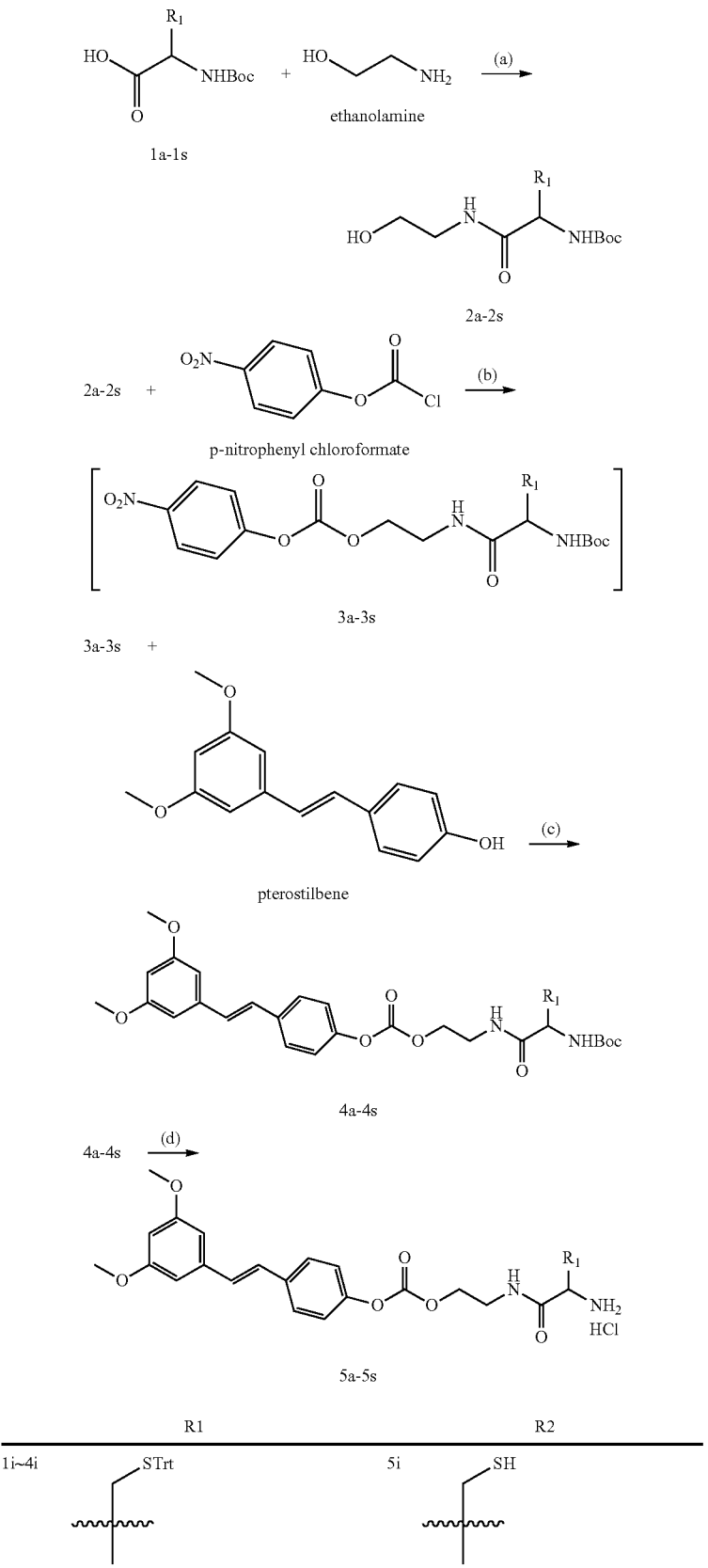

Scheme 1: Synthesis of compounds 5a-5s
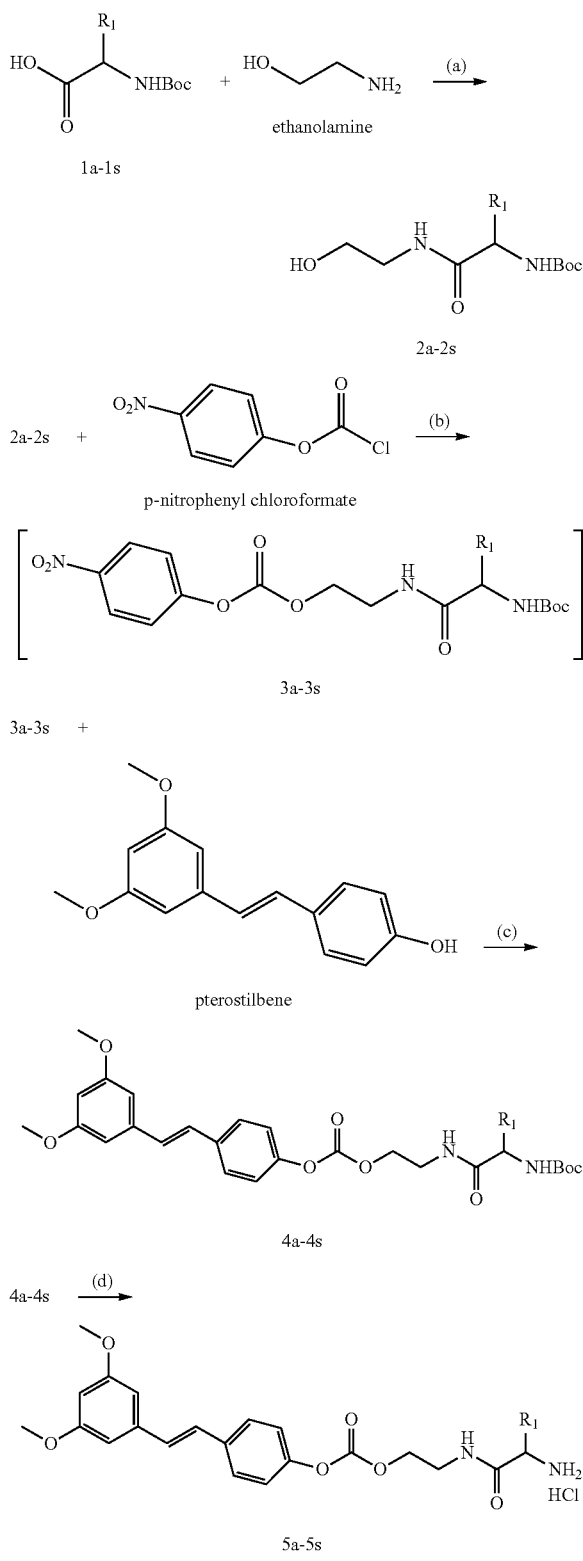
| R1 | R2 |

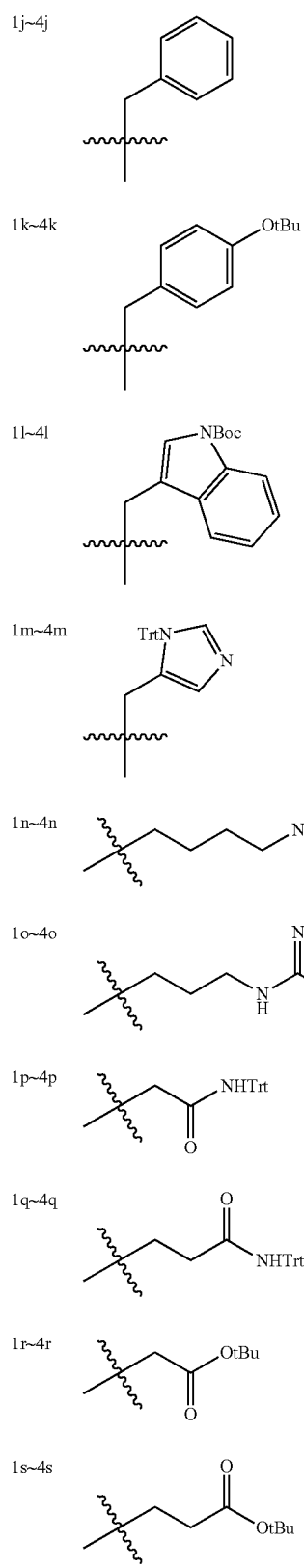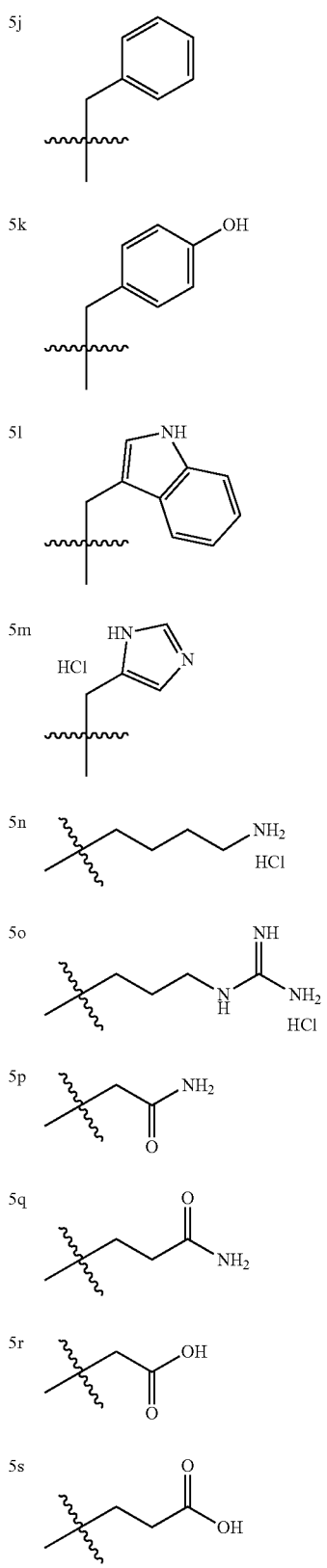
Reagents and conditions:
(a) EDCI, DIPEA, DMAP, $CH_2Cl_2$ or HATU, DIPEA, $CH_2Cl_2$;
(b) $NEt_3$, $CH_2Cl_2$;
(c) DMAP, ACN, 50° C.; (d) 4M HCl in 1,4-dioxane, or TFA, TIPS, $CH_2Cl_2$.

Tert-butyl (2-((2-hydroxyethyl)amino)-2-oxoethyl)carbamate (2a)

To a stirring solution of ethanolamine (3.03 g, 49.6 mmol), Boc-Gly-OH 1a (7.2 g, 41.3 mmol) and DIPEA (16 g, 124 mmol) in CH$_2$Cl$_2$ (80 mL) was added EDCI (61.7 g, 46.6 mmol). The reaction mixture was stirred at room temperature for 12 hrs. After reaction, the solvent was removed in vacuo, the residue was purified by column chromatography (n-Hexane to EA/n-Hexane=1/5 (V/V)) to afford target product 2a (3.3 g, 37% yield) as a white powder. $^1$H-NMR (CDCl$_3$, 500 MHz), δ (ppm): 6.98 (s, NH), 5.62 (s, NH), 3.80 (s, 2H), 3.70-3.68 (m, 2H), 3.43-3.40 (m, 2H), 3.25 (s, OH), 1.44 (s, 9H).

Tert-butyl (1-((2-hydroxyethyl)amino)-1-oxopropan-2-yl)carbamate (2b)

2b was obtained from Boc-Ala-OH 1b, using the same synthetic procedure as 2a.

Yield 37%. $^1$H-NMR (CDCl$_3$, 500 MHz), δ (ppm): 6.90 (s, NH), 5.37 (s, NH), 4.13-4.10 (m, 2H), 3.69-3.68 (m, 2H), 3.44-3.43 (m, 1H), 3.37-3.36 (m, 1H), 1.43 (s, 9H), 1.35 (d, J=6.5 Hz, 3H).

Tert-butyl (1-((2-hydroxyethyl)amino)-3-methyl-1-oxobutan-2-yl)carbamate (2c)

To a stirring solution of ethanolamine (335 mg, 5.4819 mmol), Boc-Val-OH 1c (1191 mg, 5.5 mmol) and DIPEA (2387 uL, 13.7 mmol) in CH$_2$Cl$_2$ (40 mL) was added HATU (2501 mg, 6.6 mmol). The reaction mixture was stirred at room temperature for 12 hrs. After reaction, the solvent was removed in vacuo, the residue was purified by column chromatography (n-Hexane to EA/n-Hexane=3/1(V/V)) to afford target product 2c (1113 mg, 78% yield) as a white powder. $^1$H-NMR (CDCl$_3$, 500 MHz), S (ppm): 6.65 (s, NH), 5.15 (s, NH), 3.86 (t, J=7.5 Hz, 1H), 3.70 (s, 2H), 3.49-3.41 (m, 1H), 3.40-3.36 (m, 1H), 3.07 (s, 1H), 2.11-2.10 (m, 1H) 1.43 (s, 9H), 0.96 (d, J=7.0 Hz, 3H), 0.93 (d, J=7.0 Hz, 3H).

Tert-butyl (1-((2-hydroxyethyl)amino)-4-methyl-1-oxopentan-2-yl)carbamate (2d)

2d was obtained from Boc-Leu-OH 1d, using the same synthetic procedure as 2a.

Yield 70%. $^1$H-NMR (CDCl$_3$, 500 MHz), δ (ppm): 7.05 (s, NH), 5.31 (s, NH), 4.13-4.12 (m, 1H), 3.70-3.67 (m, 2H), 3.47-3.44 (m, 1H), 3.38-3.34 (m, 1H), 1.67-1.60 (m, 2H), 1.52-1.47 (m, 1H), 1.42 (s, 9H), 0.94-0.91 (m, 6H).

Tert-butyl (1-((2-hydroxyethyl)amino)-3-methyl-1-oxopentan-2-yl)carbamate (2e)

2e was obtained from Boc-Ile-OH 1e, using the same synthetic procedure as 2a.

Yield 64%. $^1$H-NMR (CDCl$_3$, 500 MHz), δ (ppm): 6.73 (s, NH), 5.19 (s, NH), 3.90 (t, J=7.0 Hz, 1H), 3.71-3.69 (m, 2H), 3.49-3.44 (m, 1H), 3.39-3.36 (m, 1H), 2.48-2.46 (m, 1H), 1.86-1.84 (m, 1H), 1.56-1.53 (m, 1H), 1.43 (s, 9H), 0.94-0.89 (m, 6H).

Tert-butyl (1-((2-hydroxyethyl)amino)-4-(methylthio)-1-oxobutan-2-yl) carbamate (2f)

2f was obtained from Boc-Met-OH 1f, using the same synthetic procedure as 2c.

Yield 32%. $^1$H-NMR (CDCl$_3$, 500 MHz), δ (ppm): 7.30 (s, NH), 5.73 (s, NH), 4.14-4.12 (m, 1H), 3.59-3.58 (m, 2H), 3.39-3.24 (m, 2H), 2.49-2.46 (m, 2H), 2.05 (s, 3H), 2.02-1.98 (m, 1H), 1.85-1.82 (m, 1H), 1.38 (s, 9H).

Tert-butyl (3-(tert-butoxy)-1-((2-hydroxyethyl)amino)-1-oxopropan-2-yl) carbamate (2g)

2g was obtained from Boc-Ser(tBu)-OH 1g, using the same synthetic procedure as 2a.

Yield 41%. $^1$H-NMR (CDCl$_3$, 500 MHz), δ (ppm): 6.93 (s, NH), 5.42 (s, NH), 4.19-4.17 (m, 1H), 3.76 (s, OH), 3.75-3.69 (m, 2H), 3.42-3.40 (m, 2H), 2.55-2.52 (m, 1H) 1.43 (s, 9H), 1.17 (s, 9H).

Tert-butyl (3-(tert-butoxy)-1-((2-hydroxyethyl)amino)-1-oxobutan-2-yl) carbamate (2h)

2h was obtained from Boc-Thr(tBu)-OH 1h, using the same synthetic procedure as 2a.

Yield 24%. H-NMR (CDCl$_3$, 500 MHz), δ (ppm): 7.12 (s, NH), 5.62 (s, NH), 4.13-4.09 (m, 2H), 3.72-3.70 (m, 2H), 3.49-3.48 (m, 1H), 3.38-3.37 (m, 1H), 1.45 (s, 9H), 1.24 (s, 9H), 1.06 (d, J=5.5 Hz, 3H).

Tert-butyl (1-((2-hydroxyethyl)amino)-1-oxo-3-(tritylthio)propan-2-yl) carbamate (2i)

2i was obtained from Boc-Cys(Trt)-OH 1i, using the same synthetic procedure as 2c.

Yield 71%. $^1$H-NMR (CDCl$_3$, 500 MHz), δ (ppm): 0.7.42-7.40 (m, 6H), 7.31-7.27 (m, 6H), 7.26-7.20 (m, 3H), 6.42 (s, NH), 4.88 (s, NH), 3.81-3.80 (m, 1H), 3.64-3.63 (m, 2H), 3.34-3.33 (m, 2H), 2.69-2.66 (m, 1H), 2.57-2.53 (m, 1H), 1.41 (s, 9H).

Tert-butyl (1-((2-hydroxyethyl)amino)-1-oxo-3-phenylpropan-2-yl)carbamate (2j)

2j was obtained from Boc-Phe-OH 1j, using the same synthetic procedure as 2c.

Yield 88%. $^1$H-NMR (CDCl$_3$, 500 MHz), δ (ppm): 7.33-7.30 (m, 2H), 7.25-7.21 (m, 3H), 6.21 (brs, 11H, NH), 5.11 (brs, 11H, NH), 4.29 (d, J=7.0 Hz, 1H), 3.58-3.57 (m, 2H), 3.32 (s, 2H), 3.10-3.01 (m, 2H), 2.44 (brs, 11H, OH), 1.44 (s, 9H).

Tert-butyl (3-(4-(tert-butoxy)phenyl)-1-((2-hydroxyethyl)amino)-1-oxo propan-2-yl)carbamate (2k)

2k was obtained from Boc-Tyr(tBu)-OH 1k, using the same synthetic procedure as 2c.

Yield 34%. $^1$H-NMR (CDCl$_3$, 500 MHz), δ (ppm): 7.09 (d, J=8.5 Hz, 2H), 6.91 (d, J=8.5 Hz, 2H), 6.39 (s, NH), 5.22 (s, NH), 4.27-4.26 (m, 1H), 3.59-3.56 (m, 2H), 3.31-3.30 (m, 2H), 2.99-2.97 (m, 2H), 1.40 (s, 9H), 1.32 (s, 9H).

Tert-butyl 3-(2-((tert-butoxycarbonyl)amino)-3-((2-hydroxyethyl)amino)-3-oxopropyl)-1H-indole-1-carboxylate (2l)

2l was obtained from Boc-Trp(Boc)-OH 1l, using the same synthetic procedure as 2a.

Yield 35%. $^1$H-NMR (CDCl$_3$, 500 MHz), δ (ppm): 8.13-8.11 (m, 1H), 7.60 (d, J=7.5 Hz, 1H), 7.47 (s, 1H), 7.33 (t, J=7.5 Hz, 1H), 7.28-7.25 (m, 1H), 6.20 (s, NH), 5.18 (s, NH), 4.39-4.38 (m, 1H), 3.60-3.52 (m, 2H), 3.31-3.28 (m, 2H), 3.21-3.14 (m, 2H), 1.67 (s, 9H), 1.43 (s, 9H).

Tert-butyl (1-((2-hydroxyethyl)amino)-1-oxo-3-(1-trityl-1H-imidazol-2-yl) propan-2-yl)carbamate (2m)

2m was obtained from Boc-His(Trt)-OH 1m, using the same synthetic procedure as 2c.

Yield 67%. $^1$H-NMR (CDCl$_3$, 500 MHz), δ (ppm): 7.37 (s, 1H), 7.34-7.33 (m, 9H), 7.11-7.10 (m, 6H), 6.34 (s, 1H), 6.57 (s, NH), 5.79 (s, NH), 4.33 (s, 1H), 3.73-3.60 (m, 2H), 3.51 (brs, 1H), 3.21 (brs, 1H), 3.08-3.02 (m, 2H), 1.43 (s, 9H).

Di-tert-butyl (6-((2-hydroxyethyl)amino)-6-oxohexane-1,5-diyl)dicarbamate (2n)

2n was obtained from Boc-Lys(Boc)-OH 1n, using the same synthetic procedure as 2c.

Yield 70%. $^1$H-NMR (CDCl$_3$, 500 MHz), δ (ppm): 6.88 (s, NH), 5.43 (s, NH), 4.78 (s, NH), 4.07-4.04 (m, 1H), 3.70-3.68 (m, 2H), 3.41-3.40 (m, 2H), 3.10-3.09 (m, 2H), 1.85-1.79 (m, 1H), 1.66-1.62 (m, 1H), 1.49-1.46 (m, 2H), 1.42 (s, 18H), 1.39-1.37 (m, 2H).

Tert-butyl (1-((2-hydroxyethyl)amino)-1-oxo-5-(3-((2,2,4,6,7-pentamethyl-2,3-dihydrobenzofuran-5-yl)sulfonyl)guanidino)pentan-2-yl)carbamate (2o)

2o was obtained from Boc-Arg(Pbf)-OH 1o, using the same synthetic procedure as 2a.

Yield 50%. $^1$H-NMR (CDCl$_3$, 500 MHz), δ (ppm): 7.42 (s, NH), 6.37 (s, NH), 5.81 (s, NH), 4.23-4.18 (m, 1H), 3.72-3.71 (m, 2H), 3.42-3.41 (m, 2H), 3.31-3.26 (m, 2H), 2.92 (s, 3H), 2.57 (s, 3H), 2.50 (s, 3H), 2.09 (s, 3H), 1.90-1.56 (m, 4H), 1.46 (s, 6H), 1.42 (s, 9H).

Tert-butyl (1-((2-hydroxyethyl)amino)-1,4-dioxo-4-(tritylamino)butan-2-yl) carbamate (2p)

2p was obtained from Boc-Asn(Trt)-OH 1p, using the same synthetic procedure as 2a.

Yield 37%. $^1$H-NMR (CDCl$_3$, 500 MHz), δ (ppm): 7.30-7.23 (m, 9H), 7.19-7.17 (m, 6H), 7.11 (s, NH), 6.91 (s, NH), 6.06 (s, NH), 4.41 (m, 1H), 3.57-3.55 (m, 2H), 3.31-3.29 (m, 2H), 3.06-3.03 (m, 1H), 2.62-2.58 (m, 11H), 1.93 (s, 11H), 1.42 (s, 9H).

Tert-butyl (1-((2-hydroxyethyl)amino)-1,5-dioxo-5-(tritylamino)pentan-2-yl) carbamate (2q)

2q was obtained from Boc-Gln(Trt)-OH 1q, using the same synthetic procedure as 2c.

Yield 51%. $^1$H-NMR (CDCl$_3$, 500 MHz), δ (ppm): 7.30-7.23 (m, 15H), 6.83 (s, NH), 5.67 (s, NH), 4.11-3.98 (m, 1H), 3.54-3.53 (m, 2H), 3.32-3.22 (m, 2H), 2.48-2.46 (m, 1H), 2.37-2.34 (m, 1H), 2.04-1.98 (m, 1H), 1.85-1.84 (m, 1H), 1.41 (s, 9H).

Tert-butyl 3-((tert-butoxycarbonyl)amino)-4-((2-hydroxyethyl)amino)-4-oxobutanoate (2r)

2r was obtained from Boc-Asp(tBu)-OH 1r, using the same synthetic procedure as 2a.

Yield 37%. $^1$H-NMR (CDCl$_3$, 500 MHz), δ (ppm): 6.93 (s, NH), 5.63 (s, NH), 4.43-4.40 (m, 1H), 3.70-3.68 (m, 2H), 3.44-3.37 (m, 2H), 2.87-2.83 (m, 1H), 2.66-2.64 (m, 11H), 1.44 (s, 9H), 1.43 (s, 9H).

Tert-butyl 4-((tert-butoxycarbonyl)amino)-5-((2-hydroxyethyl)amino)-5-oxopentanoate (2s)

2s was obtained from Boc-Glu(tBu)-OH 1s, using the same synthetic procedure as 2a.

Yield 37%. $^1$H-NMR (CDCl$_3$, 500 MHz), δ (ppm): 6.96 (s, NH), 5.52 (s, NH), 4.13-4.10 (m, 1H), 3.69-3.68 (m, 2H), 3.41-3.40 (m, 2H), 2.39-2.30 (m, 2H), 2.05-2.03 (m, 1H), 1.91-1.88 (m, 1H), 1.43 (s, 9H), 1.42 (s, 9H).

Synthesis of tert-butyl (E)-(2-((2-(((4-(3,5-dimethoxystyryl)phenoxy) carbonyl)oxy)ethyl)amino)-2-oxoethyl)carbamate (4a)

To a stirred solution of compound 2a (2.02 g, 9.3 mmol) in dry CH$_2$Cl$_2$ (15 ml) was added triethylamine (3.22 mL, 23.1 mmol) and 4-nitrophenyl chloroformate solution (1.96 g, 9.7 mmol in 10 mL CH$_2$Cl$_2$) was added drop wise at 0° C. The reaction mixture was stirred at 0° C. for 15 min, and warmed to room temperature. The mixture was stirred at room temperature for an additional 4 h. After the reaction was completed (checked with TLC), the solvent was removed by evaporation. The crude intermediate was mixed with pterostilbene (2.50 g, 9.8 mmol) and DMAP (2.27 g, 18.6 mmol) in ACN (20 ml). The resulting mixture was heated to 50° C. for 1 h. After reaction, the solvent was removed under vacuum. The residue was taken up in EA and washed with saturated citric acid solution. The organic layer collected, dried over Na$_2$SO$_4$ and evaporated. The residue was purified by column chromatography (silica gel, 0 to 25% of EtOAc/n-hexane) to afford crude product, which was further purified by preparative HPLC (70% ACN, 30% H$_2$O) to afford target compound 4a (2.22 g, 48% yield) as a white powder. $^1$H-NMR (CDCl$_3$, 500 MHz), δ (ppm): 7.52 (d, J=9.0 Hz, 2H), 7.18 (d, J=9.0 Hz, 2H), 7.06 (d, J=16.5 Hz, 1H), 6.99 (d, J=16.5 Hz, 11H), 6.66 (d, J=2.5 Hz, 2H), 6.51 (brs, NH), 6.41 (t, J=2.5 Hz, 1H), 5.10 (brs, NH), 4.35 (t, J=5.5 Hz, 2H), 3.84-3.79 (m, 8H), 3.67 (q, J=5.5 Hz, 2H), 1.46 (s, 9H). Mass found [M-Boc+H]$^+$=402.2; [M+H]$^+$=502.2, [M+Na]$^+$=524.2, [2M+H]$^+$=902.4.

Intermediates 4b-4s were synthesized following similar synthetic procedures as that for 4a.

Tert-butyl (E)-(1-((2-(((4-(3,5-dimethoxystyryl)phenoxy)carbonyl)oxy)ethyl)amino)-1-oxopropan-2-yl) carbamate (4b)

4b was obtained from 2b, using the same synthetic procedure as 4a.

Yield 56%. $^1$H-NMR (CDCl$_3$, 500 MHz), δ (ppm): 7.51 (d, J=8.5 Hz, 2H), 7.18 (d, J=8.5 Hz, 2H), 7.06 (d, J=16.5 Hz, 1H), 6.99 (d, J=16.5 Hz, 1H), 6.67 (s, 2H), 6.58 (s, 1H), 6.41 (s, 1H), 4.94 (s, 1H), 4.34 (t, J=5.0 Hz, 2H), 4.17 (s, 1H), 3.84 (s, 6H), 3.65-3.64 (m, 1H), 1.46 (s, 9H), 1.38 (d, J=7.5 Hz, 3H). Mass found [M-Boc+H]$^+$=416.2; [M+H]$^+$=516.3, [M+Na]$^+$=538.3.

Tert-butyl (E)-(1-((2-(((4-(3,5-dimethoxystyryl)phenoxy)carbonyl)oxy)ethyl)amino)-3-methyl-1-oxobutan-2-yl)carbamate (4c)

4c was obtained from 2c, using the same synthetic procedure as 4a.

Yield 78%. ¹H-NMR (CDCl₃, 500 MHz), δ (ppm): 7.51 (d, J=8.5 Hz, 2H), 7.17 (d, J=9.0 Hz, 2H), 7.06 (d, J=16.0 Hz, 1H), 6.99 (d, J=16.0 Hz, 1H), 6.66 (d, J=2.0 Hz, 2H), 6.41-6.60 (m, 2H), 5.03 (s, 1H), 4.34 (t, J=5.0 Hz, 2H), 3.93-3.83 (m, 1H), 3.70 (s, 6H), 3.68-3.63 (m, 2H), 2.17-2.16 (m, 1H) 1.45 (s, 9H), 0.98 (d, J=6.5 Hz, 3H), 0.93 (d, J=6.5 Hz, 3H). Mass found [M-Boc+H]⁺=444.1; [M+Na]⁺=566.1.

Tert-butyl (E)-(1-((2-(((4-(3,5-dimethoxystyryl)phenoxy)carbonyl)oxy)ethyl)amino)-4-methyl-1-oxopentan-2-yl)carbamate (4d)

4d was obtained from 2d, using the same synthetic procedure as 4a.

Yield 32%. ¹H-NMR (CDCl₃, 500 MHz), δ (ppm): 7.51 (d, J=8.5 Hz, 2H), 7.18 (d, J=9.0 Hz, 2H), 7.06 (d, J=16.5 Hz, 1H), 6.98 (d, J=16.5 Hz, 1H), 6.67 (d, J=2.0 Hz, 2H), 6.55 (s, NH), 6.41 (s, 1H), 4.84 (s, NH), 4.33 (t, J=5.0 Hz, 2H), 4.11 (s, 1H), 3.84 (s, 6H), 3.64 (dd, J=5.0, 10.5 Hz, 2H), 1.73-1.66 (m, 2H), 1.51-1.47 (m, 1H), 1.45 (s, 9H), 0.96-0.94 (m, 6H). Mass found [M-Boc+H]⁺=457.3; [M-Boc+Na]⁺=479.2; [M+Na]⁺=579.3; [2M+Na]⁺=1135.5.

Tert-butyl (E)-(1-((2-(((4-(3,5-dimethoxystyryl)phenoxy)carbonyl)oxy)ethyl)amino)-3-methyl-1-oxopentan-2-yl)carbamate (4e)

4e was obtained from 2e, using the same synthetic procedure as 4a.

Yield 27%. ¹H-NMR (CDCl₃, 500 MHz), δ (ppm): 7.51 (d, J=8.0 Hz, 2H), 7.17 (d, J=9.0 Hz, 2H), 7.06 (d, J=16.5 Hz, 1H), 6.99 (d, J=16.5 Hz, 11H), 6.66 (d, J=2.5 Hz, 2H), 6.41-6.40 (m, 2H), 5.02 (s, NH), 4.34 (t, J=5.0 Hz, 2H), 3.98-3.94 (m, 1H), 3.83 (s, 6H), 3.71-3.61 (m, 2H), 1.92-1.91 (m, 1H), 1.57-1.51 (m, 1H), 1.45 (s, 9H), 1.18-1.09 (m, 1H), 0.95-0.88 (m, 6H). Mass found [M-Boc+H]⁺=457.3; [M+Na]⁺=579.3; [2M+H]⁺=1135.5.

Tert-butyl (E)-(1-((2-(((4-(3,5-dimethoxystyryl)phenoxy)carbonyl)oxy)ethyl)amino)-4-(methylthio)-1-oxobutan-2-yl)carbamate (4f)

4f was obtained from 2f, using the same synthetic procedure as 4a.

Yield 49%. ¹H-NMR (CDCl₃, 500 MHz), δ (ppm): 7.52 (d, J=8.0 Hz, 2H), 7.18 (d, J=9.0 Hz, 2H), 7.06 (d, J=16.5 Hz, 1H), 6.99 (d, J=16.5 Hz, 1H), 6.66 (d, J=2.0 Hz, 2H), 6.64 (s, NH), 6.41 (t, J=2.0 Hz, 1H), 5.16 (s, 1H), 4.34 (t, J=5.0 Hz, 2H), 4.32-4.28 (m, 1H), 3.84 (s, 6H), 3.69-3.61 (m, 2H), 2.63-2.52 (m, 2H), 2.16-2.08 (m, 4H), 1.98-1.92 (m, 1H), 1.45 (s, 9H). Mass found [M-Boc+H]⁺=476.2; [M+H]⁺=576.3; [M+Na]⁺=598.3.

Tert-butyl (E)-3-(tert-butoxy)-1-((2-(((4-(3,5-dimethoxystyryl)phenoxy) carbonyl)oxy)ethyl)amino)-1-oxopropan-2-yl)carbamate (4g)

4g was obtained from 2g, using the same synthetic procedure as 4a.

Yield 46%. ¹H-NMR (CDCl₃, 500 MHz), δ (ppm): 7.51 (d, J=8.5 Hz, 2H), 7.16 (d, J=8.5 Hz, 2H), 7.06 (d, J=16.5 Hz, 1H), 6.99 (d, J=16.5 Hz, 1H), 6.66 (d, J=2.0 Hz, 2H), 6.41 (t, J=2.0 Hz, 1H), 5.44 (s, NH), 4.33 (t, J=5.0 Hz, 2H), 4.19 (s, 1H), 3.84 (s, 6H), 3.80 (s, 1H), 3.68-3.64 (m, 2H), 3.41-3.39 (m, 1H), 1.46 (s, 9H), 1.20 (s, 9H). Mass found [M-Boc-tBu+H]⁺=432.3; [M+H]=588.5; [M+Na]⁺=610.4; [2M+H]⁺=1174.8; [2M+Na]⁺=1196.9.

Tert-butyl (E)-(3-(tert-butoxy)-1-((2-(((4-(3,5-dimethoxystyryl)phenoxy) carbonyl)oxy)ethyl)amino)-1-oxobutan-2-yl)carbamate (4h)

4h was obtained from 2h, using the same synthetic procedure as 4a.

Yield 48%. ¹H-NMR (CDCl₃, 500 MHz), δ (ppm): 7.51 (d, J=8.0 Hz, 2H), 7.34 (s, NH), 7.16 (d, J=8.5 Hz, 2H), 7.06 (d, J=16.5 Hz, 1H), 6.99 (d, J=16.5 Hz, 1H), 6.66 (d, J=2.5 Hz, 2H), 6.41 (t, J=2.5 Hz, 1H), 5.64 (d, J=5.0 Hz, NH), 4.37-4.31 (m, 2H), 4.15-4.13 (m, 2H), 3.84 (s, 6H), 3.69-3.65 (m, 2H), 1.46 (s, 9H), 1.28 (s, 9H), 1.07 (d, J=6.0 Hz, 3H). Mass found [M-Boc-tBu+H]⁺=446.2; [M+H]⁺=602.5; [M+Na]⁺=624.4; [2M+H]⁺=1202.9; [2M+Na]⁺=1224.9.

Tert-butyl (E)-(1-((2-(((4-(3,5-dimethoxystyryl)phenoxy)carbonyl)oxy)ethyl)amino)-1-oxo-3-(tritylthio)propan-2-yl)carbamate (4i)

4i was obtained from 2i, using the same synthetic procedure as 4a.

Yield 27%. ¹H-NMR (CDCl₃, 500 MHz), δ(ppm): 7.49 (d, J=8.5 Hz, 2H), 7.44-7.42 (m, 6H), 7.31-7.28 (m, 6H), 7.24-7.21 (m, 3H), 7.14 (d, J=8.5 Hz, 2H), 7.06 (d, J=16.5 Hz, 1H), 6.99 (d, J=16.0 Hz, 1H), 6.66 (d, J=2.5 Hz, 2H), 6.41 (t, J=2.0 Hz, 1H), 6.40 (s, 1H), 4.79 (s, 1H), 4.28 (t, J=5.0 Hz, 2H), 3.84 (s, 6H), 3.57-3.56 (m, 2H), 2.80-2.77 (m, 1H), 2.58-2.56 (m, 1H), 1.42 (s, 9H), Mass found [M+H]⁺=789.3; [M+Na]⁺=811.3.

Tert-butyl (E)-(1-((2-(((4-(3,5-dimethoxystyryl)phenoxy)carbonyl)oxy)ethyl)amino)-1-oxo-3-phenylpropan-2-yl)carbamate (4j)

4j was obtained from 2j, using the same synthetic procedure as 4a.

Yield 46%. ¹H-NMR (CDCl₃, 500 MHz), δ(ppm): 7.52 (d, J=9.0 Hz, 2H), 7.33-7.30 (m, 2H), 7.24-7.21 (m, 3H), 7.17 (d, J=9.0 Hz, 2H), 7.07 (d, J=16.5 Hz, 1H), 7.00 (d, J=16.5 Hz, 1H), 6.67 (s, 2H), 6.41 (s, 1H), 6.13 (brs, NH), 5.03 (brs, NH), 4.34 (s, 1H), 4.24-4.23 (m, 1H), 4.17 (s, 1H), 3.84 (s, 6H), 3.56 (s, 2H), 3.11-3.02 (m, 2H), 1.42 (s, 9H). Mass found [M-Boc+H]⁺=492.2; [M+H]⁺=592.4; [M+Na]⁺=614.3.

Tert-butyl (E)-(3-(4-(tert-butoxy)phenyl)-1-((2-(((4-(3,5-dimethoxystyryl) phenoxy)carbonyl)oxy)ethyl) amino)-1-oxopropan-2-yl)carbamate (4k)

4k was obtained from 2k, using the same synthetic procedure as 4a.

Yield 39%. ¹H-NMR (CDCl₃, 500 MHz), δ(ppm): 7.51 (d, J=8.0 Hz, 2H), 7.18 (d, J=9.0 Hz, 2H), 7.10 (d, J=7.5 Hz, 2H), 7.06 (d, J=16.5 Hz, 1H), 6.99 (d, J=16.5 Hz, 1H), 6.93 (d, J=8.5 Hz, 2H), 6.66 (d, J=2.0 Hz, 2H), 6.41 (s, 1H), 6.18 (t, J=6.0 Hz, NH), 5.01 (brs, NH), 4.31-4.24 (m, 2H), 4.23-4.19 (m, 1H), 3.84 (s, 6H), 3.60-3.52 (m, 2H), 3.07-2.99 (m, 2H), 1.45 (s, 9H), 1.32 (s, 9H). Mass found [M-Boc-tBu+H]⁺=508.2; [M-Boc+H]⁺=564.3; [M+H]=664.4, [M+Na]⁺=686.4; [M+K]⁺=702.4.

Tert-butyl (E)-3-(2-((tert-butoxycarbonyl)amino)-3-((2-(((4-(3,5-dimethoxy styryl)phenoxy)carbonyl)oxy)ethyl)amino)-3-oxopropyl)-1H-indole-1-carboxylate (4l)

4l was obtained from 2l, using the same synthetic procedure as 4a.

Yield 30%. ¹H-NMR (CDCl₃, 500 MHz), δ(ppm): 8.14-8.12 (m, 1H), 7.59 (d, J=7.5 Hz, 1H), 7.51-7.47 (m, 3H), 7.32 (t, J=8.5 Hz, 1H), 7.26-7.24 (m, 2H), 7.14 (d, J=8.5 Hz, 2H), 7.06 (d, J=16.5 Hz, 1H), 6.99 (d, J=16.5 Hz, 1H), 6.66 (d, J=2.0 Hz, 2H), 6.41 (t, J=2.5 Hz, 1H), 6.30 (s, NH), 5.18 (s, NH), 4.22-4.18 (m, 1H), 4.18-4.10 (m, 1H), 3.83 (s, 6H), 3.52-3.51 (m, 2H), 3.22-3.17 (m, 2H), 1.65 (s, 9H) 1.42 (s, 9H). Mass found [M−2Boc+H]⁺=530.2; [M-Boc+H]⁺=630.2; [M+H]⁺=730.2; [2M+H]⁺=1459.5.

Tert-butyl (E)-(1-((2-(((4-(3,5-dimethoxystyryl)phenoxy)carbonyl)oxy)ethyl)amino)-1-oxo-3-(1-trityl-1H-imidazol-2-yl)propan-2-yl)carbamate (4m)

4m was obtained from 2m, using the same synthetic procedure as 4a.

Yield 62%. ¹H-NMR (CDCl₃, 500 MHz), δ(ppm): 8.18 (s, 1H), 7.46 (d, J=8.5 Hz, 2H), 7.43-7.38 (m, 9H), 7.15 (d, J=8.5 Hz, 2H), 7.12-7.10 (m, 6H), 7.03 (d, J=16.5 Hz, 1H), 6.96 (d, J=16.5 Hz, 1H), 6.91 (s, 1H), 6.66 (d, J=2.5 Hz, 2H), 6.41 (t, J=2.5 Hz, 1H), 5.69 (d, J=8.0 Hz, NH), 4.50-4.45 (m, 1H), 4.37-4.32 (m, 1H), 4.28-4.26 (m, 1H), 3.84 (s, 6H), 3.64-3.50 (m, 2H), 3.28-3.23 (m, 1H), 3.08-3.06 (m, 1H), 1.38 (s, 9H). Mass found [M+H]⁺=832.4.

Di-tert-butyl (6-((2-(((4-(3,5-dimethoxystyryl)phenoxy)carbonyl)oxy)ethyl)amino)-6-oxohexane-1,5-diyl)(E)-dicarbamate (4n)

4n was obtained from 2n, using the same synthetic procedure as 4a.

Yield 39%. ¹H-NMR (CDCl₃, 500 MHz), δ(ppm): 7.51 (d, J=8.0 Hz, 2H), 7.18 (d, J=9.0 Hz, 2H), 7.06 (d, J=16.5 Hz, 1H), 6.99 (d, J=16.5 Hz, 1H), 6.66 (d, J=2.0 Hz, 2H), 6.62 (brs, NH), 6.41 (t, J=2.0 Hz, 1H), 5.13 (brs, NH), 4.61 (brs, NH), 4.34 (t, J=5.0 Hz, 2H), 4.07 (s, 1H), 3.84 (s, 6H), 3.69-3.62 (m, 2H), 3.12-3.11 (m, 2H) 1.90-1.83 (m, 1H), 1.67-1.61 (m, 1H), 1.57-1.47 (m, 2H), 1.45-1.42 (m, 18H), 1.40-1.37 (m, 2H). Mass found [M−2Boc+H]⁺=473.0; [M-Boc+H]⁺=573.4; [M+H]⁺=673.4, [M+Na]⁺=695.4, [M+K]⁺=711.4.

Tert-butyl (E)-(1-((2-(((4-(3,5-dimethoxystyryl)phenoxy)carbonyl)oxy)ethyl)amino)-1-oxo-5-(3-((2,2,4,6,7-pentamethyl-2,3-dihydrobenzofuran-5-yl)sulfonyl)guanidino)pentan-2-yl)carbamate (4o)

4o was obtained from 2o, using the same synthetic procedure as 4a.

Yield 29%. ¹H-NMR (CDCl₃, 500 MHz), δ(ppm): 7.46 (d, J=8.0 Hz, 2H), 7.39 (brs, NH), 7.13 (d, J=9.0 Hz, 2H), 7.04 (d, J=16.5 Hz, 1H), 6.97 (d, J=16.5 Hz, 1H), 6.65 (d, J=1.0 Hz, 2H), 6.40 (s, 1H), 6.27 (brs, NH), 5.57 (d, J=6.0 Hz, NH), 4.33-4.29 (m, 2H), 4.25 (s, 1H), 3.83 (s, 6H), 3.68-3.62 (m, 1H), 3.59-3.55 (m, 1H), 3.30-3.25 (m, 2H), 2.93 (s, 2H), 2.57 (s, 3H), 2.50 (s, 3H), 2.08 (s, 3H), 1.69-1.55 (m, 4H), 1.44 (s, 6H), 1.42 (s, 9H). Mass found [M+H]⁺=852.3.

Tert-butyl (E)-(1-((2-(((4-(3,5-dimethoxystyryl)phenoxy)carbonyl)oxy)ethyl)amino)-1,4-dioxo-4-(tritylamino)butan-2-yl)carbamate (4p)

4p was obtained from 2p, using the same synthetic procedure as 4a.

Yield 28%. ¹H-NMR (CDCl₃, 500 MHz), δ(ppm): 7.50 (d, J=8.5 Hz, 2H), 7.31-7.23 (m, 11H), 7.20-7.15 (m, 6H), 7.06 (d, J=16.5 Hz, 1H), 6.99 (brs, NH), 6.98 (d, J=16.5 Hz, 1H), 6.66 (d, J=2.0 Hz, 2H), 6.41 (t, J=2.0 Hz, 1H), 6.19 (brs, NH), 4.46-4.42 (m, 1H), 4.31-4.19 (m, 2H), 3.84 (s, 6H), 3.64-3.51 (m, 2H), 3.11-3.09 (m, 1H), 2.60-2.57 (m, 1H), 1.42 (s, 9H). Mass found [M+H]⁺=799.5.

Tert-butyl (E)-(1-((2-(((4-(3,5-dimethoxystyryl)phenoxy)carbonyl)oxy)ethyl)amino)-1,5-dioxo-5-(tritylamino)pentan-2-yl)carbamate (4q)

4q was obtained from 2q, using the same synthetic procedure as 4a.

Yield 27%. ¹H-NMR (CDCl₃, 500 MHz), δ(ppm): 7.48 (d, J=8.5 Hz, 2H), 7.30-7.28 (m, 15H), 7.15 (d, J=8.5 Hz, 2H), 7.05 (d, J=16.5 Hz, 1H), 6.98 (d, J=16.5 Hz, 1H), 6.76 (brs, NH), 6.67 (s, 2H), 6.62 (brs, NH), 6.41 (s, 1H), 5.53 (brs, NH), 4.27-4.26 (m, 1H), 4.15-4.12 (m, 1H), 3.99-3.96 (m, 1H), 3.84 (s, 6H), 3.56-3.54 (m, 1H), 3.47-3.46 (m, 1H), 2.53-2.50 (m, 1H), 2.45-2.40 (m, 1H), 2.04-1.87 (m, 2H), 1.42 (s, 9H). Mass found [M+H]⁺=814.3.

Tert-butyl (E)-3-((tert-butoxycarbonyl)amino)-4-((2-(((4-(3,5-dimethoxy styryl) phenoxy)carbonyl)oxy)ethyl)amino)-4-oxobutanoate (4r)

4r was obtained from 2r, using the same synthetic procedure as 4a.

Yield 48%. ¹H-NMR (CDCl₃, 500 MHz), δ(ppm): 7.51 (d, J=8.5 Hz, 2H), 7.18 (d, J=8.5 Hz, 2H), 7.07 (d, J=16.5 Hz, 1H), 6.99 (d, J=16.5 Hz, 1H), 6.93 (brs, NH), 6.66 (d, J=2.0 Hz, 2H), 6.41 (s, 1H), 5.68 (brs, NH), 4.47 (s, 1H), 4.32 (t, J=5.5 Hz, 2H), 3.83 (s, 6H), 3.64-3.63 (m, 2H), 2.90 (dd, J=5.0, 17.5 Hz, 1H), 2.62 (dd, J=6.5, 17.0 Hz, 1H), 1.46 (s, 9H), 1.45 (s, 9H). Mass found [M-Boc-tBu+H]⁺=460.1; [M+H]⁺=616.3; [M+Na]⁺=638.3.

Tert-butyl (E)-4-((tert-butoxycarbonyl)amino)-5-((2-(((4-(3,5-dimethoxy styryl) phenoxy)carbonyl)oxy)ethyl)amino)-5-oxopentanoate (4s)

4s was obtained from 2s, using the same synthetic procedure as 4a.

Yield 55%. ¹H-NMR (CDCl₃, 500 MHz), δ(ppm): 7.51 (d, J=8.0 Hz, 2H), 7.18 (d, J=8.5 Hz, 2H), 7.06 (d, J=16.5 Hz, 1H), 6.99 (d, J=16.5 Hz, 1H), 6.76 (brs, NH), 6.66 (d, J=2.0 Hz, 2H), 6.41 (d, J=2.0 Hz, 1H), 5.29 (brs, NH), 4.33 (t, J=5.5 Hz, 2H), 4.14 (s, 1H), 3.83 (s, 6H), 3.69-3.63 (m, 2H), 2.46-2.40 (m, 1H), 2.35-2.29 (m, 1H), 2.13-2.06 (m, 1H), 1.94-1.87 (m, 1H), 1.46 (s, 9H), 1.44 (s, 9H). Mass found [M-Boc-OtBu+H]⁺=456.1, [M-Boc-tBu+H]⁺=474.0; [M+H]⁺=630.4; [M+Na]⁺=652.3.

(E)-2-(2-aminoacetamido)ethyl (4-(3,5-dimethoxystyryl)phenyl) carbonate hydrochloride (5a)

To a stirred solution of compound 4a (726 mg, 1.5 mmol) in DCM (10 mL) was added 4 M HCl in 1,4-dioxane (7.25 mL) and the mixture was stirred at room temperature for 3 h. Then the reaction solution was evaporated and subjected to prep-HPLC purification (TFA as a buffer, detailed gradient elution, please see the information below). Then the aqueous fraction was treated with several drops of concentrate HCl and lyophilized to afford compound 5a (602 mg, 95% yield) as a white solid. $^1$H-NMR (CD$_3$OD, 500 MHz), δ(ppm): 7.58 (d, J=9.0 Hz, 2H), 7.18 (d, J=9.0 Hz, 2H), 7.14 (d, J=16.5 Hz, 1H), 7.07 (d, J=16.5 Hz, 1H), 6.71 (d, J=2.5 Hz, 2H), 6.40 (t, J=2.5 Hz, 1H), 4.33 (t, J=5.5 Hz, 2H), 3.80 (s, 6H), 3.71 (s, 2H), 3.61 (t, J=5.5 Hz, 2H); $^{13}$C-NMR (CD$_3$OD, 125 MHz), δ(ppm): 166.26, 161.12, 153.66, 150.50, 139.18, 135.47, 128.95, 127.43, 127.19, 120.96, 104.22, 99.60, 66.73, 54.39, 40.09, 38.13; Mass found [M−HCl+H]$^+$=402.2; [M−HCl+Na]$^+$=424.2; [M−HCl+K]$^+$=440.1; [2M−2HCl+H]$^+$=802.3; [2M−2HCl+Na]$^+$=824.4.

Column: Inertsil ODS-3 C18, 5 um, 30*250 mm
Flow: 38 ml/min
Solvent A: 10% ACN in H$_2$O+0.1% TFA
Solvent B: 90% ACN in H$_2$O+0.1% TFA
Gradient:

| Time (min) | Flow (ml/min) | % A | % B |
| --- | --- | --- | --- |
| 0 | 38 | 100 | 0 |
| 20 | 38 | 0 | 100 |
| 24 | 38 | 0 | 100 |
| 28 | 38 | 100 | 0 |
| 30 | 38 | 100 | 0 |

(E)-2-(2-aminopropanamido)ethyl (4-(3,5-dimethoxystyryl)phenyl) carbonate hydrochloride (5b)

5b was obtained from 4b, using the same synthetic procedure as 5a.

Yield 98%. $^1$H-NMR (CD$_3$OD, 500 MHz), δ(ppm): 7.58 (d, J=8.5 Hz, 2H), 7.17 (d, J=8.5 Hz, 2H), 7.15 (d, J=16.5 Hz, 11H), 7.08 (d, J=16.5 Hz, 1H), 6.71 (d, J=2.0 Hz, 2H), 6.40 (t, J=2.0 Hz, 1H), 4.37-4.31 (m, 2H), 3.97-3.93 (m, 1H), 3.80 (s, 6H), 3.67-3.62 (m, 1H), 3.59-3.54 (m, 1H), 1.50 (d, J=7.0 Hz, 3H); $^{13}$C-NMR (CD$_3$OD, 125 MHz), δ(ppm): 169.97, 161.14, 153.67, 150.51, 139.18, 135.48, 128.96, 127.42, 127.18, 120.95, 104.21, 99.59, 66.62, 54.39, 48.86, 38.22, 16.24; Mass found [M−HCl+H]$^+$=416.2; [M−HCl+Na]$^+$=438.2; [2M−2HCl+H]$^+$=830.5; [2M−2HCl+Na]$^+$=852.4.

(E)-2-(2-amino-3-methylbutanamido)ethyl (4-(3,5-dimethoxystyryl)phenyl) carbonate hydrochloride (5c)

5c was obtained from 4c, using the same synthetic procedure as 5a.

Yield 99%. $^1$H-NMR (CDCl$_3$, 500 MHz), δ(ppm): 7.43 (d, J=7.0 Hz, 2H), 7.13 (d, J=7.0 Hz, 2H), 6.99-6.88 (m, 2H), 6.60 (s, 2H), 6.36 (s, 1H), 4.37-4.30 (m, 2H), 4.15 (brs, 1H), 3.77 (s, 6H), 3.50 (brs, 1H), 2.98-2.92 (m, 2H), 2.34-2.33 (m, 1H), 1.10-1.05 (m, 6H); $^{13}$C-NMR (CDCl$_3$, 125 MHz), δ(ppm): 168.94, 160.94, 153.59, 150.23, 138.99, 135.32, 129.23, 127.78, 127.55, 121.33, 104.61, 100.11, 66.81, 58.91, 55.32, 38.42, 30.18, 18.60, 18.16; Mass found [M−HCl+H]$^+$=444.1; [M−HCl+Na]$^+$=466.1.

(E)-2-(2-amino-4-methylpentanamido)ethyl (4-(3,5-dimethoxystyryl)phenyl) carbonate hydrochloride (5d)

5d was obtained from 4d, using the same synthetic procedure as 5a.

Yield 95%. $^1$H-NMR (CD$_3$OD, 500 MHz), δ(ppm): 7.58 (d, J=8.5 Hz, 2H), 7.18 (d, J=8.5 Hz, 2H), 7.15 (d, J=16.5 Hz, 1H), 7.08 (d, J=16.5 Hz, 1H), 6.71 (d, J=2.0 Hz, 2H), 6.40 (t, J=2.0 Hz, 1H), 4.40-4.30 (m, 2H), 3.88-3.86 (m, 1H), 3.80 (s, 6H), 3.72-3.67 (m, 1H), 3.55-3.50 (m, 1H), 1.75-1.67 (m, 3H), 1.00 (t, J=5.5 Hz, 6H); $^{13}$C-NMR (CD$_3$OD, 125 MHz), δ(ppm): 169.66, 161.15, 153.61, 150.51, 139.19, 135.49, 128.98, 127.42, 127.18, 120.92, 104.23, 99.61, 66.53, 54.39, 51.70, 43.34, 38.21, 24.05, 21.61, 20.82; Mass found [M−HCl+H]$^+$=457.2; [2M−2HCl+H]$^+$=913.3.

(E)-2-(2-amino-3-methylpentanamido)ethyl (4-(3,5-dimethoxystyryl)phenyl) carbonate hydrochloride (5e)

5e was obtained from 4e, using the same synthetic procedure as 5a.

Yield 98%. $^1$H-NMR (CD$_3$OD, 500 MHz), δ(ppm): 7.59 (d, J=8.5 Hz, 2H), 7.17 (d, J=8.5 Hz, 2H), 7.15 (d, J=16.5 Hz, 1H), 7.08 (d, J=16.5 Hz, 1H), 6.71 (d, J=2.0 Hz, 2H), 6.40 (t, J=2.0 Hz, 1H), 4.40-4.36 (m, 1H), 4.33-4.28 (m, 1H), 3.80 (s, 6H), 3.78-3.72 (m, 2H), 3.52-3.47 (m, 1H), 1.95-1.92 (m, 1H), 1.63-1.58 (m, 1H), 1.28-1.22 (m, 1H), 1.05 (d, J=7.0 Hz, 3H), 0.98 (t, J=7.0 Hz, 3H); $^{13}$C-NMR (CD$_3$OD, 125 MHz), δ(ppm): 168.41, 161.15, 153.56, 150.50, 139.19, 135.49, 128.97, 127.43, 127.18, 120.92, 104.23, 99.61, 66.60, 57.68, 54.39, 38.05, 36.62, 24.19, 13.66, 10.32; Mass found [M−HCl+H]$^+$=457.2; [2M−2HCl+H]$^+$=913.3.

(E)-2-(2-amino-4-(methylthio)butanamido)ethyl (4-(3,5-dimethoxystyryl)phenyl) carbonate hydrochloride (5f)

5f was obtained from 4f, using the same synthetic procedure as 5a.

Yield 85%. $^1$H-NMR (CD$_3$OD, 500 MHz), δ(ppm): 7.59 (d, J=8.5 Hz, 2H), 7.19 (d, J=8.5 Hz, 2H), 7.15 (d, J=16.5 Hz, 1H), 7.08 (d, J=16.5 Hz, 1H), 6.71 (d, J=2.0 Hz, 2H), 6.40 (t, J=2.0 Hz, 1H), 4.42-4.38 (m, 1H), 4.33-4.28 (m, 1H), 3.99 (t, J=6.5 Hz, 1H), 3.80 (s, 6H), 3.78-3.73 (m, 1H), 3.52-3.47 (m, 1H), 2.60 (t, J=7.5 Hz, 2H), 2.18-2.11 (m, 2H), 2.09 (s, 3H); $^{13}$C-NMR (CD$_3$OD, 125 MHz), δ(ppm): 168.70, 161.14, 153.62, 150.49, 139.18, 135.49, 128.97, 127.43, 127.18, 120.99, 104.21, 99.60, 66.58, 54.39, 52.32, 38.21, 30.70, 28.33, 13.69; Mass found [M−HCl+H]$^+$=476.2; [M−HCl+Na]$^+$=498.2; [2M−2HCl+H]$^+$=950.4.

(E)-2-(2-amino-3-hydroxypropanamido)ethyl (4-(3,5-dimethoxystyryl)phenyl) carbonate hydrochloride (5g)

5g was obtained from 4g, using the same synthetic procedure as 5a.

Yield 76%. $^1$H-NMR (CD$_3$OD, 500 MHz), δ(ppm): 7.58 (d, J=9.0 Hz, 2H), 7.18 (d, J=9.0 Hz, 2H), 7.14 (d, J=16.5 Hz, 1H), 7.07 (d, J=16.5 Hz, 1H), 6.71 (d, J=2.0 Hz, 2H), 6.40 (t, J=2.0 Hz, 1H), 4.34 (t, J=5.0 Hz, 2H), 3.98-3.94 (m, 2H), 3.86-3.81 (m, 11H), 3.80 (s, 6H), 3.62-3.60 (m, 2H); $^{13}$C-NMR (CD$_3$OD, 125 MHz), δ(ppm): 167.21, 161.13, 153.69, 150.51, 139.20, 135.47, 128.96, 127.44, 127.19, 120.97, 104.23, 99.61, 66.64, 60.30, 54.93, 54.40, 38.29; Mass found [M−HCl+H]$^+$=431.2; [2M−2HCl+H]$^+$=861.2.

(E)-2-(2-amino-3-hydroxybutanamido)ethyl (4-(3,5-dimethoxystyryl)phenyl) carbonate hydrochloride (5h)

5h was obtained from 4h, using the same synthetic procedure as 5a.
Yield 74%. $^1$H-NMR (CD$_3$OD, 500 MHz), δ(ppm): 7.58 (d, J=8.5 Hz, 2H), 7.17 (d, J=8.5 Hz, 2H), 7.15 (d, J=16.0 Hz, 1H), 7.07 (d, J=16.0 Hz, 1H), 6.71 (d, J=2.0 Hz, 2H), 6.40 (t, J=2.0 Hz, 1H), 4.38-4.31 (m, 2H), 4.06-4.01 (m, 1H), 3.80 (s, 6H), 3.72-3.65 (m, 2H), 3.58-3.53 (m, 1H), 1.31 (d, J=6.0 Hz, 3H); $^{13}$C-NMR (CD$_3$OD, 125 MHz), δ(ppm): 167.54, 161.14, 153.58, 150.50, 139.19, 135.49, 128.97, 127.43, 127.18, 120.95, 104.23, 99.61, 66.61, 65.97, 59.12, 54.40, 38.14, 18.91; Mass found [M−HCl+H]$^+$=445.2; [2M−2HCl+H]$^+$=889.2.

(E)-2-(2-amino-3-mercaptopropanamido)ethyl (4-(3,5-dimethoxystyryl)phenyl) carbonate hydrochloride (5i)

To a stirred solution of compound 4i (760 mg, 1.0 mmol) in DCM (15 mL) was added TFA (14.9 mL) and triisopropylsilane (TIPS, 790 μL, 3.9 mmol), the resulting mixture was stirred at room temperature for 2 h. Then the reaction solution was evaporated and subjected to prep-HPLC purification (TFA as a buffer, detailed gradient elution, please see the information below). Then the aqueous fraction was treated with several drops of concentrate HCl and lyophilized to afford compound 5i (354 mg, 76%) as a white solid. $^1$H-NMR (CD$_3$OD, 500 MHz), δ(ppm): 7.58 (d, J=9.0 Hz, 2H), 7.18 (d, J=9.0 Hz, 2H), 7.15 (d, J=16.5 Hz, 1H), 7.08 (d, J=16.5 Hz, 1H), 6.71 (d, J=1.5 Hz, 2H), 6.40 (s, 1H), 4.41-4.37 (m, 1H), 4.34-4.30 (m, 1H), 4.05 (t, J=5.5 Hz, 1H), 3.80 (s, 6H), 3.74-3.69 (m, 1H), 3.57-3.52 (m, 1H), 3.06 (dd, J=5.5, 14.5 Hz, 1H), 2.98 (dd, J=6.5, 15.0 Hz, 1H); $^{13}$C-NMR (CD$_3$OD, 125 MHz), δ(ppm): 167.31, 161.14, 153.63, 150.50, 139.19, 135.50, 128.97, 127.43, 127.18, 120.97, 104.23, 99.62, 66.61, 54.69, 54.39, 38.28, 24.96; Mass found [M−HCl+H]=448.2; [M−HCl+Na]$^+$=470.2; [2M−2HCl+H]$^+$=894.4.

Column: Inertsil ODS-3 C18, 5 μm, 30*250 mm
Flow: 38 mL/min
Solvent A: 10% ACN in H$_2$O+0.1% TFA
Solvent B: 90% ACN in H$_2$O+0.1% TFA
Gradient.

| Time (min) | Flow (ml/min) | % A | % B |
|---|---|---|---|
| 0 | 38 | 100 | 0 |
| 20 | 38 | 0 | 100 |
| 24 | 38 | 0 | 100 |
| 28 | 38 | 100 | 0 |
| 30 | 38 | 100 | 0 |

(E)-2-(2-amino-3-phenylpropanamido)ethyl (4-(3,5-dimethoxystyryl)phenyl) carbonate hydrochloride (5j)

5j was obtained from 4j, using the same synthetic procedure as 5a.
Yield 90%. $^1$H-NMR (CD$_3$OD, 500 MHz), δ(ppm): 7.58 (d, J=8.5 Hz, 2H), 7.38-7.35 (m, 2H), 7.31-7.29 (m, 3H), 7.18 (d, J=8.5 Hz, 2H), 7.14 (d, J=16.5 Hz, 1H), 7.07 (d, J=16.5 Hz, 1H), 6.71 (d, J=2.0 Hz, 2H), 6.40 (d, J=2.0 Hz, 1H), 4.24-4.20 (m, 2H), 4.07 (t, J=7.5 Hz, 1H), 3.80 (s, 6H), 3.65-3.60 (m, 1H), 3.48-3.44 (m, 1H), 3.19 (dd, J=7.5, 14.0 Hz, 1H), 3.09 (dd, J=7.5, 14.0 Hz, 1H); $^{13}$C-NMR (CD$_3$OD, 125 MHz), δ(ppm): 168.49, 161.14, 153.51, 150.50, 139.19, 135.49, 134.15, 129.12, 128.98, 128.71, 127.48, 127.42, 127.19, 120.92, 104.23, 99.61, 66.66, 54.40, 54.40, 38.02, 37.29; Mass found [M−HCl+H]=491.3; [M−HCl+Na]$^+$=513.2.

(E)-2-(2-amino-3-(4-hydroxyphenyl)propanamido)ethyl (4-(3,5-dimethoxy styryl)phenyl) carbonate hydrochloride (5k)

5k was obtained from 4k, using the same synthetic procedure as 5a.
Yield 84%. $^1$H-NMR (CD$_3$OD, 500 MHz), δ(ppm): 7.57 (d, J=8.5 Hz, 2H), 7.18 (d, J=8.5 Hz, 2H), 7.14 (d, J=16.5 Hz, 1H), 7.11 (d, J=9.0 Hz, 2H), 7.06 (d, J=16.5 Hz, 1H), 6.79 (d, J=9.0 Hz, 2H), 6.71 (d, J=2.0 Hz, 2H), 6.40 (s, 1H), 4.27-4.24 (m, 2H), 4.00 (t, J=7.5 Hz, 1H), 3.80 (s, 6H), 3.66-3.61 (m, 1H), 3.50-3.45 (m, 1H), 3.10 (dd, J=7.0, 14.0 Hz, 1H), 2.98 (dd, J=7.0, 14.0 Hz, 1H); $^{13}$C-NMR (CD$_3$OD, 125 MHz), δ(ppm): 168.67, 161.14, 156.89, 153.57, 150.51, 139.19, 135.47, 130.22, 128.96, 127.43, 127.18, 124.55, 121.00, 115.42, 104.22, 99.61, 66.68, 54.61, 54.39, 38.05, 36.54; Mass found [M−HCL+H]=507.2; [2M−2HCl+H]$^+$=1013.2.

(E)-2-(2-amino-3-(1H-indol-3-yl)propanamido)ethyl (4-(3,5-dimethoxystyryl)phenyl) carbonate hydrochloride (5l)

5l was obtained from 4l, using the same synthetic procedure as 5a.
Yield 78%. $^1$H-NMR (CD$_3$OD, 500 MHz), δ(ppm): 7.65 (d, J=8.0 Hz, 1H), 7.55 (d, J=8.0 Hz, 2H), 7.39 (d, J=8.5 Hz, 1H), 7.23 (s, 1H), 7.17-7.15 (m, 3H), 7.12 (d, J=16.5 Hz, 1H), 7.10 (d, J=16.5 Hz, 1H), 7.06-7.03 (m, 1H), 6.70 (d, J=2.0 Hz, 2H), 6.40 (s, 1H), 4.25-4.21 (m, 1H), 4.18-4.10 (m, 2H), 3.80 (s, 6H), 3.60-3.55 (m, 1H), 3.50-3.45 (m, 1H), 3.39 (dd, J=6.5, 15.0 Hz, 1H), 3.25 (dd, J=8.0, 15.0 Hz, 1H); $^{13}$C-NMR (CD$_3$OD, 125 MHz), δ(ppm): 169.10, 161.13, 153.54, 150.50, 139.18, 136.88, 135.47, 128.95, 127.41, 127.17, 126.91, 124.19, 121.52, 120.95, 118.88, 117.69, 111.26, 106.58, 104.22, 99.61, 66.53, 54.40, 54.38, 53.74, 38.17, 27.51; Mass found [M−HCl+H]$^+$=530.3; [2M−2HCl+H]$^+$=1059.4.

(E)-2-(2-amino-3-(1H-imidazol-2-yl)propanamido)ethyl (4-(3,5-dimethoxy styryl) phenyl) carbonate dihydrochloride (5m)

5m was obtained from 4m, using the same synthetic procedure as 5a.
Yield 82%. $^1$H-NMR (CD$_3$OD, 500 MHz), δ(ppm): 8.90 (s, 1H), 7.59 (d, J=8.5 Hz, 2H), 7.53 (s, 11H), 7.20 (d, J=8.5 Hz, 2H), 7.15 (d, J=16.5 Hz, 1H), 7.08 (d, J=16.5 Hz, 11H), 6.71 (d, J=2.0 Hz, 2H), 6.41 (t, J=2.0 Hz, 1H), 4.36-4.32 (m, 11H), 4.31-4.27 (m, 2H), 3.81 (s, 6H), 3.71-3.66 (m, 11H), 3.55-3.50 (m, 1H), 3.42-3.35 (m, 2H); $^{13}$C-NMR (CD$_3$OD, 125 MHz), δ(ppm): 167.46, 161.15, 153.55, 150.48, 139.17, 135.54, 134.43, 129.00, 127.40, 127.18, 126.62, 121.05, 118.36, 104.23, 99.61, 66.58, 54.40, 51.96, 38.30, 26.20; Mass found [M−HCl+H]$^+$ 482.2; [M−HCl+Na]$^+$=504.1; [2M−2HCl+H]$^+$=962.3.

(E)-2-(2,6-diaminohexanamido)ethyl (4-(3,5-dimethoxystyryl)phenyl) carbonate dihydrochloride (5n)

5n was obtained from 4n, using the same synthetic procedure as 5a.

Yield 78%. H-NMR (CD$_3$OD, 500 MHz), δ(ppm): 7.60 (d, J=8.5 Hz, 2H), 7.20 (d, J=8.5 Hz, 2H), 7.16 (d, J=16.5 Hz, 11H), 7.09 (d, J=16.5 Hz, 11H), 6.72 (d, J=2.0 Hz, 2H), 6.41 (s, 1H), 4.42-4.38 (m, 1H), 4.35-4.30 (m, 1H), 3.93 (t, J=6.5 Hz, 1H), 3.80 (s, 6H), 3.75-3.70 (m, 1H), 3.56-3.51 (m, 1H), 2.93 (t, J=8.0 Hz, 2H), 1.97-1.87 (m, 2H), 1.75-1.69 (m, 2H), 1.56-1.50 (m, 2H); $^{13}$C-NMR (CD$_3$OD, 125 MHz), δ(ppm): 168.97, 161.15, 153.63, 150.50, 139.18, 135.54, 129.01, 127.41, 127.21, 121.03, 104.23, 99.60, 66.68, 54.42, 54.39, 52.81, 38.88, 38.17, 30.66, 26.71, 21.44; Mass found [M−2HCl+H]$^+$=472.2.

(E)-2-(2-amino-5-guanidinopentanamido)ethyl (4-(3,5-dimethoxystyryl) phenyl) carbonate dihydrochloride (5o)

5o was obtained from 4o, using the same synthetic procedure as 5i.

Yield 64%. $^1$H-NMR (CD$_3$OD, 500 MHz), δ(ppm): 7.58 (d, J=7.5 Hz, 2H), 7.19 (d, J=7.5 Hz, 2H), 7.14 (d, J=16.5 Hz, 1H), 7.06 (d, J=16.5 Hz, 11H), 6.70 (s, 2H), 6.39 (s, 1H), 4.37-4.33 (m, 2H), 3.96 (s, 1H), 3.79 (s, 6H), 3.72-3.69 (m, 1H), 3.60-3.55 (m, 1H), 3.22 (s, 2H), 1.94 (s, 2H), 1.71 (s, 2H); $^{13}$C-NMR (CD$_3$OD, 125 MHz), δ(ppm): 168.87, 161.12, 157.19, 153.70, 150.49, 139.18, 135.50, 128.98, 127.43, 127.22, 121.05, 104.24, 99.63, 66.69, 54.42, 52.64, 40.43, 38.21, 28.31, 23.92; Mass found [M−2HCl+H]$^+$=500.1.

(E)-2-(2,4-diamino-4-oxobutanamido)ethyl (4-(3,5-dimethoxystyryl)phenyl) carbonate hydrochloride (5p)

5p was obtained from 4p, using the same synthetic procedure as 5i.

Yield 68%. $^1$H-NMR (CD$_3$OD, 500 MHz), δ(ppm): 7.59 (d, J=8.5 Hz, 2H), 7.19 (d, J=8.5 Hz, 2H), 7.16 (d, J=16.5 Hz, 11H), 7.08 (d, J=16.5 Hz, 11H), 6.71 (d, J=2.5 Hz, 2H), 6.41 (t, J=2.5 Hz, 1H), 4.35-4.32 (m, 2H), 4.22-4.19 (m, 1H), 3.80 (s, 6H), 3.67-3.60 (m, 1H), 3.59-3.55 (m, 1H), 2.90 (dd, J=4.5, 17.5 Hz, 1H), 2.79 (dd, J=4.0, 17.0 Hz, 11H); $^{13}$C-NMR (CD$_3$OD, 125 MHz), δ(ppm): 171.80, 168.41, 161.14, 153.69, 150.50, 139.18, 135.50, 128.97, 127.42, 127.19, 120.99, 104.22, 99.59, 66.65, 54.39, 49.90, 38.29, 34.82; Mass found [M−HCl+H]$^+$=459.2; [M−HCl+Na]$^+$=481.1; [2M−2HCl+H]$^+$=916.4.

(E)-2-(2,5-diamino-5-oxopentanamido)ethyl (4-(3,5-dimethoxystyryl)phenyl) carbonate hydrochloride (5q)

5q was obtained from 4q, using the same synthetic procedure as 5i.

Yield 62%. $^1$H-NMR (CD$_3$OD, 500 MHz), δ(ppm): 7.58 (d, J=8.5 Hz, 2H), 7.18 (d, J=8.5 Hz, 2H), 7.15 (d, J=16.5 Hz, 1H), 7.08 (d, J=16.5 Hz, 1H), 6.71 (s, 2H), 6.40 (s, 1H), 4.41-4.35 (m, 1H), 4.34-4.30 (m, 1H), 3.97 (t, J=6.5 Hz, 1H), 3.80 (s, 6H), 3.72-3.68 (m, 1H), 3.58-3.53 (m, 1H), 2.50-2.47 (m, 2H), 2.16-2.09 (m, 2H); $^{13}$C-NMR (CD$_3$OD, 125 MHz), δ(ppm): 175.66, 168.78, 161.14, 153.64, 150.50, 139.20, 135.50, 128.97, 127.45, 127.19, 121.00, 104.23, 99.64, 66.66, 54.40, 52.65, 38.21, 30.19, 26.78; Mass found [M−HCl+H]$^+$=473.3; [M−HCl+Na]$^+$=495.3; [2M−2HCl+H]$^+$=944.6.

(E)-3-amino-4-((2-(((4-(3,5-dimethoxystyryl)phenoxy)carbonyl)oxy)ethyl)amino)-4-oxobutanoic acid hydrochloride (5r)

5r was obtained from 4r, using the same synthetic procedure as 5a.

Yield 82%. $^1$H-NMR (CD$_3$OD, 500 MHz), δ(ppm): 7.59 (d, J=8.5 Hz, 2H), 7.18 (d, J=8.5 Hz, 2H), 7.15 (d, J=16.5 Hz, 1H), 7.07 (d, J=16.5 Hz, 1H), 6.71 (d, J=2.0 Hz, 2H), 6.40 (t, J=2.0 Hz, 1H), 4.37-4.32 (m, 2H), 4.22-4.19 (m, 1H), 3.80 (s, 6H), 3.69-3.64 (m, 1H), 3.58-3.54 (m, 1H), 2.99 (dd, J=4.0, 18.0 Hz, 1H), 2.89 (dd, J=4.0, 18.0 Hz, 1H); $^{13}$C-NMR (CD$_3$OD, 125 MHz), δ(ppm): 171.18, 168.13, 161.14, 153.67, 150.52, 139.19, 135.48, 128.96, 127.44, 127.18, 120.99, 104.23, 99.60, 66.54, 54.39, 49.63, 38.35, 34.60; Mass found [M−HCl+H]$^+$=459.1; [2M−2HCl+H]$^+$=917.2.

(E)-4-amino-5-((2-(((4-(3,5-dimethoxystyryl)phenoxy)carbonyl)oxy)ethyl)amino)-5-oxopentanoic acid hydrochloride (5s)

5s was obtained from 4s, using the same synthetic procedure as 5a.

Yield 88%. $^1$H-NMR (CD$_3$OD, 500 MHz), δ(ppm): 7.58 (d, J=8.5 Hz, 2H), 7.18 (d, J=8.5 Hz, 2H), 7.14 (d, J=16.5 Hz, 11H), 7.07 (d, J=16.5 Hz, 1H), 6.71 (d, J=2.0 Hz, 2H), 6.40 (s, 1H), 4.41-4.36 (m, 1H), 4.33-4.29 (m, 1H), 3.96 (t, J=6.5 Hz, 1H), 3.80 (s, 6H), 3.75-3.70 (m, 1H), 3.55-3.50 (m, 1H), 2.52 (t, J=7.5 Hz, 2H), 2.18-2.13 (m, 2H); $^{13}$C-NMR (CD$_3$OD, 125 MHz), δ(ppm): 174.27, 168.72, 161.12, 153.64, 150.51, 139.21, 135.45, 128.93, 127.47, 127.18, 121.00, 104.23, 99.60, 66.61, 54.43, 52.44, 38.15, 28.69, 26.30; Mass found [M−HCl+H]$^+$=473.0.

1-2-2. Synthesis of Target Compound 5t

Compound 5t was synthesized according to scheme 2 which is similar with scheme 1.

Scheme 2: Synthesis of compound 5t

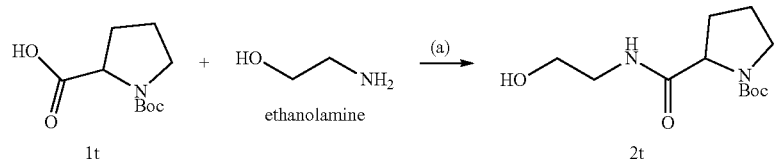

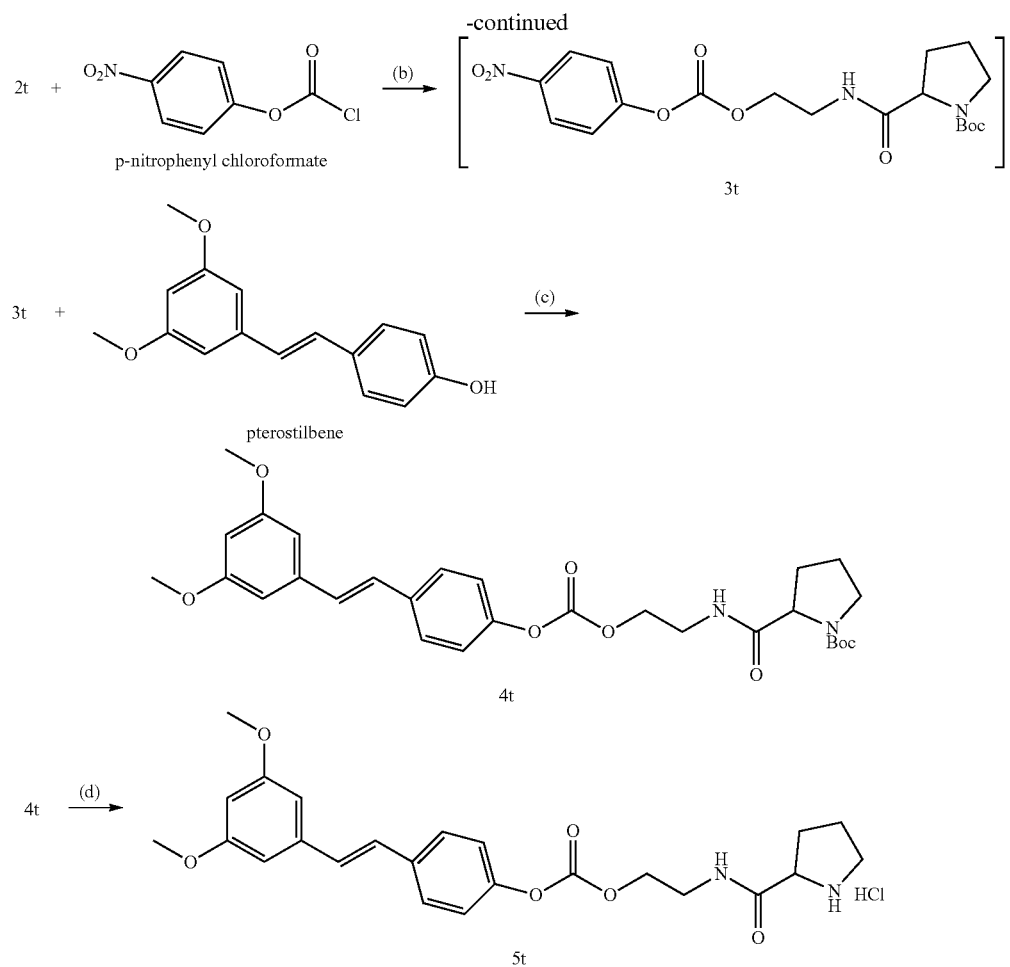

Reagants and conditions:
(a) HATU, DIPEA, CH$_2$Cl$_2$, 41%;
(b) NEt$_3$, CH$_2$Cl$_2$, 0° C.;
(c) DMAP, ACN, 50° C., 57%;
(d) 4M HCl in 1,4-dioxane, CH$_2$Cl$_2$, 92%.

(E)-4-(3,5-dimethoxystyryl)phenyl (2-(pyrrolidine-2-carboxamido)ethyl) carbonate hydrochloride (5t)

The compound of 5t was obtained from it, using the similar synthetic procedure as 5a.

A white powder. 92% yield. $^1$H-NMR (CD$_3$OD, 500 MHz), δ(ppm): 7.58 (d, J=9.0 Hz, 2H), 7.18 (d, J=9.0 Hz, 2H), 7.14 (d, J=16.5 Hz, 1H), 7.07 (d, J=16.5 Hz, 1H), 6.71 (d, J=2.0 Hz, 2H), 6.40 (t, J=2.0 Hz, 1H), 4.39-4.32 (m, 2H), 4.31-4.27 (m, 1H), 3.80 (s, 6H), 3.69-3.61 (m, 1H), 3.59-3.54 (m, 1H), 3.43-3.36 (m, 1H), 3.34-3.31 (m, 1H), 2.46-2.40 (m, 1H), 2.08-2.01 (m, 3H); $^{13}$C-NMR (CD$_3$OD, 125 MHz), δ(ppm): 168.66, 161.15, 153.67, 150.52, 139.18, 135.50, 128.98, 127.41, 127.18, 120.95, 104.23, 99.61, 66.62, 59.77, 54.39, 45.95, 38.46, 29.56, 23.59; Mass found [M−HCl+H]442.0; [M−HCl+Na]$^+$=464.1; [2M−2HCl+H]$^+$=882.4; [2M−2HCl+Na]$^+$=904.4.

1-2-3. Synthesis of Target Compound 5u

Compound 5u was synthesized according to scheme 3 which is similar with scheme 1.

Scheme 3: Synthesis of compound 5u

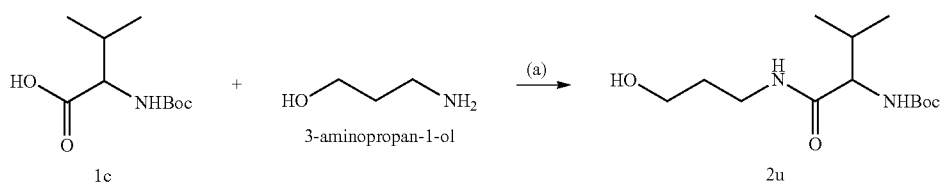

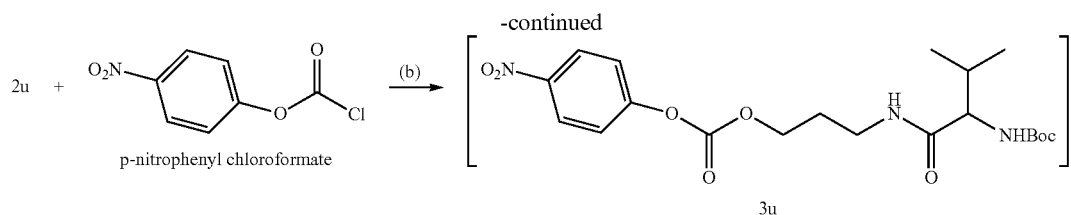

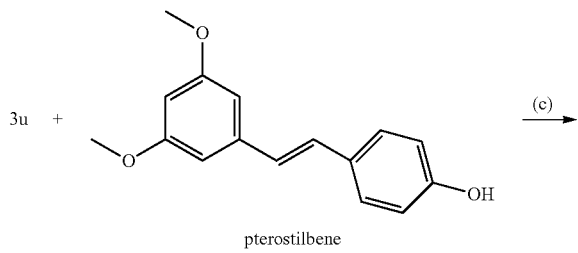

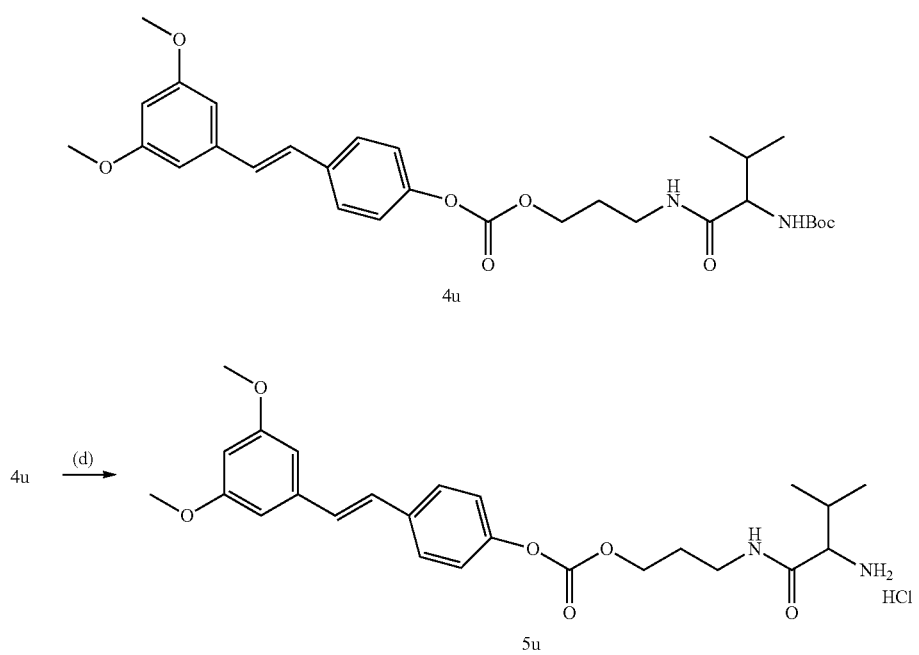

Reagents and conditions:
(a) EDCI, DIPEA, CH$_2$Cl$_2$, 45%;
(b) NEt$_3$, CH$_2$Cl$_2$, 0° C.;
(c) DMAP, ACN, 50° C., 33%;
(d) 4M HCl in dioxane, CH$_2$Cl$_2$, 90%.

(E)-3-(2-amino-3-methylbutanamido)propyl (4-(3,5-dimethoxystyryl)phenyl) carbonate hydrochloride (5u)

The compound of 5u was obtained from 1c and 3-aminopropan-1-ol using the similar synthetic procedure as 5a. A white powder. 90% yield. $^1$H-NMR (CD$_3$OD, 500 MHz), δ(ppm): 7.57 (d, J=8.5 Hz, 2H), 7.16 (d, J=8.5 Hz, 2H), 7.14 (d, J=16.5 Hz, 1H), 7.06 (d, J=16.5 Hz, 1H), 6.70 (d, J=1.5 Hz, 2H), 6.40 (s, 1H), 4.30 (t, J=6.5 Hz, 2H), 3.80 (s, 6H), 3.65 (d, J=5.5 Hz, 1H), 3.47-3.41 (m, 1H), 3.39-3.34 (m, 1H), 2.21-2.17 (m, 1H), 2.00-1.95 (m, 3H), 1.06 (t, J=7.5 Hz, 6H); $^{13}$C-NMR (CD$_3$OD, 125 MHz), δ(ppm): 168.22, 161.12, 153.66, 150.56, 139.21, 135.40, 128.91, 127.46, 127.18, 120.97, 104.23, 99.61, 65.92, 58.54, 54.40, 35.77, 30.05, 28.09, 17.51, 16.62; Mass found [M−HCl+H]$^+$=457.3; [M−HCl+Na]$^+$=479.2; [2M−2HCl+Na]$^+$=935.4.

1-2-4. Synthesis of Target Compounds 5v and 5w

As shown in scheme 4, compound 5a or 5c was neutralized with sodium carbonate and then treated with nicotinic acid to give the corresponding nicotinate salts 5v, 5w.

Scheme 4: Synthesis of compound 5v and 5w

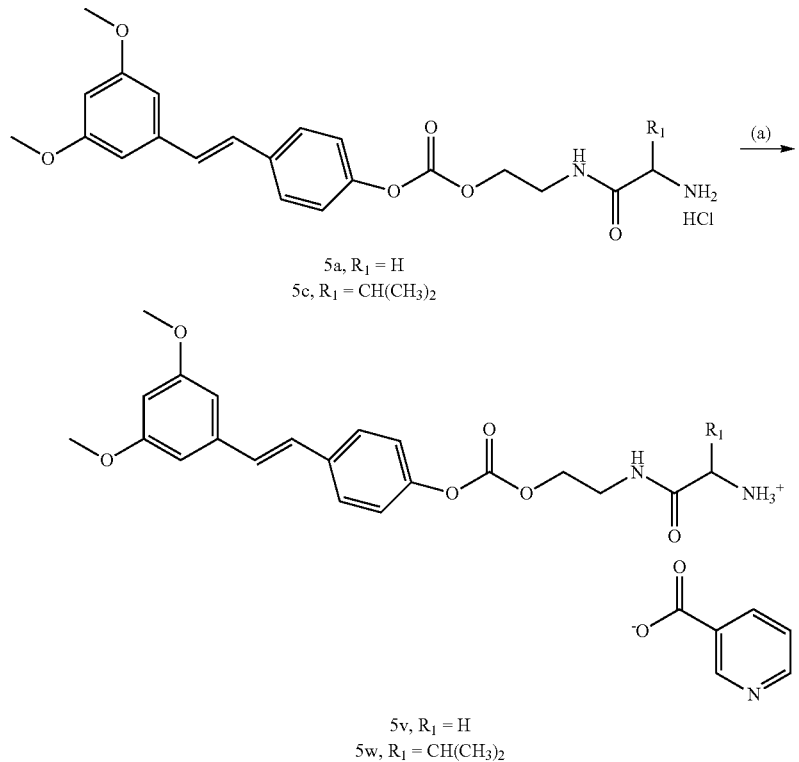

Reagants and conditions:
(a) 1. K₂CO₃, H₂O, CH₂Cl₂, 1 hr; 2. Nicotinic acid, ethanol, 3 hrs.

(E)-2-(2-aminoacetamido)ethyl (4-(3,5-dimethoxystyryl)phenyl) carbonate nicotinate (5v)

To a stirred solution of compound 5a (0.42 g, 1.0 mmol) in CH$_2$Cl$_2$ (20 ml) was added K$_2$CO$_3$ (0.182 g, 1.3 mmol) in H$_2$O (0.4 mL) and the reaction mixture was stirred at room temperature for 1 hr. The solvent was removed under vacuum to give free amine which was dissolved in 10 mL ethanol and nicotinic acid (0.145 g, 1.2 mmol) was added. The reaction mixture was stirred at room temperature for 3 hrs. The solvent was evaporated and the crude product was recrystallized from ethanol and dry ether to give the compound 5v as a white powder (0.39 g, 78% yield). $^1$H-NMR (CDCl$_3$, 500 MHz), δ(ppm): 9.07 (s, 1H), 8.57-8.56 (m, 1H), 8.34 (t, J=2.0 Hz, 1H), 7.59 (d, J=8.5 Hz, 2H), 7.47-7.44 (m, 1H), 7.18-7.14 (m, 3H), 7.08 (d, J=16.5 Hz, 1H), 6.72 (d, J=2.5 Hz, 2H), 6.41 (t, J=2.5 Hz, 1H), 4.33 (t, J=5.0 Hz, 2H), 3.81 (s, 6H), 3.68-3.66 (m, 2H), 3.61 (t, J=5.0 Hz, 2H).

(E)-2-(2-amino-3-methylbutanamido)ethyl (4-(3,5-dimethoxystyryl)phenyl) carbonate nicotinate (5w)

5w was obtained from 5c, using the same synthetic procedure as 5v.

A white powder. Yield 79%. $^1$H-NMR (CDCl$_3$, 500 MHz), δ(ppm): 9.19 (s, 1H), 8.70 (d, J=3.5 Hz, 1H), 8.32-8.30 (m, 1H), 7.47 (d, J=8.5 Hz, 2H), 7.40-7.37 (m, 1H), 7.13 (d, J=8.5 Hz, 2H), 7.03 (d, J=16.5 Hz, 1H), 6.96 (d, J=16.5 Hz, 1H), 6.63 (d, J=2.5 Hz, 2H), 6.38 (t, J=2.5 Hz, 1H), 4.33-4.28 (m, 2H), 3.80 (s, 6H), 3.67-3.62 (m, 2H), 3.56-3.53 (m, 1H), 2.20-2.05 (m, 1H), 1.02-0.90 (m, 6H).

1-2-5. Synthesis of Target Compounds 6a-6h

The compounds 6a-6h were synthesized according to scheme 5. As shown, the starting 4-hydroxybenzaldehydes (11a-11b) were treated with imidazole and TIPS to form the corresponding silyl ethers (12a-12b) which were reduced with NaBH$_4$ to give the corresponding carbinols (13a-13b). Compounds 13a-13b were treated with triethyl phosphite and ZnI$_2$ to afford the corresponding phosphonates (14a-14b). Compounds 14a-14b were coupled with commercial available aldehydes (15a-15d), respectively, to yield the corresponding 16a-16d which subsequently treated with Bu$_4$NF in THF to give the desired compounds 17a-17d. On the other hand, compounds 2a, 2c and 2j were reacted with p-nitrophenyl chloroformate to yield the corresponding 18a, 18c and 18j which without further purification were reacted separately with 17a-17d in the present of DMAP to give the corresponding carbonates 19a-19h. Subsequent deprotection of 19a-19h with 4 M HCl in 1,4-dioxane to afford the target compounds 6a-6h.

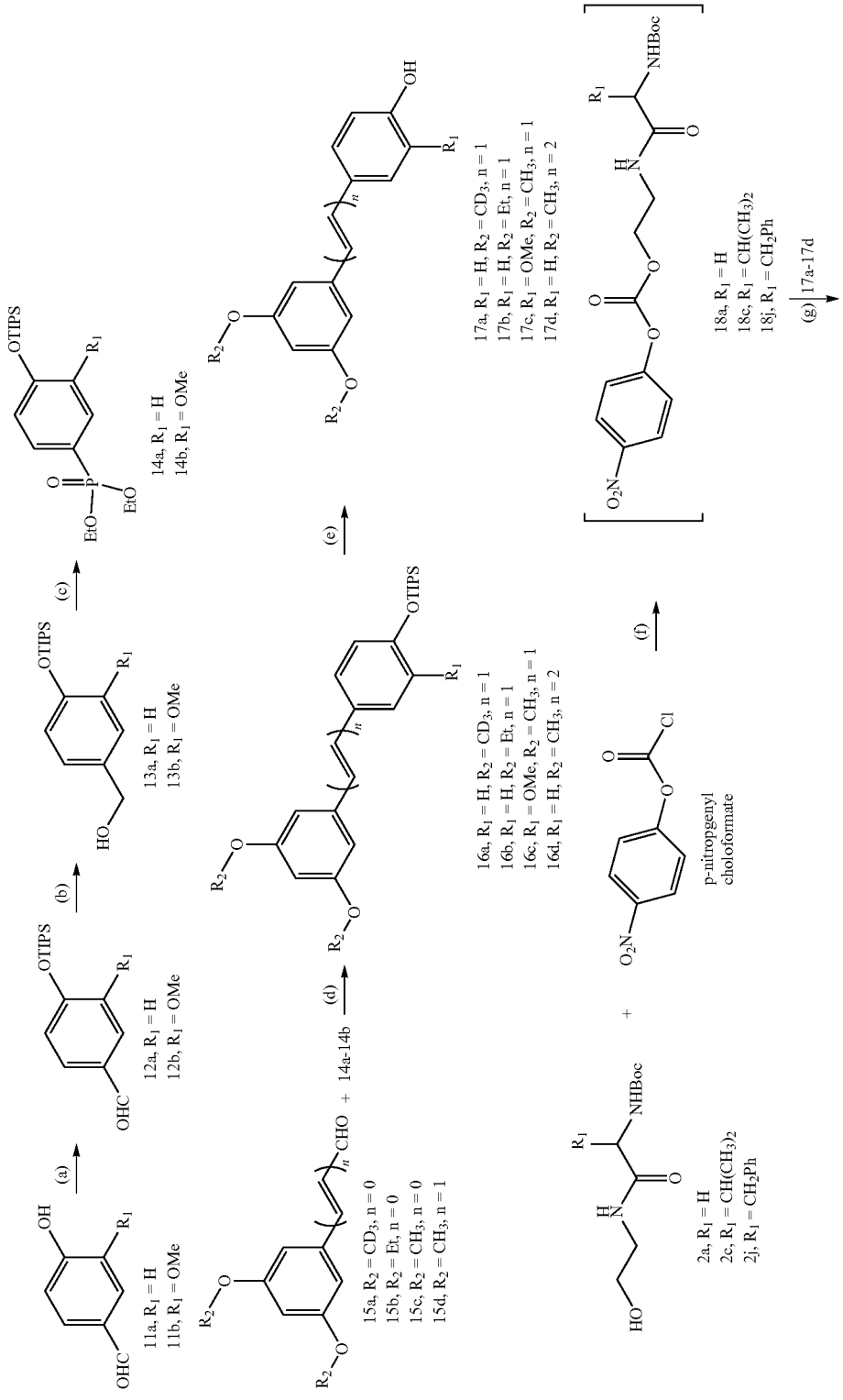

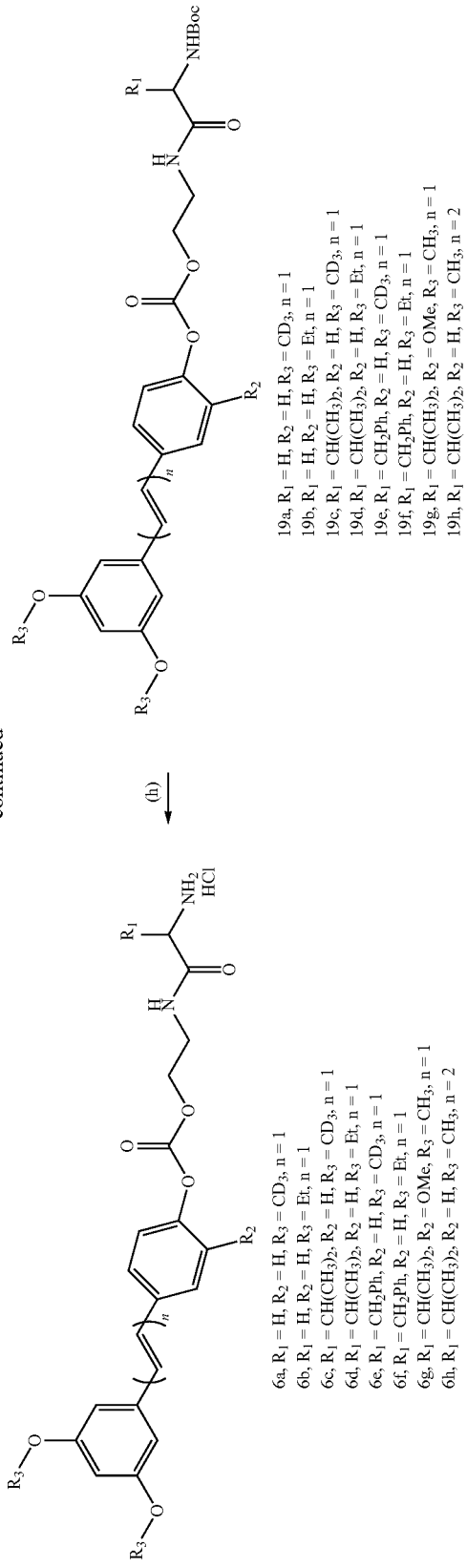
Reagents and conditions:
(a) imidazole, TIPSCl, CH₂Cl₂, 16 h;
(b) NaBH₄, THF, MeOH, 0° C., 1 h;
(c) ZnI₂, triethyl phosphite, THF, 80° C., 16 h
(d) t-BuOK, THF, 0° C., 3 h;
(e) 1.0M Bu₄NF in THF, THF;
(f) NEt₃, CH₂Cl₂, 0° C.;
(g) DMAP, ACN, 50° C.;
(h) 4M HCl in 1,4-dioxane, CH₂Cl₂.

4-((triisopropylsilyl)oxy)benzaldehyde (12a)

To a solution of 4-hydroxybenzaldehyde 11a (50 g, 409.8 mmol) in DCM (500 mL) was added imidazole (41.8 g, 614.7 mmol), followed by dropwise addition of TIPSCl (86.5 g, 450.8 mmol). The mixture was stirred for 16 hrs and poured into ice/water, extracted with DCM. The organic layers were washed with brine, dried over $Na_2SO_4$ and evaporated. The residue was purified by silica gel column chromatography (eluting solvent: ethyl acetate/petroleum ether=1/50) to give compound 12a (95 g, 99%) as a yellow oil. $^1$H-NMR (CDCl$_3$, 500 MHz), δ(ppm): 9.88 (s, 1H, CHO), 7.78 (dd, J=2.0, 8.5 Hz, 2H), 6.98 (d, J=8.5 Hz, 2H), 1.32-1.25 (m, 3H), 1.11 (d, J=8.0 Hz, 18H).

3-methoxy-4-((triisopropylsilyl)oxy)benzaldehyde (12b)

12b was obtained from 11b, using the same synthetic procedure as 12a.

A yellow oil. 98% yield. $^1$H-NMR (CDCl$_3$, 500 MHz), δ(ppm): 9.83 (s, 1H, CHO), 7.39 (d, J=1.5 Hz, 1H), 7.35 (dd, J=1.5, 8.0 Hz, 1H), 6.98 (d, J=8.0 Hz, 1H), 3.87 (s, 3H), 1.31-1.25 (m, 3H), 1.09 (d, J=7.5 Hz, 18H).

(4-((triisopropylsilyl)oxy)phenyl)methanol (13a)

To a solution of compound 12a (100 g, 359.7 mmol) in MeOH/THF (1:1, 1 L) was added NaBH$_4$ (27.3 g, 719.4 mmol) at 0° C. and stirred for 1 hr. The reaction mixture was poured into ice/water and extracted with DCM. The organic layers were washed with brine, dried over $Na_2SO_4$ and evaporated. The residue was purified by silica gel column chromatography (eluting solvent: ethyl acetate/petroleum ether=1/20) to give compound 13a (88 g, 99% yield) as a yellow oil. $^1$H-NMR (CDCl$_3$, 500 MHz), δ(ppm): 7.21 (d, J=8.5 Hz, 2H), 6.86 (d, J=8.5 Hz, 2H), 4.60 (d, J=5.0 Hz, 2H), 1.29-1.22 (m, 3H), 1.10-1.06 (m, 18H).

(3-methoxy-4-((triisopropylsilyl)oxy)phenyl)methanol (13b)

13b was obtained from 12b, using the same synthetic procedure as 13a.

A yellow oil. 95% yield. $^1$H-NMR (CDCl$_3$, 500 MHz), δ(ppm): 6.89 (s, 1H), 6.84 (d, J=8.0 Hz, 1H), 6.78 (d, J=8.0 Hz, 1H), 4.61 (s, 2H), 3.81 (s, 3H), 1.57 (s, 1H), 1.28-1.22 (m, 3H), 1.09 (d, J=7.5 Hz, 18H).

Diethyl (4-((triisopropylsilyl)oxy)benzyl)phosphonate (14a)

To a solution of compound 13a (85 g, 303.6 mmol) in THF (850 mL) was added ZnI$_2$ (145.3 g, 455.4 mmol) and triethyl phosphite (100.8 g, 607.2 mmol). The mixture was refluxed for 16 hrs and evaporated. The residue was added 2 N NaOH (500 mL) and extracted with ether. The organic layers were washed with brine, dried over $Na_2SO_4$ and evaporated. The residue was purified by silica gel column chromatography (eluting solvent: ethyl acetate/petroleum ether=1/30) to give compound 14a (90 g, 75% yield) as a yellow oil. $^1$H-NMR (CDCl$_3$, 500 MHz), δ(ppm): 7.16 (dd, J=2.5, 8.5 Hz, 2H), 6.81 (d, J=8.5 Hz, 2H), 4.07-4.03 (m, 4H), 3.20 (d, J=21.0 Hz, 2H), 1.65-1.21 (m, 9H), 1.08 (d, J=7.0 Hz, 18H).

Diethyl (3-methoxy-4-((triisopropylsilyl)oxy)benzyl) phosphonate (14b)

14b was obtained from 13b, using the same synthetic procedure as 14a.

A yellow oil. 78% yield. $^1$H-NMR (CDCl$_3$, 500 MHz), δ(ppm): 6.83-6.79 (m, 2H), 6.71 (d, J=8.0 Hz, 1H), 4.17-3.90 (m, 4H), 3.79 (s, 3H), 3.07 (d, J=21.0 Hz, 2H), 1.38-1.19 (m, 9H), 1.08-1.03 (m, 18H).

(E)-(4-(3,5-bis(methoxy-d3)styryl-d6)phenoxy)triisopropylsilane (16a)

To a solution of compound 14a (7.0 g, 17.5 mmol) in THF (175 mL) was added compound 15a (3.0 g, 17.5 mmol) and t-BuOK (4.1 g, 36.7 mmol) at 0° C. and was stirred for 3 hrs at 0° C. The reaction mixture was poured into ice/water and extracted with EA. The organic layers were washed with brine, dried over $Na_2SO_4$ and evaporated. The residue was purified by silica gel column chromatography (eluting solvent: ethyl acetate/n-hexane=1/8) to give compound 16a (5.6 g, 76% yield) as a white solid. $^1$H-NMR (CDCl$_3$, 500 MHz), δ(ppm): 7.37 (d, J=8.0 Hz, 2H), 7.03 (d, J=16.5 Hz, 1H), 6.91-6.86 (m, 3H), 6.65 (s, 2H), 6.37 (d, J=2.0 Hz, 1H), 1.29-1.24 (m, 3H), 1.12 (d, J=7.5 Hz, 18H).

(E)-(4-(3,5-diethoxystyryl)phenoxy)triisopropylsilane (16b)

16b was obtained from 14b and 15b, using the same synthetic procedure as 16a.

A white powder. 75% yield. $^1$H-NMR (CDCl$_3$, 500 MHz), δ(ppm): 7.36 (d, J=8.5 Hz, 2H), 7.01 (d, J=16.0 Hz, 1H), 6.88 (d, J=16.0 Hz, 1H), 6.87 (d, J=8.5 Hz, 2H), 6.63 (d, J=2.0 Hz, 2H), 6.37 (t, J=2.0 Hz, 1H), 4.05 (q, J=7.0 Hz, 4H), 1.43 (t, J=7.0 Hz, 6H), 1.29-1.25 (m, 3H), 1.11 (d, J=7.5 Hz, 18H).

(E)-(4-(3,5-dimethoxystyryl)-2-methoxyphenoxy) triisopropylsilane (16c)

16c was obtained from 14c and 15c, using the same synthetic procedure as 16a.

A white solid. 78% yield. $^1$H-NMR (CDCl$_3$, 500 MHz), δ(ppm): 7.03-7.00 (m, 2H), 6.96 (d, J=8.0 Hz, 1H), 6.91 (s, 1H), 6.88-6.85 (m, 1H), 6.65 (s, 2H), 6.38 (s, 1H), 3.87 (s, 3H), 3.83 (s, 6H), 1.30-1.23 (m, 3H), 1.11 (d, J=7.5 Hz, 18H).

(E)-(4-(3,5-dimethoxystyryl)-2-methoxyphenoxy) triisopropylsilane (16d)

16d was obtained from 14d and 15d, using the same synthetic procedure as 16a.

A pale yellow solid. 77% yield. $^1$H-NMR (CDCl$_3$, 500 MHz), δ(ppm): 7.30 (d, J=9.0 Hz, 2H), 6.91 (dd, J=10.5, 16.5 Hz, 1H), 6.84 (d, J=9.0 Hz, 2H), 6.81 (dd, J=10.5, 16.5 Hz, 1H), 6.62 (d, J=16.5 Hz, 1H), 6.59 (d, J=2.0 Hz, 2H), 6.55 (d, J=16.5 Hz, 1H), 6.36 (t, J=2.0 Hz, 1H), 3.81 (s, 6H), 1.30-1.22 (m, 3H), 1.11 (d, J=7.5 Hz, 18H).

(E)-4-(3,5-bis(methoxy-d3)styryl-d6)phenol (17a)

A solution of compound 16a (0.80 g, 1.9 mmol) in dry THF (15 mL) and tetra-butylammonium fluoride (1.0 M in THF, 2.50 mL, 2.5 mmol) was stirred under a N$_2$ atmosphere for 2 hrs at room temperature. The reaction mixture was diluted with EtOAc and the organic layer was washed with water. The organic layer was dried over $Na_2SO_4$ and evaporated and the residue was purified by column chromatography on silica gel (eluting solvent: ethyl acetate/n-hexane=1/8) to give the product 17a (0.46 g, 91% yield) as a white powder. $^1$H-NMR (CDCl$_3$, 500 MHz), δ(ppm): 7.39 (d, J=8.5 Hz, 2H), 7.03 (d, J=16.5 Hz, 1H), 6.92-6.82 (m, 3H), 6.65 (d, J=2.5 Hz, 2H), 6.38 (t, J=2.5 Hz, 1H).

(E)-4-(3,5-diethoxystyryl)phenol (17b)

17b was obtained from 16b, using the same synthetic procedure as 17a.

A white powder. $^1$H-NMR (CDCl$_3$, 500 MHz), δ(ppm): 7.38 (d, J=8.5 Hz, 2H), 7.01 (d, J=16.0 Hz, 1H), 6.89-6.81 (m, 3H), 6.63 (d, J=2.5 Hz, 2H), 6.37 (t, J=2.5 Hz, 1H), 4.08-4.04 (m, 4H), 1.42 (t, J=7.5 Hz, 6H).

(E)-4-(3,5-dimethoxystyryl)-2-methoxyphenol (17c)

17c was obtained from 16c, using the same synthetic procedure as 17a.

A white powder. $^1$H-NMR (CDCl$_3$, 500 MHz), δ(ppm): 7.04-7.00 (m, 3H), 6.92-6.87 (m, 2H), 6.66 (s, 2H), 6.39 (s, 1H), 5.68 (brs, 1H, OH), 3.96 (s, 3H), 3.83 (s, 6H).

4-((1E,3E)-4-(3,5-dimethoxyphenyl)buta-1,3-dien-1-yl)phenol (17d)

17d was obtained from 16d, using the same synthetic procedure as 17a.

A white powder. $^1$H-NMR (CDCl$_3$, 500 MHz), δ(ppm): 7.33 (d, J=8.0 Hz, 2H), 6.91 (dd, J=10.0, 15.5 Hz, 1H), 6.83-6.78 (m, 3H), 6.62 (d, J=15.5 Hz, 1H), 6.59 (d, J=2.0 Hz, 2H), 6.55 (d, J=15.5 Hz, 1H), 6.37 (t, J=2.0 Hz, 1H), 4.94 (brs, 1H, OH), 3.82 (s, 6H).

Tert-butyl (E)-(2-((2-(((4-(3,5-bis(methoxy-d3) styryl-d6)phenoxy)carbonyl) oxy)ethyl)amino)-2-oxoethyl)carbamate (19a)

To a stirred solution of compound 2a (1.12 g, 5.1 mmol) in dry $CH_2Cl_2$ (15 ml) was added triethylamine (2.15 mL, 15.4 mmol) and then 4-nitrophenyl chloroformate solution (1.15 g, 5.7 mmol in 10 mL $CH_2Cl_2$) was added dropwise at 0° C. The reaction mixture was stirred at 0° C. for 15 min, and warmed to room temperature. The mixture was stirred at room temperature for an additional 4h. After the reaction was completed (checked with TLC), the solvent was removed by evaporation. The crude intermediate was mixed with pterostilbene derivative 17a (1.41 g, 5.4 mmol) and DMAP (1.26 g, 10.3 mmol) in ACN (30 ml). The resulting mixture was heated to 50° C. for 1 hr. After reaction, the solvent was removed under vacuum gave a crude residue that was purified by column chromatography (EA/n-Hexane=1/5 (V/V)) to afford crude product. The crude product was purified by preparative HPLC (70% ACN, 30% $H_2O$) to afford target compound 19a (0.99 g, 38% yield) as a white powder. $^1$H-NMR (CDCl$_3$, 500 MHz), δ(ppm): 7.52 (d, J=9.0 Hz, 2H), 7.18 (d, J=9.0 Hz, 2H), 7.06 (d, J=16.5 Hz, 1H), 6.99 (d, J=16.5 Hz, 11H), 6.66 (d, J=2.0 Hz, 2H), 6.53 (brs, NH), 6.40 (t, J=2.0 Hz, 1H), 5.12 (brs, NH), 4.35 (t, J=5.5 Hz, 2H), 3.83 (d, J=5.5 Hz, 2H), 3.66 (q, J=5.5 Hz, 2H), 1.46 (s, 9H). Mass found [M-Boc+H]$^+$=408.3; [M+H]$^+$=508.4; [M+Na]$^+$=530.4, [2M+H]$^+$=914.6.

Tert-butyl (E)-(2-((2-(((4-(3,5-diethoxystyryl)phenoxy)carbonyl)oxy)ethyl)amino)-2-oxoethyl)carbamate (19b)

19b was obtained from 2a and 17b, using the same synthetic procedure as 19a.

A white powder. 45% yield. $^1$H-NMR (CDCl$_3$, 500 MHz), δ(ppm): 7.50 (d, J=9.0 Hz, 2H), 7.17 (d, J=9.0 Hz, 2H), 7.05 (d, J=16.5 Hz, 1H), 6.97 (d, J=16.5 Hz, 1H), 6.64 (d, J=2.0 Hz, 2H), 6.53 (brs, NH), 6.40 (t, J=2.0 Hz, 1H), 5.12 (brs, NH), 4.35 (t, J=5.5 Hz, 2H), 4.06 (q, J=7.0 Hz, 4H), 3.83 (d, J=5.5 Hz, 2H), 3.66 (q, J=5.5 Hz, 2H), 1.46 (s, 9H), 1.43 (t, J=7.0 Hz, 6H). Mass found [M−Boc+H]$^+$=430.3; [M+H]$^+$=530.3; [M+Na]$^+$=552.2, [2M+H]$^+$=1058.6, [2M+Na]$^+$=1080.6.

Tert-butyl (E)-(1-((2-(((4-(3,5-bis(methoxy-d3) styryl-d6)phenoxy)carbonyl)oxy)ethyl)amino)-3-methyl-1-oxobutan-2-yl)carbamate (19c)

19c was obtained from 2c and 17a, using the same synthetic procedure as 19a.

A white powder. 42% yield. $^1$H-NMR (CDCl$_3$, 500 MHz), δ(ppm): 7.52 (d, J=9.0 Hz, 2H), 7.18 (d, J=9.0 Hz, 2H), 7.06 (d, J=16.5 Hz, 1H), 6.99 (d, J=16.5 Hz, 1H), 6.66 (d, J=2.0 Hz, 2H), 6.40 (t, J=2.0 Hz, 1H), 6.39 (brs, NH), 5.03 (brs, NH), 4.34 (t, J=5.5 Hz, 2H), 3.93-3.91 (m, 1H), 3.70-3.61 (m, 2H), 2.17-2.16 (m, 1H), 1.44 (s, 9H), 0.98 (d, J=7.0 Hz, 3H), 0.93 (d, J=7.0 Hz, 3H). Mass found [M-Boc+H]$^+$=450.2; [M+H]$^+$=550.4; [M+Na]$^+$=572.4.

Tert-butyl (E)-(1-((2-(((4-(3,5-diethoxystyryl)phenoxy)carbonyl)oxy)ethyl)amino)-3-methyl-1-oxobutan-2-yl)carbamate (19d)

19d was obtained from 2c and 17b, using the same synthetic procedure as 19a.

A white powder. 41% yield. $^1$H-NMR (CDCl$_3$, 500 MHz), δ(ppm): 7.50 (d, J=9.0 Hz, 2H), 7.17 (d, J=9.0 Hz, 2H), 7.05 (d, J=16.0 Hz, 1H), 6.97 (d, J=16.0 Hz, 11H), 6.64 (d, J=2.0 Hz, 2H), 6.39 (t, J=2.0 Hz, 1H), 6.38 (brs, NH), 5.03 (brs, NH), 4.34 (t, J=5.5 Hz, 2H), 4.05 (q, J=7.0 Hz, 4H), 3.93-3.90 (m, 1H), 3.70-3.61 (m, 2H), 2.19-2.16 (m, 11H), 1.45 (s, 9H), 1.43 (t, J=7.0 Hz, 6H), 0.98 (d, J=7.0 Hz, 3H), 0.93 (d, J=7.0 Hz, 3H). Mass found [M-Boc+H]$^+$=472.3; [M+H]$^+$=572.4; [M+Na]=594.4; [2M+H]$^+$=1142.8; [2M+Na]$^+$=1164.9.

Tert-butyl (E)-(1-((2-(((4-(3,5-bis(methoxy-d3) styryl-d6)phenoxy)carbonyl)oxy)ethyl)amino)-1-oxo-3-phenylpropan-2-yl)carbamate (19e)

19e was obtained from 2j and 17a, using the same synthetic procedure as 19a.

A white powder. 47% yield. $^1$H-NMR (CDCl$_3$, 500 MHz), δ(ppm): 7.52 (d, J=9.0 Hz, 2H), 7.33-7.30 (m, 2H), 7.25-7.21 (m, 3H), 7.17 (d, J=9.0 Hz, 2H), 7.07 (d, J=16.5 Hz, 1H), 6.99 (d, J=16.5 Hz, 1H), 6.66 (d, J=2.0 Hz, 2H), 6.40 (t, J=2.0 Hz, 11H), 6.16 (brs, NH), 5.04 (brs, NH), 4.34-4.33 (m, 11H), 4.26-4.22 (m, 11H), 4.17-4.16 (m, 11H), 3.56-3.54 (m, 2H), 3.13-3.09 (m, 11H), 3.07-3.02 (m, 11H), 1.42 (s, 9H). Mass found [M-Boc+H]$^+$=498.3; [M+Na]=620.4; [2M+H]$^+$=1194.9; [2M+Na]=1216.9.

Tert-butyl (E)-(1-((2-(((4-(3,5-diethoxystyryl)phenoxy)carbonyl)oxy)ethyl)amino)-1-oxo-3-phenylpropan-2-yl)carbamate (19f)

19f was obtained from 2j and 17b, using the same synthetic procedure as 19a.

A white powder. 47% yield. ¹H-NMR (CDCl₃, 500 MHz), δ(ppm): 7.51 (d, J=9.0 Hz, 2H), 7.33-7.30 (m, 2H), 7.25-7.21 (m, 3H), 7.16 (d, J=9.0 Hz, 2H), 7.05 (d, J=16.0 Hz, 11H), 6.97 (d, J=16.0 Hz, 11H), 6.64 (d, J=2.0 Hz, 2H), 6.40 (t, J=2.0 Hz, 1H), 6.15 (brs, NH), 5.04 (brs, NH), 4.33-4.32 (m, 1H), 4.26-4.22 (m, 1H), 4.17-4.16 (m, 1H), 4.06 (q, J=7.0 Hz, 4H), 3.59-3.51 (m, 2H), 3.13-3.09 (m, 1H), 3.07-3.02 (m, 1H), 1.44-1.42 (m, 15H). Mass found [M-Boc+H]⁺=519.2; [M+H]⁺=619.2; [M+Na]⁺=641.2; [2M+Na]⁺=1259.5.

Tert-butyl (E)-(1-((2-(((4-(3,5-dimethoxystyryl)-2-methoxyphenoxy)carbonyl)oxy)ethyl)amino)-3-methyl-1-oxobutan-2-yl)carbamate (19g)

19g was obtained from 2c and 17c, using the same synthetic procedure as 19a.

A white powder. 37% yield. ¹H-NMR (CDCl₃, 500 MHz), δ(ppm): 7.11-7.08 (m, 3H), 7.05 (d, J=16.0 Hz, 1H), 6.98 (d, J=16.0 Hz, 1H), 6.67 (s, 2H), 6.41 (s, 1H), 6.37 (brs, NH), 5.04 (brs, NH), 4.34 (t, J=5.5 Hz, 2H), 3.98-3.92 (m, 4H), 3.84 (s, 6H), 3.69-3.65 (m, 2H), 2.17-2.16 (m, 1H), 1.45 (s, 9H), 0.97 (d, J=7.0 Hz, 3H), 0.92 (d, J=7.0 Hz, 3H). Mass found [M-Boc+H]⁺=474.3; [M+H]⁺=574.4; [M+Na]⁺=596.4.

Tert-butyl (1-((2-(((4-((1E,3E)-4-(3,5-dimethoxyphenyl)buta-1,3-dien-1-yl) phenoxy)carbonyl)oxy)ethyl)amino)-3-methyl-1-oxobutan-2-yl)carbamate (19h)

19h was obtained from 2c and 17d, using the same synthetic procedure as 19a.

A white powder. 35% yield. ¹H-NMR (CDCl₃, 500 MHz), δ(ppm): 7.45 (d, J=9.0 Hz, 2H), 7.15 (d, J=9.0 Hz, 2H), 6.95-6.86 (m, 2H), 6.67 (d, J=16.5 Hz, 1H), 6.63 (d, J=16.5 Hz, 11H), 6.60 (d, J=2.0 Hz, 2H), 6.38 (t, J=2.0 Hz, 1H), 6.37 (brs, NH), 5.03 (brs, NH), 4.33 (t, J=5.5 Hz, 2H), 3.93-3.90 (m, 1H), 3.83 (s, 6H), 3.70-3.61 (m, 2H), 2.18-2.16 (m, 1H), 1.45 (s, 9H), 0.98 (d, J=7.0 Hz, 3H), 0.93 (d, J=7.0 Hz, 3H). Mass found [M-Boc+H]=470.0; [M+H]⁺=570.3; [M+Na]⁺=592.3.

(E)-2-(2-aminoacetamido)ethyl (4-(3,5-bis(methoxy-d3)styryl-d6)phenyl) carbonate hydrochloride (6a)

To a stirred solution of compound 19a (639 mg, 1.3 mmol) in DCM (20 mL) was added 4 M HCl in 1,4-dioxane (6.3 mL) and was stirred at room temperature for 3 hrs. Then the reaction solution was evaporated and subjected to prep-HPLC purification (TFA as a buffer, detailed gradient elution, please see the information below). Then the aqueous fraction was treated with several drops of concentrate HCl and lyophilized to afford compound 6a (491 mg, 92% yield) as a white solid. ¹H-NMR (CD₃OD, 500 MHz), δ(ppm): 7.58 (d, J=8.5 Hz, 2H), 7.18 (d, J=8.5 Hz, 2H), 7.15 (d, J=16.5 Hz, 1H), 7.08 (d, J=16.5 Hz, 1H), 6.71 (d, J=2.5 Hz, 2H), 6.40 (t, J=2.5 Hz, 1H), 4.34 (t, J=5.5 Hz, 2H), 3.71 (s, 2H), 3.62 (t, J=5.5 Hz, 2H); ¹³C-NMR (CD₃OD, 125 MHz), δ(ppm): 166.23, 161.14, 153.66, 150.50, 139.18, 135.49, 128.98, 127.40, 127.18, 120.95, 104.18, 99.58, 66.72, 40.06, 38.13; Mass found [M−HCl+H]⁺=408.3; [M−HCl+Na]⁺=430.2; [2M−2HCl+H]⁺=814.5; [2M−2HCl+Na]⁺=836.5.

Column: Inertsil ODS-3 C18, 5 μm, 30*250 mm
Flow: 38 ml/min
Solvent A: 10% ACN in H₂O+0.1% TFA
Solvent B: 90% ACN in H₂O+0.1% TFA Gradient:

| Time (min) | Flow (ml/min) | % A | % B |
|---|---|---|---|
| 0 | 38 | 100 | 0 |
| 20 | 38 | 0 | 100 |
| 24 | 38 | 0 | 100 |
| 28 | 38 | 100 | 0 |
| 30 | 38 | 100 | 0 |

The final compounds of 6b-6h were prepared by the experimental procedures as described in the 6a, with some non-critical variations.

(E)-2-(2-aminoacetamido)ethyl (4-(3,5-diethoxystyryl)phenyl) carbonate hydrochloride (6b)

6b was obtained from 19b, using the same synthetic procedure as 6a.

A white solid. 95% yield. ¹H-NMR (CD₃OD, 500 MHz), δ(ppm): 7.58 (d, J=9.0 Hz, 2H), 7.17 (d, J=9.0 Hz, 2H), 7.13 (d, J=16.5 Hz, 1H), 7.07 (d, J=16.5 Hz, 1H), 6.69 (d, J=2.5 Hz, 2H), 6.38 (t, J=2.5 Hz, 11H), 4.34 (t, J=5.5 Hz, 2H), 4.06-4.02 (m, 4H), 3.71 (s, 2H), 3.62 (t, J=5.5 Hz, 2H), 1.39 (t, J=7.0 Hz, 6H); ¹³C-NMR (CD₃OD, 125 MHz), δ(ppm): 166.24, 160.36, 153.66, 150.48, 139.09, 135.51, 129.06, 127.27, 127.16, 120.93, 104.74, 100.71, 66.72, 63.15, 40.08, 38.14, 13.77; Mass found [M−HCl+H]⁺=430.3; [M−HCl+Na]⁺=452.2; [2M−2HCl+H]⁺=858.5; [2M−2HCl+Na]⁺=880.5.

(E)-2-(2-amino-3-methylbutanamido)ethyl 4-(3,5-bis(methoxy-d3)styryl-d6)phenyl) carbonate hydrochloride (6c)

6c was obtained from 19c, using the same synthetic procedure as 6a.

A white solid. 89% yield. ¹H-NMR (CD₃OD, 500 MHz), δ(ppm): 7.58 (d, J=9.0 Hz, 2H), 7.17 (d, J=9.0 Hz, 2H), 7.15 (d, J=16.5 Hz, 1H), 7.08 (d, J=16.5 Hz, 1H), 6.71 (d, J=2.5 Hz, 2H), 6.40 (t, J=2.5 Hz, 1H), 4.40-4.32 (m, 1H), 4.31-4.29 (m, 1H), 3.73-3.72 (m, 1H), 3.67 (d, J=6.0 Hz, 1H), 3.54-3.49 (m, 1H), 2.22-2.16 (m, 1H), 1.08 (t, J=6.5 Hz, 6H); ¹³C-NMR (CD₃OD, 125 MHz), δ(ppm): 168.45, 161.14, 153.58, 150.50, 139.18, 135.50, 128.98, 127.40, 127.17, 120.93, 104.19, 99.58, 66.62, 58.46, 38.04, 30.09, 17.37, 16.60; Mass found [M−HCl+H]⁺=449.3; [M−HCl+Na]⁺=471.3; [2M−2HCl+Na]⁺=919.4.

(E)-2-(2-amino-3-methylbutanamido)ethyl (4-(3,5-diethoxystyryl)phenyl) carbonate hydrochloride (6d)

6d was obtained from 19d, using the same synthetic procedure as 6a.

A white solid. 93% yield. ¹H-NMR (CD₃OD, 500 MHz), δ(ppm): 7.58 (d, J=9.0 Hz, 2H), 7.17 (d, J=9.0 Hz, 2H), 7.13 (d, J=16.0 Hz, 1H), 7.06 (d, J=16.0 Hz, 1H), 6.69 (d, J=2.0 Hz, 2H), 6.38 (t, J=2.0 Hz, 1H), 4.40-4.34 (m, 1H), 4.33-4.30 (m, 1H), 4.06-4.02 (m, 4H), 3.77-3.72 (m, 1H), 3.66 (d, J=6.0 Hz, 1H), 3.54-3.49 (m, 1H), 2.23-2.16 (m, 1H), 1.39 (t, J=7.0 Hz, 6H), 1.08 (t, J=7.0 Hz, 6H); ¹³C-NMR (CD₃OD, 125 MHz), δ(ppm): 168.48, 160.36, 153.58, 150.47, 139.10, 135.52, 129.06, 127.28, 127.16, 120.93, 104.77, 100.73, 66.62, 63.16, 58.48, 38.05, 30.10, 17.37, 16.62, 13.78; Mass found [M−HCl+H]⁺=472.3; [M−HCl+Na]⁺=494.3; [2M−2HCl+H]⁺=942.6; [2M−2HCl+Na]⁺=964.6.

(E)-2-(2-amino-3-phenylpropanamido)ethyl 4-(3,5-bis(methoxy-d3)styryl-d6)phenyl) carbonate hydrochloride (6e)

6e was obtained from 19e, using the same synthetic procedure as 6a.

A white solid. 90% yield. ¹H-NMR (CD₃OD, 500 MHz), δ(ppm): 7.59 (d, J=9.0 Hz, 2H), 7.39-7.36 (m, 2H), 7.32-7.29 (m, 3H), 7.18 (d, J=9.0 Hz, 2H), 7.15 (d, J=16.5 Hz, 1H), 7.08 (d, J=16.5 Hz, 1H), 6.71 (d, J=1.5 Hz, 2H), 6.40 (s, 1H), 4.27-4.19 (m, 2H), 4.06 (t, J=7.0 Hz, 1H), 3.66-3.61 (m, 1H), 3.48-3.43 (m, 1H), 3.19 (dd, J=7.0, 13.5 Hz, 1H), 3.08 (dd, J=7.0, 13.5 Hz, 1H); ¹³C-NMR (CD₃OD, 125 MHz), δ(ppm): 168.48, 161.14, 153.51, 150.50, 139.18, 135.50, 134.15, 129.13, 129.00, 128.71, 127.48, 127.40, 127.19, 120.92, 104.20, 99.59, 66.66, 54.41, 38.03, 37.29; Mass found [M−HCl+H]⁺=498.2; [M−HCl+Na]+=520.4; [2M−2HCl+H]⁺=994.6.

(E)-2-(2-amino-3-phenylpropanamido)ethyl (4-(3,5-diethoxystyryl)phenyl) carbonate hydrochloride (6f)

6f was obtained from 19f, using the same synthetic procedure as 6a.

A white solid. 92% yield. ¹H-NMR (CD₃OD, 500 MHz), δ(ppm): 7.57 (d, J=8.5 Hz, 2H), 7.38-7.35 (m, 2H), 7.32-7.29 (m, 3H), 7.17 (d, J=8.5 Hz, 2H), 7.12 (d, J=16.5 Hz, 1H), 7.05 (d, J=16.5 Hz, 1H), 6.68 (d, J=2.0 Hz, 2H), 6.38 (t, J=2.0 Hz, 1H), 4.24-4.20 (m, 2H), 4.07-4.02 (m, 5H), 3.65-3.60 (m, 1H), 3.48-3.43 (m, 1H), 3.19 (dd, J=7.5, 14.0 Hz, 1H), 3.08 (dd, J=7.5, 14.0 Hz, 1H), 1.38 (t, J=7.5 Hz, 6H); ¹³C-NMR (CD₃OD, 125 MHz), δ(ppm): 168.48, 160.36, 153.51, 150.47, 139.10, 135.52, 134.15, 129.12, 129.07, 128.71, 127.48, 127.27, 127.18, 120.91, 104.77, 100.74, 66.65, 63.16, 54.41, 38.03, 37.29, 13.78; Mass found [M−HCl+H]⁺=519.2; [2M−2HCl+H]⁺=1037.4.

(E)-2-(2-amino-3-methylbutanamido)ethyl (4-(3,5-dimethoxystyryl)-2-methoxyphenyl) carbonate hydrochloride (6g)

6g was obtained from 19g, using the same synthetic procedure as 6a.

A white solid. 85% yield. ¹H-NMR (CD₃OD, 500 MHz), δ(ppm): 7.29 (d, J=1.5 Hz, 1H), 7.17-7.13 (m, 2H), 7.12-7.07 (m, 2H), 6.73 (d, J=2.0 Hz, 2H), 6.41 (t, J=2.0 Hz, 1H), 4.38-4.28 (m, 2H), 3.90 (s, 3H), 3.80 (s, 6H), 3.75-3.64 (m, 2H), 3.54-3.51 (m, 11H), 2.20 (s, 1H), 1.08 (t, J=7.0 Hz, 6H); ¹³C-NMR (CD₃OD, 125 MHz), δ(ppm): 168.43, 161.14, 153.30, 151.30, 139.40, 139.18, 136.92, 129.09, 127.81, 121.97, 118.72, 110.16, 104.24, 99.61, 66.65, 58.47, 55.10, 54.39, 38.11, 30.10, 17.41, 16.63; Mass found [M−HCl+H]⁺=474.2; [M−HCl+Na]⁺=496.2; [2M−2HCl+H]⁺=946.5; [2M−HCl+Na]⁺=968.5.

2-(2-amino-3-methylbutanamido)ethyl (4-((1E,3E)-4-(3,5-dimethoxyphenyl) buta-1,3-dien-1-yl)phenyl) carbonate hydrochloride (6h)

6h was obtained from 19h, using the same synthetic procedure as 6a.

A white solid. 80% yield. ¹H-NMR (CD₃OD, 500 MHz), δ(ppm): 7.49 (d, J=8.5 Hz, 2H), 7.14 (d, J=8.5 Hz, 2H), 7.01-6.95 (m, 2H), 6.71-6.62 (m, 4H), 6.38 (s, 1H), 4.39-4.35 (m, 1H), 4.33-4.29 (m, 1H), 3.78 (s, 6H), 3.77-3.71 (m, 1H), 3.68 (d, J=6.0 Hz, 1H), 3.53-3.49 (m, 1H), 2.22-2.18 (m, 1H), 1.07 (t, J=7.0 Hz, 6H); ¹³C-NMR (CD₃OD, 125 MHz), δ(ppm): 168.46, 161.09, 153.56, 150.39, 139.36, 135.65, 133.01, 131.38, 129.53, 129.33, 126.99, 120.94, 104.09, 99.55, 66.62, 58.45, 54.39, 38.04, 30.09, 17.37, 16.63; Mass found [M−HCl+H]⁺=469.0; [M−HCl+Na]⁺=491.1; [2M−2HCl+H]⁺=937.0.

1-2-6. Synthesis of Target Compounds 7a-7f

Compounds 7a-7f were synthesized according to Scheme 6. As shown, benzyl N-(2-aminoethyl)carbamate hydrochloride was reacted with N-Boc-amino acids (compounds 1a, 1c and 1j) in the presence of EDCI and DMAP to give the corresponding amide derivatives (compounds 20a-20c). Compounds 20a-20c were hydrogenated over Pd/C to afford corresponding compounds 21a-21c. On the other hand, pterostilbene or 17a was treated with triphosgene in the present of NEt₃ to afford the corresponding 22a-22b which without further purification were reacted separately with compounds 21a-21c to give the corresponding 23a-23f. Subsequent deprotection of 23a-23f with 4 M HCl in 1,4-dioxane to afford the target compounds 7a-7f.

Scheme 6: Synthesis of compounds 7a-7f

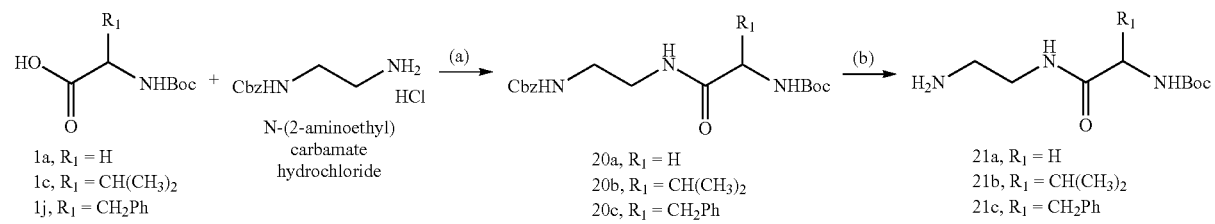

1a, R₁ = H
1c, R₁ = CH(CH₃)₂
1j, R₁ = CH₂Ph

N-(2-aminoethyl) carbamate hydrochloride

20a, R₁ = H
20b, R₁ = CH(CH₃)₂
20c, R₁ = CH₂Ph

21a, R₁ = H
21b, R₁ = CH(CH₃)₂
21c, R₁ = CH₂Ph

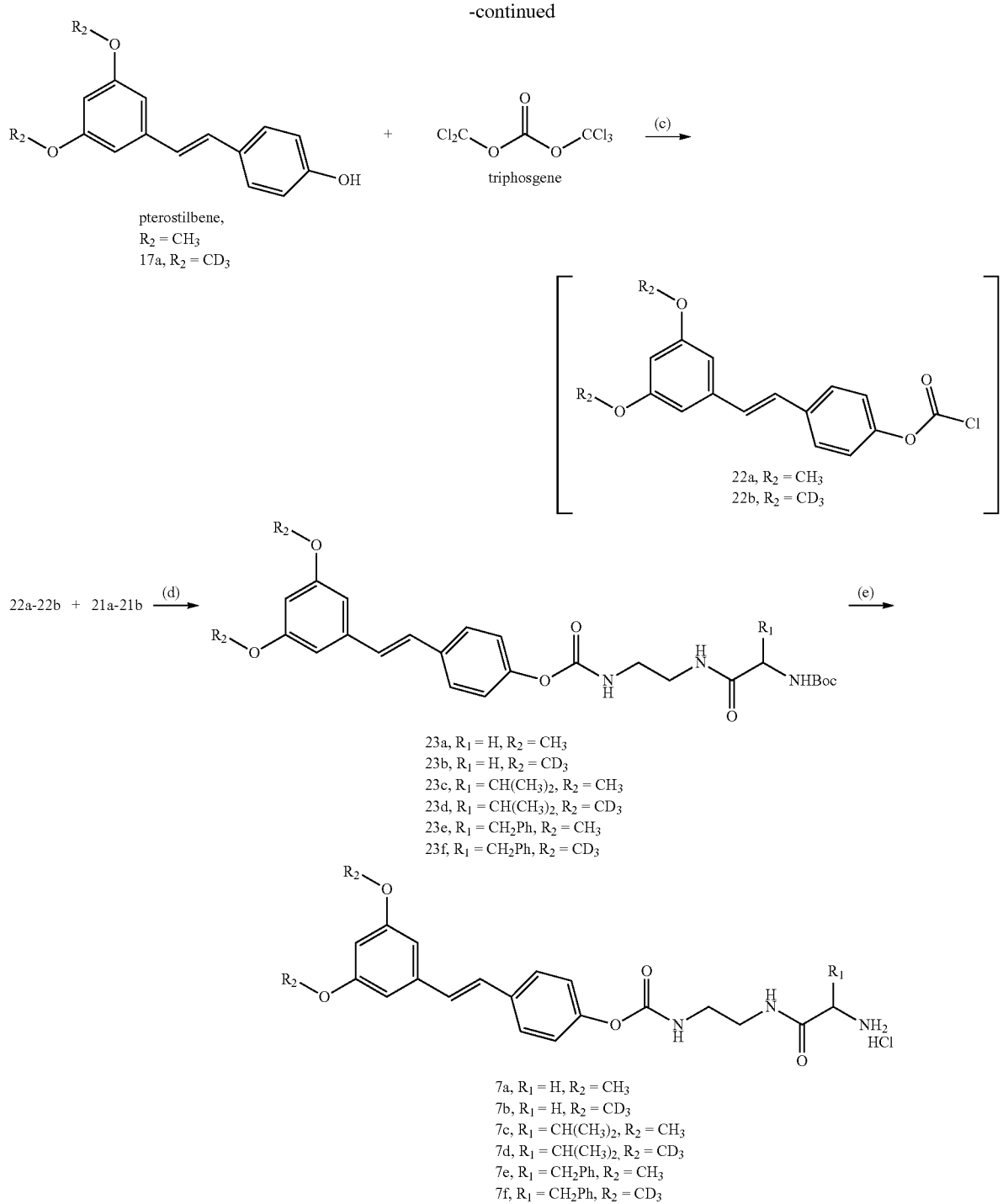

Reagents and conditions:
(a) EDCI, DIPEA, CH$_2$Cl$_2$, RT, 12 hrs;
(b) 10% Pd/C, MeOH, RT, 12 hrs;
(c) triethylamine, 0° C. to RT, 1.5 hrs;
(d) trimethylamine, RT, 1.5 hrs;
(e) 4M HCl in 1,4-dioxane.

Benzyl (2-(2-((tert-butoxycarbonyl)amino)acetamido)ethyl)carbamate (20a)

To a stirring solution of benzyl (2-aminoethyl)carbamate HCl (8.5 g, 36.8 mmol), Boc-Gly-OH 1a (5.3 g, 30.4 mmol) and DIPEA (9.5 g, 73.6 mmol) in CH$_2$Cl$_2$ (80 mL) was added EDCI (8.6 g, 45.0 mmol), and the reaction mixture was stirred at room temperature for 12 hrs. After reaction, the solvent was removed under reduced pressure, the residue was purified by column chromatography (n-Hexane to EA/n-Hexane=1/5 (V/V)) to afford target product 20a (8.0 g, 74% yield) as a white powder. $^1$H-NMR (CDCl$_3$, 500 MHz), δ(ppm): 7.33-7.30 (m, 5H), 6.86 (brs, NH), 5.56 (brs, NH), 5.07 (s, 2H), 3.71 (s, 2H), 3.37-3.30 (m, 4H), 1.42 (s, 9H).

Benzyl (2-(2-((tert-butoxycarbonyl)amino)-3-methylbutanamido)ethyl) carbamate (20b)

20b was obtained from 1c, using the same synthetic procedure as 20a.
A white powder. 41% yield. $^1$H-NMR (CDCl$_3$, 500 MHz), δ(ppm): 7.34-7.31 (m, 5H), 6.55 (brs, NH), 5.35 (brs, NH), 5.05 (s, 2H), 5.03 (brs, NH), 3.86-3.83 (m, 1H), 3.40-3.33 (m, 4H), 2.12-2.10 (m, 1H), 1.42 (s, 9H), 0.93 (d, J=7.0 Hz, 3H), 0.88 (d, J=7.0 Hz, 3H).

Benzyl (2-(2-((tert-butoxycarbonyl)amino)-3-phenylpropanamido)ethyl) carbamate (20c)

20c was obtained from 1j, using the same synthetic procedure as 20a.
A white powder. 48% yield. $^1$H-NMR (CDCl$_3$, 500 MHz), δ(ppm): 7.36-7.18 (m, 11H), 6.18 (brs, NH), 5.07 (s, 2H), 5.04 (brs, NH), 4.26 (d, J=7.0 Hz, 11H), 3.48-3.17 (m, 4H), 3.04-3.01 (m, 2H), 1.40 (s, 9H).

Tert-butyl (2-((2-aminoethyl)amino)-2-oxoethyl) carbamate (21a)

Compound 20a (4.0 g 11.4 mm) was dissolved in MeOH (50 mL) and treated with 10% Pd/C (0.6 g), the reaction mixture was stirred at room temperature under hydrogen atmosphere for 12 hrs. The reaction mixture was filtered through celite. The solvent of filtrate was evaporated and the residue was purified with column chromatography (CH$_2$Cl$_2$/methanol=1/19 (V/V)) to afford compound 21a (2.35 g, 95%) as a white powder. $^1$H-NMR (CDCl$_3$, 500 MHz), δ(ppm): 7.16 (brs, NH), 5.62 (brs, NH), 3.79 (brs, 2H), 3.38-3.36 (m, 2H), 2.90-2.88 (m, 2H), 1.42 (s, 9H).

Tert-butyl (1-((2-aminoethyl)amino)-3-methyl-1-oxobutan-2-yl)carbamate (21b)

21b was obtained from 20b, using the same synthetic procedure as 21a.
A white powder. 95% yield. $^1$H-NMR (CDCl$_3$, 500 MHz), δ(ppm): 6.93 (brs, NH), 5.24 (brs, NH), 3.89-3.86 (m, 1H), 3.40-3.37 (m, 1H), 3.32-3.29 (m, 1H), 2.87-2.85 (m, 2H), 2.13-2.09 (m, 1H), 1.42 (s, 9H), 0.94 (d, J=7.0 Hz, 3H), 0.91 (d, J=7.0 Hz, 3H).

Tert-butyl (1-((2-aminoethyl)amino)-1-oxo-3-phenylpropan-2-yl)carbamate (21c)

21c was obtained from 20c, using the same synthetic procedure as 21a.
A white powder. 95% yield. $^1$H-NMR (CDCl$_3$, 500 MHz), δ(ppm): 7.29-7.19 (m, 5H), 6.77 (brs, NH), 5.34 (s, NH), 4.32-4.31 (m, 1H), 3.24-3.23 (m, 2H), 3.06-3.02 (m, 2H), 2.79 (s, 2H), 2.71 (s, NH$_2$), 1.37 (s, 9H).

Tert-butyl (E)-(2-((2-(((4-(3,5-dimethoxystyryl)phenoxy)carbonyl)amino)ethyl)amino)-2-oxoethyl)carbamate (23a)

To a solution of pterostilbene (1.41 g, 5.51 mmol) and triphosgene (0.54 g, 1.82 mm) in dry CH$_2$Cl$_2$ (15 ml) was added triethylamine (1.36 g, 13.4 mmol) dropwise at 0° C. The reaction mixture was stirred at 0° C. for 30 min and then warmed to room temperature to afford intermediate 22a solution. The solution of compound 21a (1.17 g, 5.9 mmol) and triethylamine (1.36 g, 13.4 mmol) in dry CH$_2$Cl$_2$ (15 ml) was added dropwise to the intermediate 22a solution. The resulting mixture was stirred for another 1.5 hrs. After reaction, the solvent was removed under vacuum and the residue was taken up in EA and washed with saturated citric acid solution. The organic layer collected, dried over Na$_2$SO$_4$ and evaporated. The residue was purified by column chromatography (silica gel, 0 to 67 percent of EtOAc/n-Hexane) to afford crude product. The crude product was purified by preparative HPLC (70% ACN, 30% H$_2$O) to afford target compound 23a (0.86 g, 32% yield, two steps) as a white powder. $^1$H-NMR (CDCl$_3$, 500 MHz), δ(ppm): 7.47 (d, J=8.5 Hz, 2H), 7.11 (d, J=8.5 Hz, 2H), 7.05 (d, J=16.0 Hz, 1H), 6.96 (d, J=16.0 Hz, 1H), 6.70 (brs, NH), 6.65 (d, J=2.5 Hz, 2H), 6.40 (t, J=2.5 Hz, 1H), 5.74 (brs, NH), 5.19 (brs, NH), 3.83 (s, 6H), 3.79 (d, J=5.5 Hz, 2H), 3.50-3.46 (m, 2H), 3.43-3.40 (m, 2H), 1.44 (s, 9H). Mass found [M+Na]$^+$=522.0, [2M+Na]$^+$=1021.3.

Tert-butyl (E)-(2-((2-(((4-(3,5-bis(methoxy-d3) styryl-d6)phenoxy)carbonyl)amino)ethyl)amino)-2-oxoethyl)carbamate (23b)

23b was obtained from 21a and 22b, using the same synthetic procedure as 23a.
A white powder. 27% yield. $^1$H-NMR (CDCl$_3$, 500 MHz), δ(ppm): 7.48 (d, J=8.5 Hz, 2H), 7.11 (d, J=8.5 Hz, 2H), 7.05 (d, J=16.0 Hz, 1H), 6.96 (d, J=16.0 Hz, 1H), 6.69 (brs, NH), 6.65 (d, J=2.0 Hz, 2H), 6.39 (t, J=2.0 Hz, 1H), 5.73 (brs, NH), 5.19 (brs, NH), 3.79 (d, J=5.5 Hz, 2H), 3.49-3.47 (m, 2H), 3.43-3.40 (m, 2H), 1.44 (s, 9H). Mass found [M+Na]$^+$=528.2, [2M+Na]$^+$=1033.4.

Tert-butyl (E)-(1-((2-(((4-(3,5-dimethoxystyryl)phenoxy)carbonyl)amino)ethyl)amino)-3-methyl-1-oxobutan-2-yl)carbamate (23c)

23c was obtained from 21b and 22a, using the same synthetic procedure as 23a.
A white powder. 18% yield. $^1$H-NMR (CDCl$_3$, 500 MHz), δ(ppm): 7.48 (d, J=8.5 Hz, 2H), 7.10 (d, J=8.5 Hz, 2H), 7.05 (d, J=16.0 Hz, 1H), 6.97 (d, J=16.0 Hz, 1H), 6.66 (d, J=2.0 Hz, 2H), 6.52 (brs, NH), 6.40 (t, J=2.0 Hz, 11H), 5.77 (brs, NH), 5.03 (brs, NH), 3.87-3.85 (m, 1H), 3.83 (s, 6H), 3.47-3.41 (m, 4H), 2.18-2.16 (m, 1H) 1.45 (s, 9H), 0.97 (d, J=7.0 Hz, 3H), 0.93 (d, J=7.0 Hz, 3H). Mass found [M-Boc+H]$^+$=443.3; [M+H]$^+$=543.4; [M+Na]$^+$=565.3.

Tert-butyl (E)-(1-((2-(((4-(3,5-bis(methoxy-d3) styryl-d6)phenoxy)carbonyl)amino)ethyl)amino)-3-methyl-1-oxobutan-2-yl)carbamate (23d)

23d was obtained from 21b and 22b, using the same synthetic procedure as 23a.
A white powder. 28% yield. $^1$H-NMR (CDCl$_3$, 500 MHz), δ(ppm): 7.48 (d, J=8.5 Hz, 2H), 7.11 (d, J=8.5 Hz, 2H), 7.06 (d, J=16.0 Hz, 1H), 6.97 (d, J=16.0 Hz, 1H), 6.65 (d, J=2.0 Hz, 2H), 6.47 (brs, NH), 6.39 (t, J=2.5 Hz, 11H), 5.73 (brs, NH), 5.00 (brs, NH), 3.87-3.84 (m, 1H), 3.52-3.42 (m, 4H), 2.17-2.14 (m, 2H), 1.45 (s, 9H), 0.98 (d, J=7.0 Hz, 3H), 0.93 (d, J=7.0 Hz, 3H). Mass found [M+Na]$^+$=570.3, [2M+Na]$^+$=1117.6.

Tert-butyl (E)-(1-((2-(((4-(3,5-dimethoxystyryl)phenoxy)carbonyl)amino)ethyl)amino)-1-oxo-3-phenylpropan-2-yl)carbamate (23e)

23e was obtained from 21c and 22a, using the same synthetic procedure as 23a.

A white powder. 27% yield. $^1$H-NMR (CDCl$_3$, 500 MHz), δ(ppm): 7.48 (d, J=8.5 Hz, 2H), 7.35-7.27 (m, 3H), 7.23-7.22 (m, 2H), 7.11 (d, J=8.5 Hz, 2H), 7.06 (d, J=16.0 Hz, 1H), 6.97 (d, J=16.0 Hz, 1H), 6.66 (d, J=2.0 Hz, 2H), 6.40 (t, J=2.0 Hz, 1H), 6.15 (brs, NH), 5.42 (brs, NH), 5.03 (brs, NH), 4.31-4.26 (m, 1H), 3.81 (s, 6H), 3.38-3.33 (m, 2H), 3.31-3.25 (m, 2H), 3.11-3.03 (m, 2H), 1.45 (s, 9H). Mass found [M−Boc+H]$^+$=491.0; [M+H]$^+$=591.4; [M+Na]$^+$=613.3.

Tert-butyl (E)-(1-((2-(((4-(3,5-bis(methoxy-d3)styryl-d6)phenoxy)carbonyl)amino)ethyl)amino)-1-oxo-3-phenylpropan-2-yl)carbamate (23f)

23f was obtained from 21c and 22b, using the same synthetic procedure as 23a.

A white powder. 30% yield. $^1$H-NMR (CDCl$_3$, 500 MHz), δ(ppm): 7.48 (d, J=8.5 Hz, 2H), 7.34-7.27 (m, 3H), 7.25-7.22 (m, 2H), 7.10 (d, J=8.5 Hz, 2H), 7.06 (d, J=16.0 Hz, 1H), 6.97 (d, J=16.0 Hz, 1H), 6.65 (d, J=2.0 Hz, 2H), 6.39 (t, J=2.0 Hz, 1H), 6.19 (brs, NH), 5.44 (brs, NH), 5.05 (brs, NH), 4.31-4.27 (m, 1H), 3.38-3.33 (m, 2H), 3.32-3.24 (m, 2H), 3.11-3.03 (m, 2H), 1.41 (s, 9H). Mass found [M−Boc+H]$^+$=497.3; [M+H]$^+$=597.4; [M+Na]$^+$=619.5; [2M+H]$^+$=1192.9; [2M+Na]$^+$=1214.8.

(E)-4-(3,5-dimethoxystyryl)phenyl (2-(2-aminoacetamido)ethyl)carbamate hydrochloride (7a)

To a stirred solution of compound 23a (760 mg, 1.5 mmol) in DCM (10 mL) was added 4 M HCl in 1,4-dioxane (7.60 mL) and the mixture was stirred at room temperature for 3 hrs. The reaction mixture was evaporated and subjected to prep-HPLC purification (TFA as a buffer, detailed gradient elution, please see the information below). Then the aqueous fraction was treated with several drops of concentrate HCl and lyophilized to afford compound 7a (614 mg, 93 percent yield) as a white solid. $^1$H-NMR (CD$_3$OD, 500 MHz), δ(ppm): 7.55 (d, J=8.0 Hz, 2H), 7.14 (d, J=16.5 Hz, 11H), 7.10 (d, J=8.0 Hz, 2H), 7.05 (d, J=16.5 Hz, 11H), 6.70 (d, J=2.0 Hz, 2H), 6.40 (s, 1H), 3.80 (s, 6H), 3.42-3.40 (m, 2H), 3.35-3.31 (m, 4H); $^{13}$C-NMR (CD$_3$OD, 125 MHz), δ(ppm): 166.19, 161.13, 155.99, 150.61, 139.31, 134.66, 128.46, 127.67, 127.01, 121.56, 104.16, 99.52, 54.40, 40.10, 39.94, 39.12; Mass found [M−HCl+H]$^+$=400.2; [2M−211Cl+H]$^+$=799.3.

Column: Inertsil ODS-3 C18, 5 μm, 30*250 mm
Flow: 38 ml/min
Solvent A: 10% ACN in H$_2$O+0.1% TFA
Solvent B: 90% ACN in H$_2$O+0.1% TFA
Gradient:

| Time (min) | Flow (ml/min) | % A | % B |
|---|---|---|---|
| 0 | 38 | 100 | 0 |
| 20 | 38 | 0 | 100 |
| 24 | 38 | 0 | 100 |
| 28 | 38 | 100 | 0 |
| 30 | 38 | 100 | 0 |

(E)-4-(3,5-bis(methoxy-d3)styryl-d6)phenyl (2-(2-aminoacetamido)ethyl) carbamate hydrochloride (7b)

7b was obtained from 23b, using the same synthetic procedure as 7a.

A white solid. 95% yield. $^1$H-NMR (CD$_3$OD, 500 MHz), δ(ppm): 7.55 (d, J=8.0 Hz, 2H), 7.13 (d, J=16.5 Hz, 1H), 7.10 (d, J=8.0 Hz, 2H), 7.05 (d, J=16.5 Hz, 1H), 6.70 (d, J=2.0 Hz, 2H), 6.39 (t, J=2.0 Hz, 1H), 3.42-3.40 (m, 2H), 3.35-3.31 (m, 4H); $^{13}$C-NMR (CD$_3$OD, 125 MHz), δ(ppm): 166.19, 161.13, 155.99, 150.61, 139.31, 134.66, 128.47, 127.66, 127.01, 121.56, 104.13, 99.50, 40.10, 39.94, 39.12; Mass found [M−HCl+H]$^+$=406.3; [2M−2HCl+H]$^+$=811.3.

(E)-4-(3,5-dimethoxystyryl)phenyl (2-(2-amino-3-methylbutanamido)ethyl) carbamate hydrochloride (7c)

7c was obtained from 23c, using the same synthetic procedure as 7a.

A white solid. 92% yield. $^1$H-NMR (CD$_3$OD, 500 MHz), δ(ppm): 7.56 (d, J=9.0 Hz, 2H), 7.15 (d, J=16.5 Hz, 1H), 7.09 (d, J=9.0 Hz, 2H), 7.06 (d, J=16.5 Hz, 1H), 6.71 (d, J=2.5 Hz, 2H), 6.40 (t, J=2.5 Hz, 1H), 3.80 (s, 6H), 3.61 (d, J=5.5 Hz, 1H), 3.50-3.45 (m, 1H), 3.41-3.35 (m, 3H), 2.21-2.17 (m, 1H), 1.07 (d, J=7.0 Hz, 3H), 1.05 (d, J=7.0 Hz, 3H); $^{13}$C-NMR (CD$_3$OD, 125 MHz), δ(ppm): 168.44, 161.13, 155.92, 150.57, 139.30, 134.67, 128.47, 127.65, 127.01, 121.54, 104.14, 99.49, 58.57, 54.37, 39.96, 38.97, 29.97, 17.51, 16.52; Mass found [M−HCl+H]$^+$=443.0; [M−HCl+Na]$^+$=465.2; [2M−2HCl+H]=884.5; [2M−2HCl+Na]$^+$=906.5.

(E)-4-(3,5-bis(methoxy-d3)styryl-d6)phenyl (2-(2-amino-3-methylbutanamido)ethyl)carbamate hydrochloride (7d)

7d was obtained from 23d, using the same synthetic procedure as 7a.

A white solid. 93% yield. $^1$H-NMR (CD$_3$OD, 500 MHz), δ(ppm): 7.55 (d, J=8.5 Hz, 2H), 7.14 (d, J=16.5 Hz, 1H), 7.09 (d, J=8.5 Hz, 2H), 7.05 (d, J=16.5 Hz, 1H), 6.70 (d, J=1.5 Hz, 2H), 6.39 (t, J=1.5 Hz, 1H), 3.65 (d, J=5.0 Hz, 1H), 3.64-3.35 (m, 4H), 2.23-2.16 (m, 1H), 1.07 (d, J=7.0 Hz, 3H), 1.05 (d, J=7.0 Hz, 3H); $^{13}$C-NMR (CD$_3$OD, 125 MHz), δ(ppm): 168.45, 161.12, 155.90, 150.58, 139.31, 134.66, 128.47, 127.65, 127.01, 121.54, 104.13, 99.49, 58.57, 39.96, 38.96, 29.97, 17.51, 16.55; Mass found [M−HCl+H]$^+$=448.3; [M−HCl+Na]$^+$=470.2; [2M−2HCl+Na]$^+$=1149.5.

(E)-4-(3,5-dimethoxystyryl)phenyl (2-(2-amino-3-phenylpropanamido)ethyl) carbamate hydrochloride (7e)

7e was obtained from 23e, using the same synthetic procedure as 7a.

A white solid. 90% yield. $^1$H-NMR (CD$_3$OD, 500 MHz), δ(ppm): 7.53 (d, J=8.5 Hz, 2H), 7.41-7.31 (m, 2H), 7.33-7.29 (m, 3H), 7.13 (d, J=17.0 Hz, 1H), 7.09 (d, J=8.5 Hz, 2H), 7.04 (d, J=17.0 Hz, 1H), 6.70 (d, J=2.0 Hz, 2H), 6.40 (s, 1H), 4.04 (t, J=7.0 Hz, 1H), 3.80 (s, 6H), 3.75-3.57 (m, 1H), 3.40-3.34 (m, 2H), 3.28-3.20 (m, 2H), 3.08-3.04 (m, 1H); $^{13}$C-NMR (CD$_3$OD, 125 MHz), δ(ppm): 168.50, 161.12, 155.91, 150.55, 139.30, 134.68, 134.31, 129.09, 128.75, 128.47, 127.65, 127.49, 127.02, 121.55, 104.15, 99.50, 54.52, 54.39, 39.84, 39.04, 37.26; Mass found [M−HCl+H]⁺=491.2; [M−HCl+Na]⁺=513.3; [2M−2HCl+H]⁺=980.5.

(E)-4-(3,5-bis(methoxy-d3)styryl-d6)phenyl (2-(2-amino-3-phenylpropan amido)ethyl)carbamate hydrochloride (7f)

7f was obtained from 23f, using the same synthetic procedure as 7a.]

A white solid. 96% yield. ¹H-NMR (CD₃OD, 500 MHz), δ(ppm): 7.53 (d, J=9.0 Hz, 2H), 7.39-7.36 (m, 2H), 7.33-7.29 (m, 3H), 7.13 (d, J=17.0 Hz, 1H), 7.09 (d, J=9.0 Hz, 2H), 7.04 (d, J=17.0 Hz, 1H), 6.69 (d, J=2.0 Hz, 2H), 6.39 (t, J=2.0 Hz, 1H), 4.05 (t, J=7.0 Hz, 1H), 3.39-3.34 (m, 2H), 3.29-3.20 (m, 3H), 3.08-3.04 (m, 1H); ¹³C-NMR (CD₃OD, 125 MHz), δ(ppm): 168.48, 161.13, 155.89, 150.56, 139.30, 134.69, 134.31, 129.09, 128.74, 128.49, 127.64, 127.49, 127.00, 121.55, 104.14, 99.50, 54.52, 39.84, 39.04, 37.26; Mass found [M−HCl+H]⁺=496.3; [2M−2HCl+H]⁺=991.4.

1-2-7. Synthesis of Target Compound 8]

Scheme 7 described the synthesis of the compound 8. As shown, 2-hydroxyethyl acetate was reacted with tert-butyl-chlorodiphenylsilane (TPDPS-Cl) in the present of NEt₃ and DMAP to provide compound 24, which was further deacetylation with sodium methoxide (NaOMe) to give compound 25. Compound 25 was coupled with Boc-Val-OH (1c) in the present of EDCI and DMAP to give the compound 26, followed by deprotection of the TBDPS group with TBAF to give hydroxyl compound 27. Compound 27 was reacted with p-nitrophenyl chloroformate to give corresponding compound 28 which without further purification was reacted with pterostilbene to give expected carbonate 29, followed by deprotection of the Boc group afforded target compound 8.

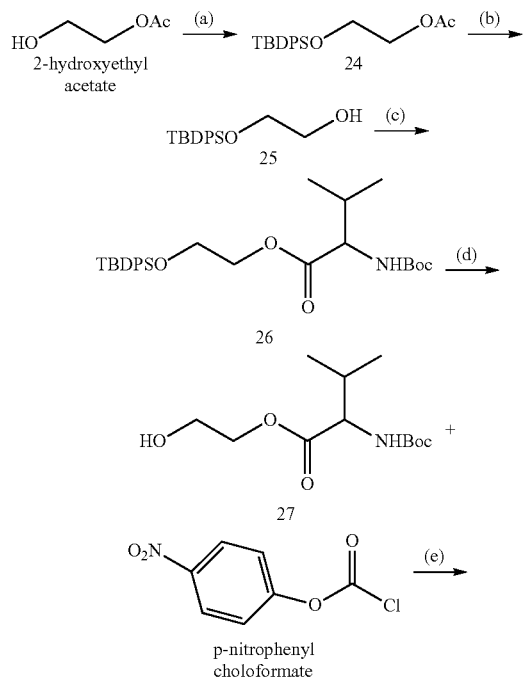

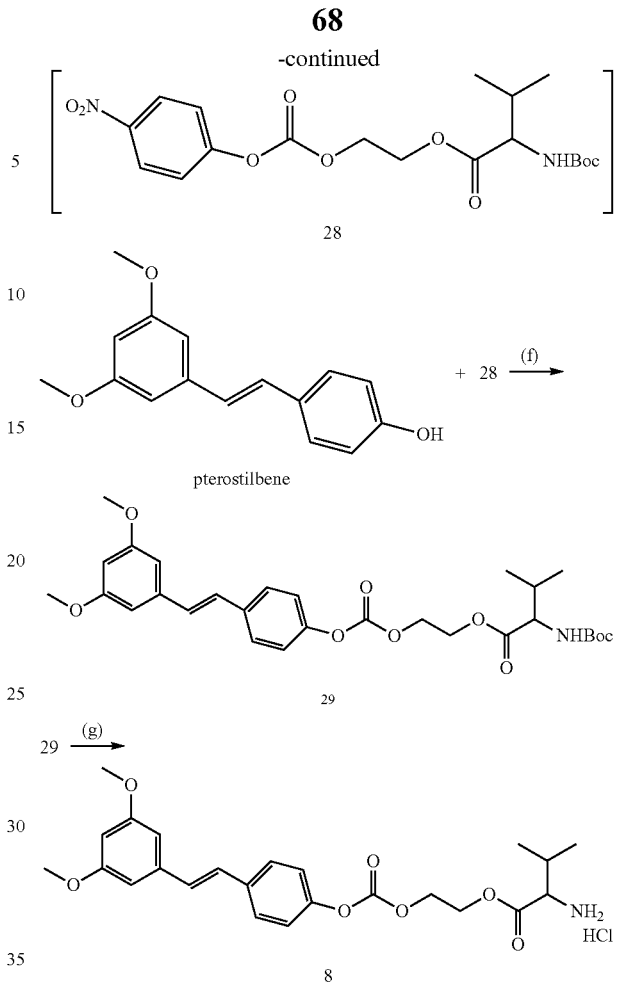

Reagents and conditions:
(a) TBDPS-Cl, trimethylamine, DMAP, CH₂Cl₂, 12 hrs;
(b) 5.4M NaOMe in MeOH, MeOH, 2 hrs;
(c) Boc-Val-OH 1c, EDCI, triethylamine, DMAP, CH₂Cl₂, 12 hrs;
(d) 1.0M TBAF in THF, THF, 1 hr, 72%;
(e) triethylamine, CH₂Cl₂, 0° C.;
(f) DMAP, ACN, 50° C,;
(g) 4M HCl in 1,4-dioxane, 3 hrs.

2-((tert-butyldiphenylsilyl)oxy)ethyl acetate (24)

To a stirred solution of 2-hydroxyethyl acetate (3.12 g, 30.0 mmol) in CH₂Cl₂ (25 mL) was added tert-butylchlorodiphenylsilane (TBDPS-Cl) (8.65 g, 31.5 mmol), Et₃N (4.6 mL, 33.0 mmol) and DMAP (110 mg, 0.9 mmol), and then was stirred at room temperature until the starting material was completely consumed (12 hrs). The reaction mixture was diluted with CH₂Cl₂ (25 mL) and washed with water (25 mL). The organic layer was dried (Na₂SO₄), filtered, and evaporated. The residue was subjected to flash chromatography (silica gel, 0 to 2% of EtOAc/n-Hexane) to afford compound 24 as a colorless oil (4.59 g, 43% yield). ¹H-NMR (500 MHz, CDCl₃), δ(ppm): 7.69-7.67 (m, 4H), 7.43-7.37 (m, 6H), 4.18 (t, J=4.5 Hz, 2H), 3.85 (t, J=4.5 Hz, 2H), 2.03 (s, 3H), 1.06 (s, 9H).

2-((tert-butyldiphenylsilyl)oxy)ethanol (25)

To a stirred solution of compound 24 (4589 mg, 13.4 mmol) in MeOH (100 mL) was added 5.4 M sodium methoxide in MeOH (4.96 mL, 26.8 mmol) dropwise. The mixture was stirred at room temperature for 2 hrs. The solvent was evaporated in vacuo, and the residue was subjected to flash chromatography (silica gel, 0 to 17 percent of EtOAc/n-Hexane) to afford compound 25 as a colorless oil (4.00 g, 99% yield). $^1$H-NMR (500 MHz, CDCl$_3$), δ(ppm): 7.71-7.67 (m, 4H), 7.45-7.37 (m, 6H), 3.77 (t, J=4.5 Hz, 2H), 3.68 (t, J=4.5 Hz, 2H), 1.58 (brs, OH, 1H), 1.05 (s, 9H).

2-((tert-butyldiphenylsilyl)oxy)ethyl 2-((tert-butoxycarbonyl)amino)-3-methylbutanoate (26)

To a stirring solution of compound 25 (2871 mg, 9.6 mmol), Boc-Val-OH 1c (2076 mg, 9.6 mmol) and NEt$_3$ (1598 uL, 11.5 mmol) in CH$_2$Cl$_2$ (100 mL) was added EDCI (2198 mg, 11.5 mmol) and DMAP (350 mg, 2.9 mmol). The reaction mixture was stirred at room temperature for 12 hrs. After reaction, the solvent was removed in vacuo, the residue was purified by column chromatography (silica gel, 0 to 5% of EtOAc/n-Hexane) to afford target product 26 (2719 mg, 57% yield) as a white powder. $^1$H-NMR (CDCl$_3$, 500 MHz), δ(ppm): 7.67-7.66 (m, 4H), 7.44-7.26 (m, 6H), 5.03 (d, J=8.5 Hz, NH, 1H), 4.25-4.11 (m, 3H), 3.88-3.85 (m, 2H), 2.15-2.04 (m, 1H), 1.44 (s, 9H), 1.04 (s, 9H), 0.94 (d, J=6.5 Hz, 3H), 0.89 (d, J=6.5 Hz, 3H).

2-hydroxyethyl 2-((tert-butoxycarbonyl)amino)-3-methylbutanoate (27)

To a stirring solution of compound 26 (2719 mg, 5.4 mmol) in THF (25 mL) was added 1.0 M TBAF in THF (10.88 mL, 10.9 mmol) dropwise. The reaction mixture was stirred at room temperature for 1 h. After reaction, the solvent was removed in vacuo, the residue was purified by column chromatography (silica gel, 0 to 30% of EtOAc/n-Hexane) to afford target product 27 (1022 mg, 72% yield) as a pale yellow oil. $^1$H-NMR (CDCl$_3$, 500 MHz), δ(ppm): 5.00 (brs, 1H), 4.35-4.22 (m, 2H), 4.20-4.14 (m, 1H), 3.82 (s, 2H), 2.33 (brs, OH, 1H), 2.17-2.13 (m, 1H), 1.44 (s, 9H), 0.96 (d, J=6.5 Hz, 3H), 0.93 (d, J=6.5 Hz, 3H).

(E)-2-(((4-(3,5-dimethoxystyryl)phenoxy)carbonyl)oxy)ethyl 2-((tert-butoxy carbonyl)amino)-3-methylbutanoate (29)

To a stirred solution of compound 27 (1022 mg, 3.9 mmol) in dry CH$_2$Cl$_2$ (20 ml) was added triethylamine (1363 ul, 9.8 mmol) and then 4-nitrophenyl chloroformate solution (867 mg, 4.3 mmol) in 30 mL CH$_2$Cl$_2$ was added dropwise at 0° C. The reaction mixture was stirred at 0° C. for 30 min, and then warmed to room temperature. After stirring at room temperature for another 4 hrs, the solvent was removed under vacuum gave a crude intermediate 28 which was mixed with pterostilbene (1002 mg, 3.9 mmol) and DMAP (956 mg, 7.8 mmol) in ACN (30 ml). The resulting mixture was heated to 50° C. for 1 h. After reaction, the solvent was removed under vacuum, the residue was taken up in EA and washed with saturated citric acid solution. The organic layer collected, dried over Na$_2$SO$_4$ and evaporated. The residue was purified by column chromatography (silica gel, 0 to 33% of EtOAc/n-Hexane) to afford crude product. The crude product was purified by preparative HPLC (80% ACN, 20% H$_2$O) to afford compound 29 (600 mg, 28% yield, two steps) as a white powder. $^1$H-NMR (CDCl$_3$, 500 MHz), δ(ppm): 7.51 (d, J=8.0 Hz, 2H), 7.17 (d, J=8.0 Hz, 2H), 7.06 (d, J=16.0 Hz, 1H), 6.98 (d, J=16.0 Hz, 1H), 6.66 (s, 2H), 6.41 (s, 2H), 5.02 (d, J=9.5 Hz, NH, 1H), 4.52-4.45 (m, 3H), 4.42-4.39 (m, 1H), 4.30-4.29 (m, 1H), 3.83 (s, 6H), 2.19-2.17 (m, 1H) 1.45 (s, 9H), 0.99 (d, J=6.5 Hz, 3H), 0.92 (d, J=6.5 Hz, 3H). Mass found [M−Boc+H]$^+$=445.1; [M+H]$^+$=545.1, [M+Na]$^+$=567.1.

(E)-2-(((4-(3,5-dimethoxystyryl)phenoxy)carbonyl)oxy)ethyl 2-amino-3-methylbutanoate hydrochloride (8)

In the 50 mL round bottle flask was charged compound 29 (561 mg, 1.0 mmol) and 4 M HCl in 1,4-dioxane (5.16 ml). The resulting mixture was stirred at room temperature for 3 h. The solvent was removed under reduced pressure then lyophilized to give desired product 8 as a white powder (446 mg, 90% yield). $^1$H-NMR (CDCl$_3$, 500 MHz), δ(ppm): 8.90 (brs, NH$_2$, HCl, 3H), 7.48 (d, J=8.0 Hz, 2H), 7.17 (d, J=8.0 Hz, 2H), 7.03 (d, J=16.0 Hz, 1H), 6.96 (d, J=16.0 Hz, 1H), 6.64 (s, 2H), 6.40 (s, 1H), 4.58-4.49 (m, 4H), 4.04 (s, 1H), 3.81 (s, 6H), 2.50 (s, 1H), 1.18-1.16 (m, 6H); $^{13}$C-NMR (CDCl$_3$, 125 MHz), δ(ppm): 168.29, 160.99, 153.33, 150.30, 139.05, 135.34, 129.23, 127.90, 127.54, 121.30, 104.61, 100.14, 65.82, 63.39, 58.65, 55.37, 29.98, 18.35, 18.28; Mass found [M−HCl+H]$^+$=445.2; [M−HCl+Na]$^+$=467.2; [2M−2HCl+H]$^+$=888.6.

1-2-8. Synthesis of Target Compound 9

Compound 9 was synthesized according to Scheme 8. As shown, displacement reaction of 2-bromoethanol with sodium azide (NaN$_3$) furnished compound 30, which was coupled with Boc-Val-OH (1c) via EDCI activation to afford ester 31, and then further hydrogenation of N$_3$ group into amine 32. Compound 32 was reacted with p-nitrophenyl chloroformate to give corresponding carbamate 33 which without further purification was reacted with pterostilbene to give the excepted carbamate 34, followed by deprotection of the Boc group, afforded amino derivative 9.

Scheme 8: Synthesis of compound 9

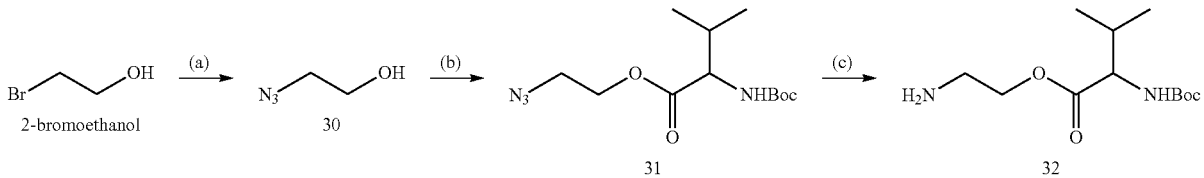

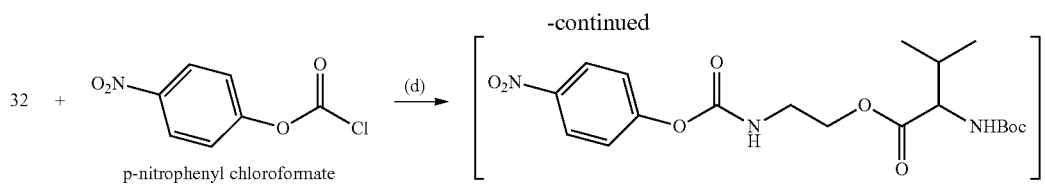

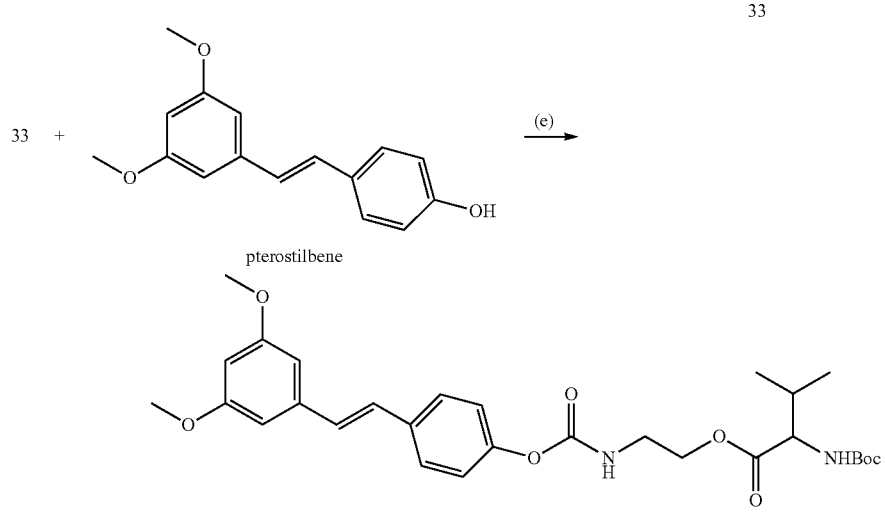

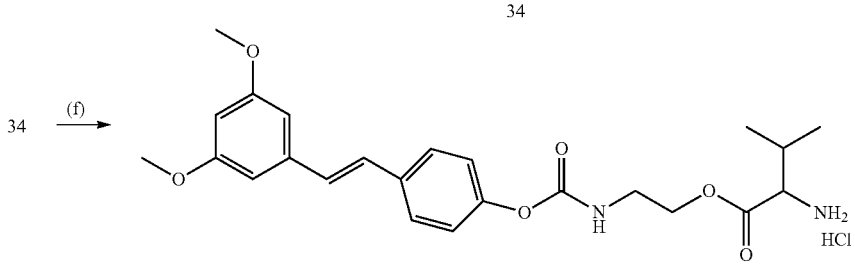

Reagants and conditions:
(a) NaN₃, water 80° C., 24 hrs;
(b) Boc-Val-OH 1c, EDCI, triethylamine, DMAP, CH₂Cl₂, 12 hrs;
(c) H₂, 10% Pd/C, EtOAc, MeOH, 2 hrs;
(d) triethylamine, CH₂Cl₂, 0° C.;
(e) DMAP, ACN, 50° C., 1 hr;
(f) 4M HCl in 1,4-dioxane, 3 hrs.

2-Azidoethanol (30)

To a 100 mL round bottom flask was added 2-bromoethanol (5827 mg, 46.6 mmol) and sodium azide (6062 mg, 93.3 mmol) in water (50 mL). The mixture was stirred at 80° C. for 24 hrs, and then cooled to room temperature. The solution was extracted with ethyl acetate (30 ml×4) and the organic layer was dried over Na₂SO₄ and filtered. The solvent of filtrate was evaporated and the residue was purified by column chromatography (silica gel, 0 to 25% of EtOAc/n-Hexane) to afford target compound 30 as a pale yellow liquid (3735 mg, 92% yield). $^1$H-NMR (CDCl₃, 500 MHz), δ(ppm): 3.78 (d, J=4.0 Hz, 2H), 3.45 (s, 2H), 1.86 (s, OH, 1H).

2-Azidoethyl 2-((tert-butoxycarbonyl)amino)-3-methylbutanoate (31)

To a stirring solution of 2-azidoethanol 30 (683 mg, 7.9 mmol), Boc-Val-OH 1c (1705 mg, 7.9 mmol) and NEt₃ (1313 uL, 9.4 mmol) in CH₂Cl₂ (50 mL) was added EDCI (1805 mg, 9.4 mmol) and DMAP (288 mg, 2.4 mmol). The reaction mixture was stirred at room temperature for 12 hrs. After reaction, the solvent was removed in vacuo, the residue was purified by column chromatography (silica gel, 0 to 11% of EtOAc/n-Hexane) to afford target product 31 (1527 mg, 68% yield) as a white powder. $^1$H-NMR (CDCl₃, 500 MHz), δ(ppm): 4.99 (d, J=6.5 Hz, NH, 1H), 4.31-4.27 (m, 3H), 3.51-3.50 (m, 2H), 2.18-2.17 (m, 1H), 1.44 (s, 9H), 0.95 (d, J=6.5 Hz, 3H), 0.91 (d, J=6.5 Hz, 3H).

2-Aminoethyl 2-((tert-butoxycarbonyl)amino)-3-methylbutanoate (32)

1527 mg of compound 31 was dissolved in 25 mL methanol and 25 mL EA, 568 mg of 10% Pd/C was added and stirred at room temperature for 2 hrs under hydrogen atmosphere. The Pd/C was filtered off and washed with 15 mL methanol. The solvent was removed under vacuum. The residue was added 10 mL water and then lyophilized to yield the product 32 as a oil (1319 mg, 95% yield). ¹H-NMR (CDCl₃, 500 MHz), δ(ppm): 5.08 (brs, NH, 1H), 4.20-4.10 (m, 1H), 3.86-3.84 (m, 1H), 3.73-3.71 (m, 1H), 3.49-3.41 (m, 1H), 3.01-2.97 (m, 1H), 2.30 (brs, NH₂, 2H), 2.12 (s, 1H), 1.44 (s, 9H), 0.97-0.88 (m, 6H).

(E)-2-(((4-(3,5-dimethoxystyryl)phenoxy)carbonyl) amino)ethyl 2-((tert-butoxycarbonyl)amino)-3-methylbutanoate (34)

To a stirred solution of compound 32 (1469 mg, 5.6 mmol) in dry CH₂Cl₂ (30 ml) was added triethylamine (1966 ul, 14.1 mmol) and then 4-nitrophenyl chloroformate solution (1251 mg, 6.2 mmol in 30 mL CH₂Cl₂) was added dropwise at 0° C. The reaction mixture was stirred at 0° C. for 30 min, and warmed to room temperature. After stirring at room temperature for another 4 hrs, the solvent was removed under vacuum gave a crude intermediate 33 which was mixed with pterostilbene (1446 mg, 5.6 mmol) and DMAP (1379 mg, 11.3 mmol) in ACN (30 ml). The resulting mixture was heated to 50° C. for 1 hr. After reaction, the solvent was evaporated. The residue was taken up in EA and washed with saturated citric acid solution. The organic layer collected, dried over Na₂SO₄ and evaporated. The residue was purified by column chromatography (silica gel, 0 to 30% of EtOAc/n-Hexane) to afford crude product. The crude product was further purified by preparative HPLC (80% ACN, 20% H₂O) to afford 34 (320 mg, 11% yield, two steps) as a white powder. ¹H-NMR (CDCl₃, 500 MHz), δ(ppm): 7.51 (d, J=7.0 Hz, 2H), 7.17 (d, J=7.0 Hz, 2H), 7.06 (d, J=16.0 Hz, 1H), 6.99 (d, J=16.0 Hz, 1H), 6.66 (s, 2H), 6.41 (s, 1H), 6.36 (brs, NH, 1H), 5.02 (brs, NH, 1H), 4.33 (s, 2H), 3.91 (t, J=7.5 Hz, 1H), 3.83 (s, 6H), 3.65 (s, 2H), 2.17 (s, 1H) 1.44 (s, 9H), 0.97 (d, J=6.5 Hz, 3H), 0.92 (d, J=6.5 Hz, 3H). Mass found [M-Boc+H]⁺=444.3; [M+H]⁺=544.3, [M+Na]⁺=566.3.

(E)-2-(((4-(3,5-dimethoxystyryl)phenoxy)carbonyl) amino)ethyl 2-amino-3-methylbutanoate hydrochloride (9)

In the 50 mL round bottle flask was charged compound 34 (320 mg, 0.6 mmol) and 4 M HCl in 1,4-dioxane (2.95 mL). The resulting mixture was stirred at room temperature for 3 hrs. The solvent was removed under reduced pressure then lyophilized to give desired product compound 9 as a white powder (249 mg, 88%). ¹H-NMR (d6-DMSO, 500 MHz), δ(ppm): 8.80 (t, J=5.0 Hz, NH, 1H), 8.22 (brs, NH₂, HCl, 3H), 7.63 (d, J=8.0 Hz, 2H), 7.28 (d, J=16.0 Hz, 1H), 7.21 (d, J=8.0 Hz, 2H), 7.15 (d, J=16.0 Hz, 1H), 6.76 (d, J=2.0 Hz, 2H), 6.41 (s, 1H), 4.30-4.27 (m, 1H), 4.24-4.20 (m, 1H), 3.76 (s, 6H), 3.64-3.60 (m, 3H), 2.10-2.06 (m, 1H), 0.95-0.90 (m, 6H); ¹³C-NMR (d6-DMSO, 125 MHz), δ(ppm): 168.64, 161.13, 153.35, 150.49, 139.37, 135.53, 129.37, 128.26, 128.04, 121.92, 105.00, 100.44, 67.38, 57.93, 55.69, 38.01, 30.11, 18.60, 18.37; Mass found [M+H]⁺=444.3; [M+Na]⁺=466.3.

1-2-9. Synthesis of Target Compound 10

Scheme 9 described the synthesis of compound 10. Carboxylic acid of Boc-Val-OH (1c) was activated by N-Hydroxysuccinimide (NHS) and Dicyclohexylcarbodiimide (DCC) allowed the conjugation of cysteamine through its amino group and gave the excepted amide 35. Compound 35 was reacted with p-nitrophenyl chloroformate to give corresponding p-nitrophenyl thiocarbonate 36, which without further purification was reacted with pterostilbene to give the excepted thiocarbonate 37. Subsequent deprotection of the Boc group afforded target compound 10.

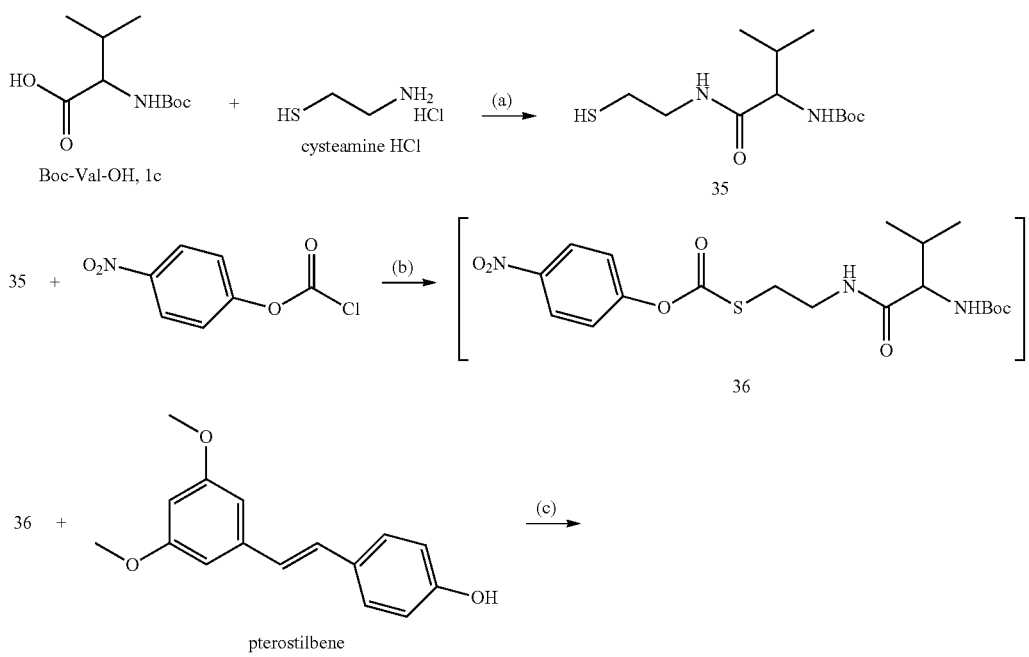

Scheme 9: Synthesis of compound 10

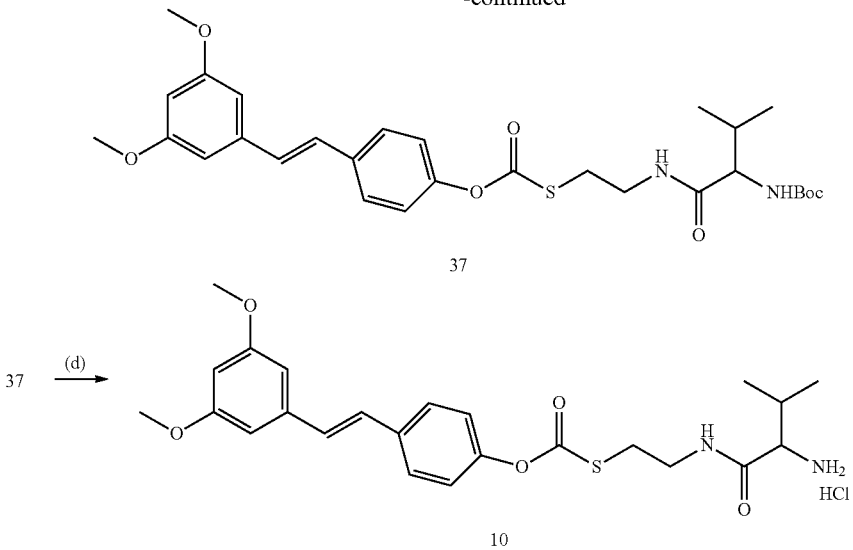

Reagents and conditions:
(a) 1. NHS, DCC, THF, 24 hrs; 2. DIPEA, CH$_2$Cl$_2$, 24 hrs;
(b) DIPEA, CH$_2$Cl$_2$, 0° C.;
(c) DMAP, ACN 50° C., 2 hrs;
(d) 4M HCl in 1,4-dioxane, CH$_2$Cl$_2$.

Tert-butyl (1-((2-mercaptoethyl)amino)-3-methyl-1-oxobutan-2-yl)carbamate (35)

To a solution of Boc-Val-OH 1c (3.23 g, 14.9 mmol) in THF (16 mL) was added NHS (1.72 g, 15.0 mmol) and DCC (3.1 g, 15.0 mmol). The reaction mixture was stirred at room temperature for 24 hrs and filtered. The solvent of filtrate was evaporated and the residue was taken up into CH$_2$Cl$_2$ (12 mL), DIPEA (5.7 g, 44.2 mmol) and cysteamine hydrochloride (1.23 g, 15.9 mmol) were then added and the reaction mixture was stirred for 24 hrs. Water (5 mL) was added and the reaction mixture was extracted with EA (3×20 mL). The combined organic layers were washed with 1 N HCl (2×10 mL) and brine (10 mL). The organic phase was dried over MgSO$_4$ and evaporated and the residue was purified by column chromatography (silica gel, n-Hexane/EtOAc, (4:1, v/v)) to give 35 (1.67 g, 41% yield) as a white solid. $^1$H-NMR (500 MHz, CDCl$_3$), δ (ppm): 6.41 (s, 1H), 5.05 (s, 1H), 3.88-3.85 (m, 1H), 3.49-3.42 (m, 2H), 2.69-2.65 (m, 2H), 2.17-2.15 (m, 1H) 1.45 (s, 9H), 0.96 (d, J=7.0 Hz, 3H), 0.92 (d, J=7.0 Hz, 3H).

Tert-butyl (E)-(1-((2-(((4-(3,5-dimethoxystyryl)phenoxy)carbonyl)thio)ethyl)amino)-3-methyl-1-oxobutan-2-yl)carbamate (37)

To a stirred solution of compound 35 (1.26 g, 4.6 mmol) in dry CH$_2$Cl$_2$ (40 ml) was added DIPEA (1.78 g, 13.8 mmol) and then 4-nitrophenyl chloroformate solution (1.02 g, 5.1 mmol) in 10 mL CH$_2$Cl$_2$ was added dropwise at 0° C. The reaction mixture was stirred at 0° C. for 15 min, and then warmed to room temperature. After stirring at room temperature for another 4 hrs, the solvent was removed under vacuum gave a crude intermediate 36 which was mixed with pterostilbene (1.19 g, 4.7 mmol) and DMAP (1.13 g, 9.3 mmol) in ACN (30 ml). The resulting mixture was heated to 50° C. for 2 hrs. After reaction, the solvent was removed under vacuum. The residue was purified by column chromatography (EA/n-Hexane=1/5 (V/V)) to afford crude product. The crude product was further purified by preparative HPLC (80% ACN, 20% H$_2$O) to afford target compound 37 (1.46 g, 56% yield) as a white powder. $^1$H-NMR (CDCl$_3$, 500 MHz), δ(ppm): 7.51 (d, J=8.0 Hz, 2H), 7.15 (d, J=8.0 Hz, 2H), 7.05 (d, J=16.5 Hz, 1H), 6.99 (d, J=16.5 Hz, 1H), 6.66 (d, J=2.5 Hz, 2H), 6.41 (t, J=2.5 Hz, 1H), 6.38 (brs, NH), 5.00 (brs, NH), 3.98-3.85 (m, 1H), 3.82 (s, 6H), 3.65-3.54 (m, 2H), 3.13-3.07 (m, 2H), 2.17-2.16 (m, 1H), 1.48 (s, 9H), 0.90 (d, J=7.0 Hz, 3H), 0.87 (d, J=7.0 Hz, 3H); Mass found [M-Boc+H]$^+$=460.2; [M+H]$^+$=560.3; [M+Na]$^+$=582.3.

(E)-S-(2-(2-amino-3-methylbutanamido)ethyl)O-(4-(3,5-dimethoxystyryl)phenyl) carbonothioate hydrochloride (10)

To a stirred solution of compound 37 (805 mg, 1.4 mmol) in DCM (15 mL) was added 4 M HCl in 1,4-dioxane (7.20 mL) and the mixture was stirred at room temperature for 3 hrs. Then the reaction solution was evaporated and subjected to prep-HPLC purification (TFA as a buffer, detailed gradient elution, please see the information below). Then the aqueous fraction was treated with several drops of concentrate HCl and lyophilized to afford compound 10 (647 mg, 91% yield) as a white solid. $^1$H-NMR (CD$_3$OD, 500 MHz), δ(ppm): 7.57 (d, J=9.0 Hz, 2H), 7.15-7.12 (m, 3H), 7.07 (d, J=16.5 Hz, 1H), 6.70 (d, J=2.0 Hz, 2H), 6.40 (s, 1H), 3.80 (s, 6H), 3.68-3.62 (m, 2H), 3.52-3.46 (m, 1H), 3.17-3.10 (m, 2H), 2.22-2.18 (m, 1H), 1.08 (d, J=6.5 Hz, 3H), 1.06 (d, J=6.5 Hz, 3H); $^{13}$C-NMR (CD$_3$OD, 125 MHz), δ(ppm): 169.66, 168.37, 161.13, 150.53, 139.16, 135.69, 129.09, 127.38, 127.23, 121.15, 104.25, 99.66, 58.48, 54.42, 38.55, 30.22, 30.05, 17.52, 16.55; Mass found [M-HCl+H]$^+$=459.2; [2M-2HCl+H]$^+$=917.3.

Column: Inertsil ODS-3 C18, 5 μm, 30*250 mm
Flow: 38 ml/min

Solvent A: 10% ACN in H$_2$O+0.1% TFA
Solvent B: 90% ACN in H$_2$O+0.1% TFA
Gradient:

| Time (min) | Flow (ml/min) | % A | % B |
|---|---|---|---|
| 0 | 38 | 100 | 0 |
| 20 | 38 | 0 | 100 |
| 24 | 38 | 0 | 100 |
| 28 | 38 | 100 | 0 |
| 30 | 38 | 100 | 0 |

2. Anti-NAFLD and Anti-NASH of Target Compounds on In Vivo Study 2-1. Materials and Methods Animals and experimental protocol: Male C57BL/6 mice, 4 weeks of age, were purchased from Laboratory Animal Center (Taiwan, China) were maintained under the procedures and guidelines provided by the Institutional Animal Care and Use Committee of the Health Research Institutes (Taiwan, China). They were maintained with free access to pellet food and water in stainless-steel cages at a temperature of 21±2° C. with a 12 h light/dark cycle. All experiments were supervised under the Institutional Animal Care and Use Committee, China Medical University (Taiwan, China) with a protocol number (CMUIACUC-2020-117).

The synthetic target compounds (5a, 5b, 5c, 5d, 5e, 5f, 5g, 5 h, 5j, 5m, 5p, 5t, 5v, 5w, 6a, 6b, 6g, 7c, 7e) were dissolved in PG/TPSG (1:1). Mice were administered with MCD diet for 14 days then administered with PG/TPSG (1:1) as control, and 100 mg/kg of all compounds oral once daily and 5 times between a week for 42 days. Mice were randomly divided into five groups and treated as follows: (1) MCD diet+PG/TPSG (2) MCD diet+100 mg/kg all compounds. After 28 days, animals were sacrificed for the collection of blood for determination of plasma ALT and AST concentrations, and liver samples for H&E stain.

Mice were administered with MCD diet for 14 days then administered with DDW, 75, 100 and 150 mg/kg compound 5c oral once daily and 5 times a week for 42 days. Mice were randomly divided into five group sand treated as follows: (1) Sham group (Non-MCD diet) (2) MCD diet (3) MCD diet+75 mg/kg compound 5c (4) MCD diet+100 mg/kg compound 5c (5) MCD diet+150 mg/kg compound 5c. After 28 days, animals were sacrificed for the collection of blood for determination of plasma ALT and AST concentrations, and liver samples for H&E stain.

2-2. Results and Discussion

Histological study was made to determine the effects of all compounds (5a, 5b, 5c, 5d, 5e, 5f, 5g, 5h, 5j, 5m, 5p, 5t, 5v, 5w, 6a, 6b, 6g, 7c, 7e) on the development of hepatic steatosis induced by MCD diet. The H&E staining results showed that MCD diet feeding induced significantly hepatic steatosis, hepatocytes damage, and inflammatory cell infiltration, ballooning and fibrosis. Compound 5a, 5b, 5c, 5f, 5t, 6g, 7c, 7e, 5w, 5g, 5d, 5e, 5j, 5m, 5p, 6a, 6b treatment prevented MCD diet-induced steatohepatitis with a decreasing of steatosis, inflammation, ballooning and fibrosis.

TABLE 1

| Treatment | No | Steatosis | Inflammation | Ballooning | Fibrosis | Scores | Sum | Avg |
|---|---|---|---|---|---|---|---|---|
| Histological examination of Compounds | | | | | | | | |
| Control (MCD) | 1 | 3 | 3 | 2 | 0 | 8 | 32 | 8 |
| | 2 | 3 | 3 | 2 | 0 | 8 | | |
| | 3 | 3 | 3 | 2 | 0 | 8 | | |
| | 4 | 3 | 3 | 2 | 0 | 8 | | |
| Compound 5a 100 mg/kg | 5 | 3 | 3 | 2 | 0 | 8 | 31 | 7.75 |
| | 6 | 3 | 3 | 2 | 0 | 8 | | |
| | 7 | 3 | 3 | 2 | 0 | 8 | | |
| | 8 | 3 | 2 | 2 | 0 | 7 | | |
| Compound 5b 100 mg/kg | 9 | 2 | 2 | 1 | 0 | 5 | 19 | 4.5 |
| | 10 | 2 | 1 | 1 | 0 | 4 | | |
| | 11 | 3 | 1 | 2 | 0 | 6 | | |
| | 12 | 2 | 1 | 1 | 0 | 4 | | |
| Compound 5f 100 mg/kg | 13 | 2 | 2 | 1 | 0 | 5 | 25 | 6.25 |
| | 14 | 2 | 2 | 1 | 0 | 5 | | |
| | 15 | 2 | 1 | 2 | 0 | 5 | | |
| | 16 | 2 | 2 | 1 | 0 | 5 | | |
| Compound 5t 100 mg/kg | 17 | 3 | 3 | 2 | 0 | 8 | 31 | 7.75 |
| | 18 | 2 | 3 | 2 | 0 | 7 | | |
| | 19 | 3 | 3 | 2 | 0 | 8 | | |
| | 20 | 3 | 3 | 2 | 0 | 8 | | |
| Compound 6g 100 mg/kg | 21 | 3 | 3 | 2 | 0 | 8 | 31 | 7.75 |
| | 22 | 2 | 3 | 2 | 0 | 7 | | |
| | 23 | 3 | 3 | 2 | 0 | 8 | | |
| | 24 | 3 | 3 | 2 | 0 | 8 | | |
| Compound 7c 100 mg/kg | 25 | 3 | 3 | 2 | 0 | 8 | 31 | 7.75 |
| | 26 | 2 | 3 | 2 | 0 | 7 | | |
| | 27 | 3 | 3 | 2 | 0 | 8 | | |
| | 28 | 3 | 3 | 2 | 0 | 8 | | |
| Compound 7e 100 mg/kg | 29 | 3 | 3 | 2 | 0 | 8 | 31 | 7.75 |
| | 30 | 3 | 3 | 2 | 0 | 8 | | |
| | 31 | 3 | 2 | 2 | 0 | 7 | | |
| | 32 | 3 | 3 | 2 | 0 | 8 | | |
| Compound 5w 100 mg/kg | 33 | 3 | 2 | 2 | 0 | 7 | 30 | 7.50 |
| | 34 | 3 | 3 | 2 | 0 | 8 | | |
| | 35 | 3 | 3 | 2 | 0 | 8 | | |
| | 36 | 2 | 3 | 2 | 0 | 7 | | |
| Control (MCD) | 1 | 3 | 3 | 2 | 0 | 8 | 32 | 8 |

TABLE 1-continued

Histological examination of Compounds

| Treatment | No | Steatosis | Inflammation | Ballooning | Fibrosis | Scores | Sum | Avg |
|---|---|---|---|---|---|---|---|---|
|  | 2 | 3 | 3 | 2 | 0 | 8 |  |  |
|  | 3 | 3 | 3 | 2 | 0 | 8 |  |  |
|  | 4 | 3 | 3 | 2 | 0 | 8 |  |  |
| Compound 5g 100 mg/kg | 5 | 3 | 3 | 2 | 0 | 8 | 26 | 6.5 |
|  | 6 | 3 | 3 | 2 | 0 | 8 |  |  |
|  | 7 | 2 | 2 | 1 | 0 | 5 |  |  |
|  | 8 | 2 | 2 | 1 | 0 | 5 |  |  |
| Compound 5h 100 mg/kg | 9 | 3 | 3 | 2 | 0 | 8 | 32 | 8 |
|  | 10 | 3 | 3 | 2 | 0 | 8 |  |  |
|  | 11 | 3 | 3 | 2 | 0 | 8 |  |  |
|  | 12 | 3 | 3 | 2 | 0 | 8 |  |  |
| Compound 5d 100 mg/kg | 13 | 3 | 3 | 2 | 0 | 8 | 31 | 7.75 |
|  | 14 | 3 | 3 | 2 | 0 | 8 |  |  |
|  | 15 | 2 | 3 | 2 | 0 | 7 |  |  |
|  | 16 | 3 | 3 | 2 | 0 | 8 |  |  |
| Compound 5e 100 mg/kg | 17 | 3 | 3 | 2 | 0 | 8 | 31 | 7.75 |
|  | 18 | 3 | 2 | 2 | 0 | 7 |  |  |
|  | 19 | 3 | 3 | 2 | 0 | 8 |  |  |
|  | 20 | 3 | 3 | 2 | 0 | 8 |  |  |
| Compound 5j 100 mg/kg | 1 | 3 | 3 | 2 | 0 | 8 | 31 | 7.75 |
|  | 2 | 3 | 3 | 2 | 0 | 8 |  |  |
|  | 3 | 3 | 3 | 2 | 0 | 8 |  |  |
|  | 4 | 2 | 3 | 2 | 0 | 7 |  |  |
| Compound 5m 100 mg/kg | 5 | 2 | 3 | 2 | 0 | 7 | 29 | 7.25 |
|  | 6 | 3 | 3 | 2 | 0 | 8 |  |  |
|  | 7 | 2 | 2 | 2 | 0 | 6 |  |  |
|  | 8 | 3 | 3 | 2 | 0 | 8 |  |  |
| Compound 5p 100 mg/kg | 9 | 3 | 3 | 2 | 0 | 8 | 31 | 7.75 |
|  | 10 | 3 | 3 | 2 | 0 | 8 |  |  |
|  | 11 | 3 | 3 | 2 | 0 | 8 |  |  |
|  | 12 | 2 | 3 | 2 | 0 | 7 |  |  |
| Compound 5v 100 mg/kg | 13 | 3 | 3 | 2 | 0 | 8 | 32 | 8.00 |
|  | 14 | 3 | 3 | 2 | 0 | 8 |  |  |
|  | 15 | 3 | 3 | 2 | 0 | 8 |  |  |
|  | 16 | 3 | 3 | 2 | 0 | 8 |  |  |
| Compound 6a 100 mg/kg | 17 | 3 | 3 | 2 | 0 | 8 | 28 | 7.00 |
|  | 18 | 3 | 2 | 2 | 0 | 7 |  |  |
|  | 19 | 2 | 3 | 2 | 0 | 7 |  |  |
|  | 20 | 2 | 2 | 2 | 0 | 6 |  |  |
| Compound 6b 100 mg/kg | 17 | 3 | 3 | 2 | 0 | 8 | 28 | 7.00 |
|  | 18 | 2 | 2 | 2 | 0 | 6 |  |  |
|  | 19 | 3 | 3 | 2 | 0 | 8 |  |  |
|  | 20 | 2 | 2 | 2 | 0 | 6 |  |  |

The serum concentrations of AST and ALT are the markers of liver injury. As shown in Table 2, the serum concentrations of AST and ALT in mice fed with MCD diet significantly increased in comparison with normal diet fed mice. Compound 5c, 5a, 5b, 5f, 5h, 5d, 5m and 5p significantly inhibited the serum concentrations of AST and ALT with dose-dependent manners.

TABLE 2

Serum AST and ALT parameters from compounds treated-NASH mice.

| Treatment | Serum AST (U/L) | Serum ALT (U/L) |
|---|---|---|
| MCD diet | 334.00 ± 46.70 | 202.38 ± 21.05 |
| Compound 5c 100 mg/kg | 274.00 ± 27.93*** | 205.13 ± 22.73 |
| Compound 5a 100 mg/kg | 283.00 ± 8.93 | 251.75 ± 16.08 |
| Compound 5b 100 mg/kg | 235.25 ± 31.31*** | 180.88 ± 17.18* |
| Compound 5f 100 mg/kg | 241.75 ± 28.60*** | 153.00 ± 43.06*** |
| Compound 5t 100 mg/kg | 370.25 ± 36.46 | 263.00 ± 16.78 |
| Compound 6g 100 mg/kg | 455.25 ± 113.85 | 260.75 ± 24.46 |
| Compound 7c 100 mg/kg | 435.25 ± 40.87 | 252.13 ± 18.75 |
| Compound 7e 100 mg/kg | 477.00 ± 127.71 | 286.75 ± 24.15 |
| Compound 5w 100 mg/kg | 236.75 ± 8.19*** | 214.50 ± 15.66 |
| MCD diet | 414.75 ± 56.76 | 207.38 ± 28.38 |
| Compound 5g 100 mg/kg | 444.25 ± 88.57 | 222.13 ± 44.29 |
| Compound 5h 100 mg/kg | 301.50 ± 25.85 | 150.75 ± 12.92 |
| Compound 5d 100 mg/kg | 392.25 ± 56.33 | 196.13 ± 28.16 |
| Compound 5e 100 mg/kg | 419.25 ± 54.94 | 209.62 ± 27.47 |
| Compound 5j 100 mg/kg | 598.00 ± 149.60 | 299.00 ± 74.80 |
| Compound 5m 100 mg/kg | 381.75 ± 49.33 | 190.88 ± 24.67 |
| Compound 5p 100 mg/kg | 327.00 ± 44.36 | 288.50 ± 147.17 |
| Compound 5v 100 mg/kg | 610.25 ± 177.16 | 430.13 ± 183.15 |
| Compound 6a 100 mg/kg | 555.25 ± 218.88 | 402.63 ± 133.73 |
| Compound 6b 100 mg/kg | 408.75 ± 54.45 | 454.38 ± 229.70 |

Alanine transaminase (ALT);
Aspartate transaminase (AST);
methionine and choline deficient diet (MCD);
*** $p < 0.001$ to MDC group.

The compound 5c is the most promising and was selected for further valuation. Histological study was made to determine the effect of compound 5c on the development of hepatic steatosis induced by MCD diet. H-E staining results showed that MCD diet feeding induced significantly hepatic steatosis, hepatocytes damage, and inflammatory cell infiltration, ballooning and fibrosis. Compound 5c treatment prevented MCD diet-induced steatohepatitis with a decreasing of steatosis, inflammation, ballooning and fibrosis. (FIG. 1, Table 3).

mixture was stirred and adjusted to pH1.2 with 2N of NaOH and 2N of conc.HCl and ten diluted with $H_2O$ to 1000 mL.

TABLE 3

Histological examination of Compound 5c

| Treatment | No | Steastosis | Inflammation | Ballooning | Fibrosis | Scores | Sum | Avg |
|---|---|---|---|---|---|---|---|---|
| Sham group (Non-MCD) | 1 | 0 | 0 | 0 | 0 | 0 | 0 | 0 |
| | 2 | 0 | 0 | 0 | 0 | 0 | | |
| | 3 | 0 | 0 | 0 | 0 | 0 | | |
| | 4 | 0 | 0 | 0 | 0 | 0 | | |
| | 5 | 0 | 0 | 0 | 0 | 0 | | |
| Control | 6 | 3 | 1 | 2 | 0 | 6 | 37 | 7.4 |
| | 7 | 3 | 2 | 2 | 0 | 7 | | |
| | 8 | 3 | 2 | 2 | 1 | 8 | | |
| | 9 | 3 | 2 | 2 | 1 | 8 | | |
| | 10 | 3 | 2 | 2 | 1 | 8 | | |
| Compound 5c 75 mg/kg | 11 | 3 | 1 | 2 | 1 | 7 | 31 | 6.2 |
| | 12 | 3 | 1 | 2 | 0 | 6 | | |
| | 13 | 3 | 1 | 2 | 0 | 6 | | |
| | 14 | 3 | 1 | 2 | 0 | 6 | | |
| | 15 | 3 | 1 | 2 | 0 | 6 | | |
| Compound 5c 100 mg/kg | 16 | 3 | 0 | 2 | 0 | 5 | 21 | 4.2 |
| | 17 | 3 | 0 | 2 | 0 | 5 | | |
| | 18 | 3 | 0 | 2 | 0 | 5 | | |
| | 19 | 2 | 0 | 1 | 0 | 3 | | |
| | 20 | 2 | 0 | 1 | 0 | 3 | | |
| Compound 5c 150 mg/kg | 21 | 2 | 0 | 1 | 0 | 3 | 16 | 3.2 |
| | 22 | 2 | 0 | 1 | 0 | 3 | | |
| | 23 | 2 | 0 | 1 | 0 | 3 | | |
| | 24 | 1 | 0 | 1 | 0 | 2 | | |
| | 25 | 3 | 0 | 2 | 0 | 5 | | |

The serum concentrations of AST and ALT are the markers of liver injury. As shown in Table 4, the serum concentrations of AST and ALT in mice fed with MCD diet significantly increased in comparison with normal diet fed mice. Compound 5c significantly inhibited the serum concentrations of AST and ALT with dose-dependent manners.

TABLE 4

Serum AST and ALT parameters from compound 5c treated-NASH mice.

| Treatment | Serum AST (U/L) | Serum ALT (U/L) |
|---|---|---|
| Control group | 65.20 ± 27.33 | 32.00 ± 2.55 |
| MCD diet | 441.00 ± 157.81*** | 225.00 ± 64.42*** |
| Compound 5c 75 mg/kg | 275.00 ± 198.78 | 164.40 ± 92.39 |
| Compound 5c 100 mg/kg | 245.80 ± 173.61*** | 92.60 ± 70.56*** |
| Compound 5c 150 mg/kg | 192.00 ± 179.08*** | 82.80 ± 35.39** |

Alanine transaminase (ALT);
Aspartate transaminase (AST);
methionine and choline deficient diet (MCD);
***$p < 0.001$ to control group.
$p < 0.001$ to MCD group

3. Stability and Solubility of Target Compounds 3-1. Stability of Compound 5a, 5c, 5m, 5v, 5w, 6a and 6b in pH=1.2.

In vitro stability of compounds 5a,5c,5m,5v,5w,6a and 6b in pH 1.2 solution (the USP Gastric fluid without enzymes)

3-1-1. Materials and Methods

Materials: The target compounds of the present invention 5a, 5c, 5m, 5v, 5w, 6a and 6b.

Reagents: pH=1.2 solution NaCl 2.0g was dissolved in $H_2O$ 800 mL and conc.HCl 7.0 mL was added. The In vitro experiment: Compounds 5a,5c,5m,5v,5w6a and 6b were separately incubated with pH 1.2 solution at 37° C. for 6 h. Sample collection: At 0, 0.17, 0.5, 1, 2, 4 and 6 h, 100 mL of aliquots were taken from the incubation mixture and placed into centrifuge tubes containing 100 μL of ice-cold acetonitrile and 1 μm internal standard where the reaction was terminated. The samples were centrifuged at 15000 rpm for 10 min, and the supernatant was injected onto the HPLC system.

HPLC method: HPLC: Waters 1525 Binary HPLC Pump; Waters 2707 Autosampler; Waters 2487 Dual λ Absorbance Detector; Column: XBridge Shield RP18, 5 μm, 4.6×50 mm Column; UV Detector: 305 nm; Temperature: room temperature; Running Time: 15.0 min; Mobile phase: A: 0.1% FA in $H_2O$; B: Acetonitrile.

HPLC mobile phase gradient:

| Time | Flow (mL) | % A | % B |
|---|---|---|---|
| 0 | 1 | 90 | 10 |
| 3 | 1 | 90 | 10 |
| 9 | 1 | 10 | 90 |
| 12 | 1 | 90 | 10 |
| 15 | 1 | 90 | 10 |

Note:
Mobile phase: A: 0.1% FA in $H_2O$; B: Acetonitrile.

Retention time (RT) of compound 5a, 5c, 5m, 5v, 5w, 6a and 6b:

| Compound | RT (min) | Injection Vol (μL) |
|---|---|---|
| Compound 5a | 6.96 | 5 |
| Compound 5c | 7.13 | 10 |
| Compound 5m | 6.37 | 5 |
| Compound 5v | 6.96 | 5 |
| Compound 5w | 8.96 | 10 |
| Compound 6a | 6.95 | 5 |
| Compound 6b | 7.28 | 10 |

3-1-2. Results and Discussion

The levels of the tested compounds are compared in Table 5. The results showed that these tested compounds were relatively stable in pH=1.2 solution. After a 6 h incubation more than 90% of compounds 5a,5c,5m,5w,6a and 6b remained in pH=1.2 solution. While, only 84.8% of compound 5v remained.

In conclusion, the in vitro study demonstrates that these target compounds were relatively stable toward gastric fluid (without enzymes). No time-dependent decomposition was observed.

TABLE 5

The time-dependent stability of compounds 5a, 5c, 5m, 5v, 5w, 6a and 6b in pH = 1.2 solution.

| Time (h) | Compound 5a (%) | Compound 5c (%) | Compound 5m(%) | Compound 5v (%) | Compound 5w (%) | Compound 6a (%) | Compound 6b (%) |
|---|---|---|---|---|---|---|---|
| 0 | 100.0 | 100.0 | 100.0 | 100.0 | 100.0 | 100.0 | 100.0 |
| 0.167 | 104.0 | 88.5 | 88.6 | 100.6 | 128.3 | 106.4 | 130.5 |
| 0.5 | 104.0 | 93.2 | 109.8 | 106.8 | 113.4 | 101.2 | 103.9 |
| 1 | 110.2 | 96.0 | 113.5 | 101.0 | 123.9 | 119.4 | 111.7 |
| 2 | 101.7 | 91.7 | 102.6 | 103.0 | 128.5 | 101.5 | 97.9 |
| 4 | 103.5 | 97.4 | 85.6 | 106.9 | 122.4 | 104.6 | 99.2 |
| 6 | 103.6 | 96.9 | 91.5 | 84.8 | 133.7 | 99.8 | 102.6 |

3-2. Solubility of Compound 5c in H₂O
3-2-1. Materials and Methods

Compound 5c concentration was setting 40 mg/mL in H$_2$O. After sonication and vortex 30 min, respectively, the tube was standing at 25° C. At the sampling time point (1, 3, 6 and 24 hours), the tube was centrifuged at 15,000 rpm for 10 min, collected supernatant and appropriately diluted with acetonitrile. The sample was quantitated by HPLC.

HPLC method: Column: XBridge Shield RP18, 5 μm, 4.6×50 mm; UV Detector: 305 nm; Temperature: room temperature; Injection Vol: 10 μL; Running Time: 15.0 min; Mobile phase: A: 0.1% FA in H$_2$O; B: Acetonitrile HPLC Mobile phase gradient:

| Time | Flow | % A | % B |
|---|---|---|---|
| 0 | 1 | 90 | 10 |
| 3 | 1 | 90 | 10 |
| 9 | 1 | 10 | 90 |
| 12 | 1 | 90 | 10 |
| 15 | 1 | 90 | 10 |

Note:
Mobile phase:
A: 0.1% FA in H$_2$O;
B: Acetonitrile.

3-2-2. Results and Discussion

Figure 2:
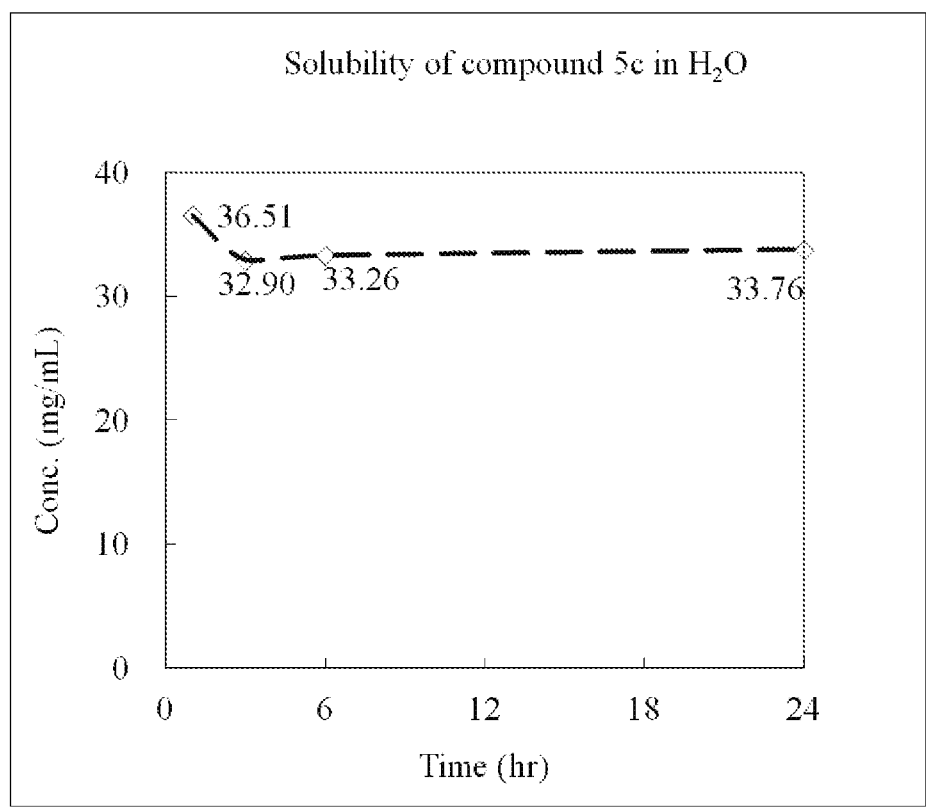
FIG. 2 shows solubility of compound 5c in $H_2O$ at 25° C. in 24 hours.

As shown in Table 6 and FIG. 2, the solubility of compound 5c in H$_2$O at 25° C. after 24 hours is higher than 34 mg/mL. According to the criteria of US pharmacopeia, compound 5c could be called as a water soluble substance.

TABLE 6

Solubility profiling of compound 5c in H$_2$O.

|  | 1 hr | 3 hr | 6 hr | 24 hr |
|---|---|---|---|---|
| mg/mL | 37 | 33 | 33 | 34 |

4. Conclusion

In the present invention a series of novel analogs of water soluble pterostilbene amino acid bearing carbonates were synthesized. These compounds are stable in pH=1.2 (the pH value of gastric fluid (without enzymes)) and have been examined for their anti-NASH activity. Most of the synthesized compounds showed anti-NASH/NAFLD activities (as shown in Table 1.2). Among them, compound 5c is the most promising and was selected for further evaluation. The results indicated that compound 5c (the representative compound) shows significant anti-NASH/NAFLD activities (FIG. 1, Table 3 and Table 4).

The new series of chemical structures of pterostilbene amino acid bearing carbonate analogs of the present invention are water soluble, stable, and bio-effective for treating NAFLD/NASH in vivo, and thus have a potential to be developed as new drugs for treating NAFLD/NASH.

| | |
|---|---|
| ACN | Acetonitrile |
| DCC | Dicyclohexylcarbodiimide |
| DCM | Dichloromethane |
| DIPEA | N,N-Diisopropylethylamine |
| DMAP | 4-Dimethylaminopyridine |
| EA | Ethyl acetate |
| EDCI | 1-Ethyl-3-(3-dimethylaminopropyl)carbodiimide |
| EtOAc | Ethyl acetate |
| HATU | 1-[Bis(dimethylamino)methylene]-1H-1,2,3-triazolo[4,5-b]pyridinium 3-oxide hexafluorophosphate |
| MeOH | Methanol |
| NHS | N-Hydroxysuccinimide |
| Pd/C | Palladium on carbon |
| RP-HPLC | Reversed-Phase-High Performance Liquid Chromatography |
| TBAF | Tetra-n-butylammonium fluoride |
| TEA | Triethylamine |
| TFA | Trifluoroacetic acid |
| THF | Tetrahydrofuran |
| TIPS | Triisopropylsilane |
| TIPS-Cl | Triisopropylsilyl chloride |
| TMS | Tetramethylsilane |
| TPDPS-Cl | Tert-butyldiphenylchlorosilane |

REFERENCES

1. FDA. Nonalcoholic Steatohepatitis with Compensated Cirrhosis: Developing Drugs for Treatment Guidance for Industry. FDA DRAFT GUIDANCE. 2019.
2. Sumida Y, Yoneda M. Current and future pharmacological therapies for NAFLD/NASH. J Gastroenterol. 2018; 53(3):362-76.
3. Goldberg D, Ditah I C, Saeian K, Lalehzari M, Aronsohn A, Gorospe E C, et al. Changes in the Prevalence of Hepatitis C Virus Infection, Nonalcoholic Steatohepatitis, and Alcoholic Liver Disease Among Patients With Cirrhosis or Liver Failure on the Waitlist for Liver Transplantation. Gastroenterology. 2017; 152(5):1090-9 e1.
4. Younossi Z M, Koenig A B, Abdelatif D, Fazel Y, Henry L, Wymer M. Global epidemiology of nonalcoholic fatty liver disease-Meta-analytic assessment of prevalence, incidence, and outcomes. Hepatology. 2016; 64(1):73-84.
5. Thiagarajan P, Aithal G P. Drug Development for Nonalcoholic Fatty Liver Disease: Landscape and Challenges. J Clin Exp Hepatol. 2019; 9(4):515-21.
6. Wu J. [Machanism and intervention of nonalcoholic steatohepatitis-associated fibrosis]. Zhonghua Gan Zang Bing Za Zhi. 2019; 27(6):415-9.
7. Kudaravalli P, John S. Nonalcoholic Fatty Liver. StatPearls. Treasure Island (FL)2019.
8. Mathews S E, Kumar R B, Shukla A P. Nonalcoholic steatohepatitis, obesity, and cardiac dysfunction. Curr Opin Endocrinol Diabetes Obes. 2018; 25(5):315-20.
9. Fiorucci S, Di Giorgio C, Distrutti E. Obeticholic Acid: An Update of Its Pharmacological Activities in Liver Disorders. Handb Exp Pharmacol. 2019; 256:283-95.
10. Ma Z, Zhang X, Xu L, Liu D, Di S, Li W, et al. Pterostilbene: Mechanisms of its action as oncostatic agent in cell models and in vivo studies. Pharmacol Res. 2019; 145:104265.
11. Akinwumi B C, Bordun K M, Anderson H D. Biological Activities of Stilbenoids. Int J Mol Sci. 2018; 19(3).
12. Lange K W, Li S. Resveratrol, pterostilbene, and dementia. Biofactors. 2018; 44(1):83-90.
13. Estrela J M, Ortega A, Mena S, Rodriguez M L, Asensi M. Pterostilbene: Biomedical applications. Crit Rev Clin Lab Sci. 2013; 50(3):65-78.
14. Aguirre L, Palacios-Ortega S, Fernandez-Quintela A, Hijona E, Bujanda L, Portillo M P. Pterostilbene Reduces Liver Steatosis and Modifies Hepatic Fatty Acid Profile in Obese Rats. Nutrients. 2019; 11(5).
15. Gomez-Zorita S, Milton-Laskibar I, Aguirre L, Fernandez-Quintela A, Xiao J, M P P. Effects of pterostilbene on diabetes, liver steatosis and serum lipids. Curr Med Chem. 2019.
16. Ruiz M J, Fernandez M, Pico Y, Manes J, Asensi M, Carda C, et al. Dietary administration of high doses of pterostilbene and quercetin to mice is not toxic. J Agric Food Chem. 2009; 57(8):3180-6.
17. Coimbra M, Isacchi B, van Bloois L, Torano J S, Ket A, Wu X, et al. Improving solubility and chemical stability of natural compounds for medicinal use by incorporation into liposomes. Int J Pharm. 2011; 416(2):433-42.
18. Kapetanovic I M, Muzzio M, Huang Z, Thompson T N, McCormick D L. Pharmacokinetics, oral bioavailability, and metabolic profile of resveratrol and its dimethylether analog, pterostilbene, in rats. Cancer Chemother Pharmacol. 2011; 68(3):593-601.
19. Azzolini M, Mattarei A, La Spina M, Fanin M, Chiodarelli G, Romio M, et al. New natural amino acid-bearing prodrugs boost pterostilbene's oral pharmacokinetic and distribution profile. Eur J Pharm Biopharm. 2017; 115:149-58.
20. Gonzalez-Alfonso J L, Rodrigo-Frutos D, Belmonte-Reche E, Penalver P, Poveda A, Jimenez-Barbero J, et al. Enzymatic Synthesis of a Novel Pterostilbene alpha-Glucoside by the Combination of Cyclodextrin Glucanotransferase and Amyloglucosidase. Molecules. 2018; 23(6).

The invention claimed is:

1. A compound having the following formula:

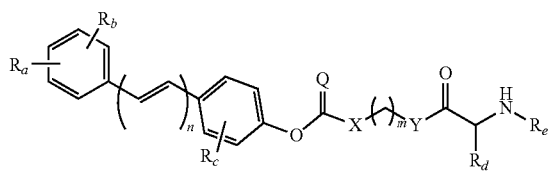

wherein n is 1 to 3;
m is 2 to 6;
Q, X and Y independently are O, S, or NH;
Ra, Rb, and Rc independently are H, halogen, C1-C6 linear alkyl, C1-C6 linear alkoxy, C3-C6 branched alkyl, C3-C6 branched alkoxy or C1-C6 fluoroalkoxy;
Rd and Re independently are H, halogen, C1-C6 linear alkyl, C1-C6 linear alkoxy, C3-C6 branched alkyl, C3-C6 branched alkoxy or C1-C6 fluoroalkoxy, or Rd and Re are linked to form a ring structure, so that

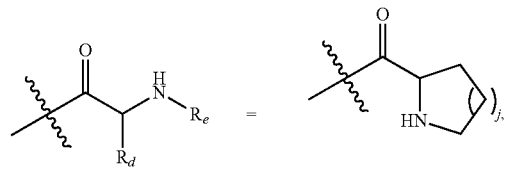

wherein j is 1 to 3; or
a pharmaceutically acceptable salt thereof.

2. The compound of claim 1 or a pharmaceutically acceptable salt thereof, wherein Q is O; X is O; and Y is NH.

3. The compound of claim 1 or a pharmaceutically acceptable salt thereof, wherein Q is O; X is NH, and Y is NH.

4. The compound of claim 1 or a pharmaceutically acceptable salt thereof, wherein Q is O; X is O; and Y is O.

5. The compound of claim 1 or a pharmaceutically acceptable salt thereof, wherein Q is O; X is NH; and Y is O.

6. The compound of claim 1 or a pharmaceutically acceptable salt thereof, wherein Q is O; X is S; and Y is NH.

7. The compound of claim 1, or a pharmaceutically acceptable salt thereof, wherein m is 2; and n is 1 or 2.

8. The compound of claim 1, or a pharmaceutically acceptable salt thereof, wherein Ra and Rb are methoxy.

9. The compound of claim 8, or a pharmaceutically acceptable salt thereof, wherein Ra and Rb are 3,5-dimethoxy.

10. The compound of claim 1, or a pharmaceutically acceptable salt thereof, wherein Rd is C3-C6 branched alkyl.

11. The compound of claim 10, or a pharmaceutically acceptable salt thereof, wherein Rd is isopropyl.

12. The compound of claim 1, or a pharmaceutically acceptable salt thereof, wherein Rd and Re are linked to form a ring structure, so that

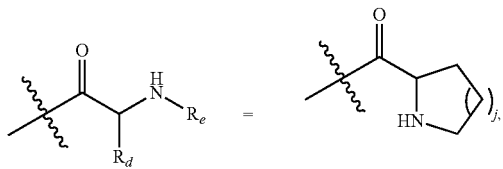

wherein j is 1.

13. The compound of claim 1, or a pharmaceutically acceptable salt thereof, wherein the pharmaceutically acceptable salt is hydrochloric acid salt or nicotinate salt.

14. A pharmaceutical composition for treating a non-alcoholic fatty liver disease in a subject comprising a therapeutically effective amount for said treatment of a compound according to claim 1 or a pharmaceutically acceptable salt thereof.

15. A pharmaceutical composition for treating a nonalcoholic steatohepatitis in a subject comprising a therapeutically effective amount for said treatment of a compound according to claim 1 or a pharmaceutically acceptable salt thereof.

16. An intermediate compound useful in synthesis of a compound according to claim 1 or a pharmaceutically acceptable salt thereof, which has the following formula:

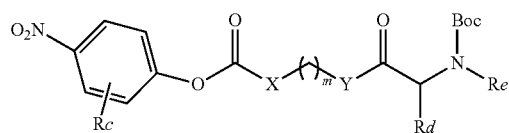

wherein m, Rc, Rd, and Re are defined as in claim 1, and Boc is a building block functional group, provided that Rd is not a hydrogen.

* * * * *